(12) United States Patent
Shen et al.

(10) Patent No.: US 12,231,473 B2
(45) Date of Patent: Feb. 18, 2025

(54) CALL PROCESSING SYSTEM AND CALL PROCESSING METHOD

(71) Applicant: Huawei Technologies Co., Ltd., Shenzhen (CN)

(72) Inventors: Guangjie Shen, Xi'an (CN); Yunhua Zhang, Xi'an (CN); Ye Zhu, Xi'an (CN); Yigang Jia, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/347,437

(22) Filed: Jul. 5, 2023

(65) Prior Publication Data
US 2023/0353603 A1 Nov. 2, 2023

Related U.S. Application Data

(63) Continuation of application No. PCT/CN2021/070535, filed on Jan. 6, 2021.

(51) Int. Cl.
*H04L 65/1069* (2022.01)
*H04L 65/1016* (2022.01)

(52) U.S. Cl.
CPC ...... *H04L 65/1069* (2013.01); *H04L 65/1016* (2013.01)

(58) Field of Classification Search
CPC ............. H04L 65/1069; H04L 65/1016; H04L 65/1046; H04L 67/141; H04L 67/565; H04M 3/5166; H04M 3/493
See application file for complete search history.

(56) References Cited

U.S. PATENT DOCUMENTS 6,542,489 B1 * 4/2003 Kari ................. H04W 4/20
370/338
9,667,790 B1 * 5/2017 Desai ................. H04L 65/1069
(Continued)

FOREIGN PATENT DOCUMENTS

CN 104618349 A 5/2015

OTHER PUBLICATIONS

3GPP TS 24.229 V17.1.0 (Dec. 2020) "3rd Generation Partnership Project; Technical Specification Group Core Network and Terminals; IP multimedia call control protocol based on Session Initiation Protocol (SIP) and Session Description Protocol (SDP); Stage 3 (Release 17)", total 1070 pages.
(Continued)

*Primary Examiner* — David R Lazaro
(74) *Attorney, Agent, or Firm* — Slater Matsil, LLP

(57) ABSTRACT

A call processing method includes: an application service device is configured to send a data channel establishment indication message to the application media device when detecting that a terminal device initiates or receives a call service, to indicate the application media device to establish a data channel with the terminal device. The application media device is configured to: receive the data channel establishment indication message from the application service device, establish the data channel with the terminal device, and send first service page information corresponding to the call service to the terminal device through the data channel. It can be learned that, a control plane and a media plane in the call processing system are separated, the application service device is configured to implement a function of the control plane, and the application media device is configured to implement a function of the media plane.

20 Claims, 29 Drawing Sheets

(56) References Cited

U.S. PATENT DOCUMENTS

| | | | | |
|---|---|---|---|---|
| 9,900,433 | B1* | 2/2018 | Helbert | H04M 3/493 |
| 10,291,780 | B1* | 5/2019 | Desai | G06Q 30/0282 |
| 2003/0212561 | A1* | 11/2003 | Williams | H04M 3/24 |
| | | | | 704/270.1 |
| 2016/0021519 | A1* | 1/2016 | Xu | H04M 7/0039 |
| | | | | 455/414.1 |
| 2019/0152065 | A1* | 5/2019 | Song | B25J 13/003 |
| 2020/0153961 | A1* | 5/2020 | Mittal | H04M 3/493 |
| 2022/0020364 | A1* | 1/2022 | Dundigalla | G06Q 20/1085 |
| 2023/0353603 | A1* | 11/2023 | Shen | H04L 65/1046 |
| 2023/0353673 | A1* | 11/2023 | Shen | H04M 3/493 |

OTHER PUBLICATIONS

3rd Generation Partnership Project; Technical Specification Group Services and System Aspects; IP Multimedia Subsystem (IMS); Multimedia Telephony; Media handling and interaction (Release 16), 3GPP TS 26.114 V16.5.2 (Mar. 2020), total 446 pages.

* cited by examiner

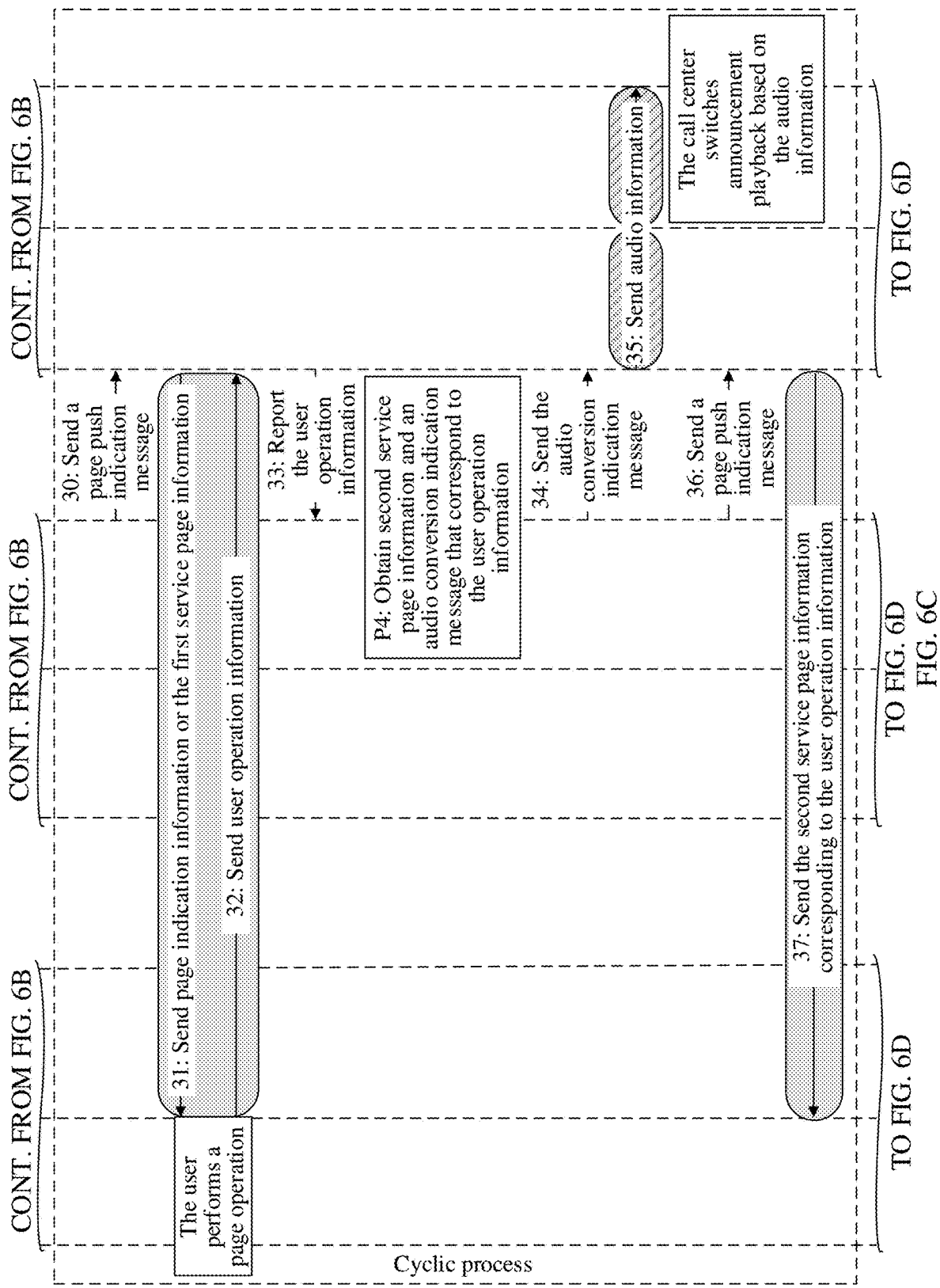

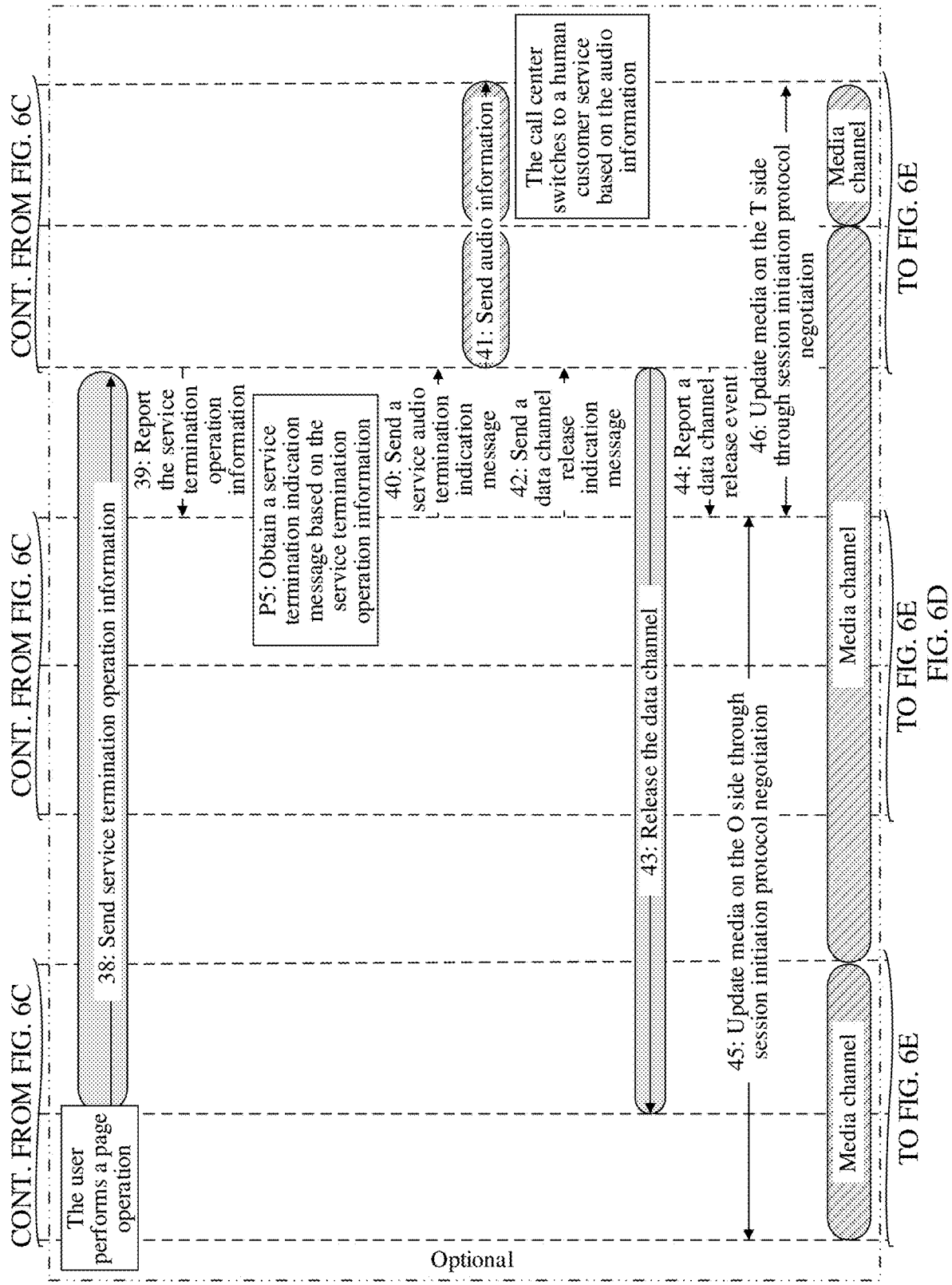

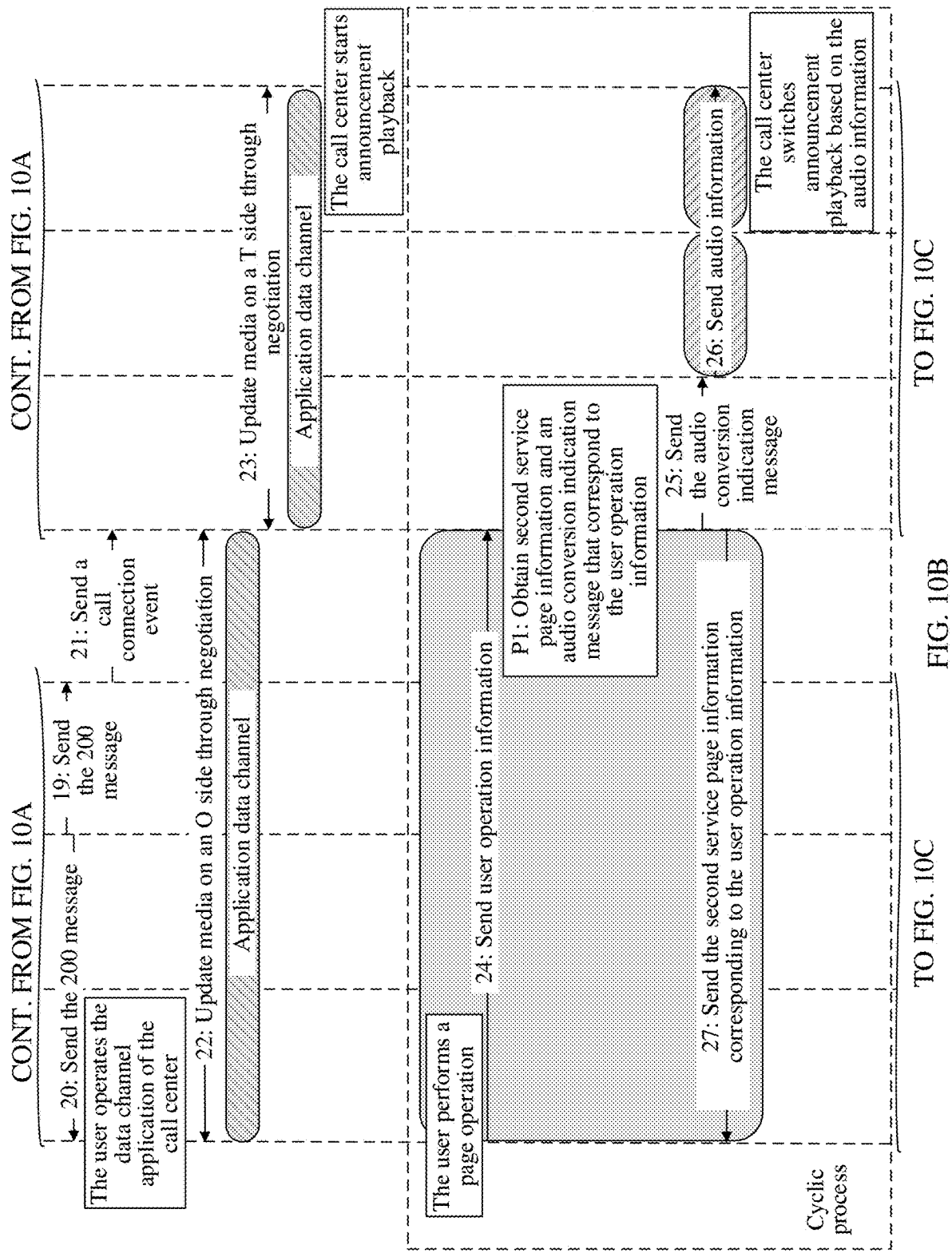

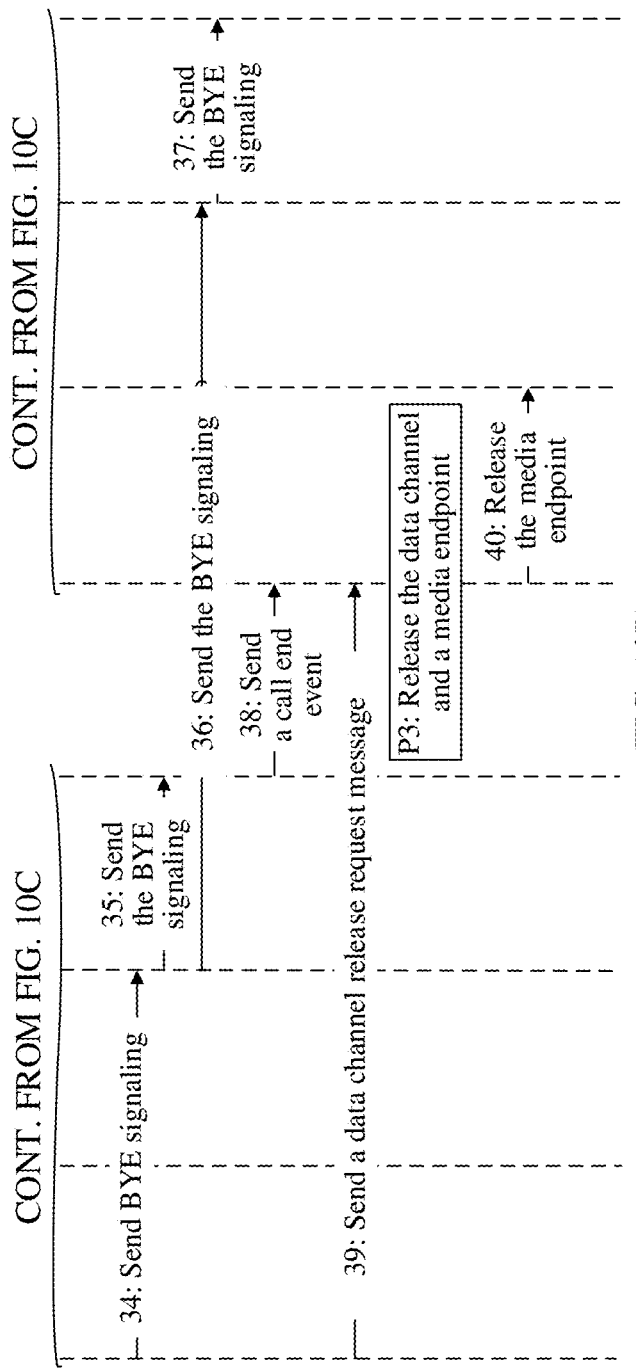

CALL PROCESSING SYSTEM AND CALL PROCESSING METHOD

CROSS-REFERENCE TO RELATED APPLICATIONS

This application is a continuation of International Application No. PCT/CN2021/070535, filed on Jan. 6, 2021. The disclosure of the aforementioned application is hereby incorporated by reference in its entirety.

BACKGROUND

A telecommunication network call center that is based on an IP multimedia subsystem (IMS) is widely used in industries such as telecommunication, bank, insurance, and consumption industries, and is usually referred to as an automatic agent, a customer center, or a customer service hotline. An interactive voice response (IVR) is a voice platform of the customer service hotline, and can provide multi-level voice menus and answer calls through pre-recorded or synthesized voices. In this way, the IVR provides a voice menu navigation function for incoming calls of customers.

For a mobile user, a self-service process of dialing a customer service hotline is mainly based on IVR voice navigation, or is based on communication with a person, or a fixed interaction mode of pressing keys. In the foregoing several self-service processes, a customer needs to listen carefully or even repeatedly listen to the voice navigation to select a correct key option, causing a call processing delay and reducing processing efficiency.

SUMMARY

Embodiments of this application provide a call processing system and a call processing method. The call processing system and the call processing method can implement an interactive service in a call, and therefore efficiency of processing a call service by the call processing system is improved.

According to a first aspect, an embodiment of this application provides a call processing system. The call processing system includes an application service device and an application media device. The application service device is configured to send a data channel establishment indication message to the application media device when detecting that a terminal device initiates or receives a call service, to indicate the application media device to establish a data channel with the terminal device. The application media device is configured to: receive the data channel establishment indication message from the application service device, establish the data channel with the terminal device, and send first service page information corresponding to the call service to the terminal device through the data channel.

It can be learned that, a control plane and a media plane in the call processing system are separated. The application service device is configured to implement a function of the control plane, for example, to control the application media device to exchange data of an interactive service with the terminal device. The application media device is configured to implement a function of the media plane, for example, to establish the data channel with the terminal device, and exchange the data of the interactive service. In this way, the interactive service in a call is implemented, and therefore efficiency of processing the call service by the call processing system is improved.

In a possible design, the application service device is further configured to send the first service page information to the application media device when detecting that the call service (a call) is connected. The application media device is further configured to receive the first service page information.

It can be learned that, when the call service is connected, the application service device may deliver initial service page information to the application media device.

In a possible design, the application media device is further configured to: receive user operation information of the terminal device, convert the user operation information into audio information, and send the audio information to a call center through a media channel between the terminal device and the call center. The audio information may be a dual tone multi-frequency (DTMF) signal.

It can be learned that the application media device may further convert the user operation information into the DTMF signal, and send the DTMF signal to the call center, so that the call center updates a media stream of the call with the terminal device, to implement synchronization between the interactive service and the call service. In addition, the DTMF signal is an in-band signal, and the call center may directly process the DTMF signal, to simplify a processing procedure.

In a possible design, the application media device is further configured to serially connect the terminal device, the application media device and the call center to form a media channel when the call service is connected.

It can be learned that, after converting the user operation information into the audio information, the application media device may serially connect the terminal device, the application media device and the call center to form the media channel between the terminal device and the call center, so as to send the audio information to the call center through the media channel.

In a possible design, the media channel is an audio/video media channel.

In a possible design, the media channel is used to transmit multimedia data. The multimedia data includes audio data and video data.

In a possible design, the application service device is configured to send the data channel establishment indication message to the application media device through a signaling interface when detecting that the terminal device initiates or receives the call service. Correspondingly, the application media device receives the data channel establishment indication message from the application service device through the signaling interface.

It can be learned that the application service device and the application media device may exchange signaling through the signaling interface.

In a possible design, that the application service device detects that the terminal device initiates or receives the call service may include: The application service device receives a called start event from a telephony server, and determines, based on the called start event, that the terminal device receives the call service. Alternatively, the application service device receives a data channel establishment request message from the terminal device, and determines, based on the data channel establishment request message, that the terminal device initiates or receives the call service.

It can be learned that, when the terminal device is a called-side terminal device, the application service device may determine, based on the called start event or the data channel establishment request message, that the terminal device receives the call service, to establish the data channel with the terminal device.

In a possible design, that the application server detects that the terminal device receives the call service may include: The application service device receives a call answer message from a telephony server or the terminal device, and determines, based on the call answer message, that the terminal device receives the call service.

In a possible design, the call answer message is a 200 ok message.

In a possible design, the application media device is further configured to: receive data of the terminal device through the data channel, and send the data of the terminal device to the application service device. The application service device is further configured to: receive the data of the terminal device, obtain the user operation information of the terminal device from the data of the terminal device, and send the user operation information of the terminal device to the application media device.

It can be learned that the application media device is configured to provide data channels. The data channel between the application media device and the terminal device is used to receive the data of the terminal device, or send data to the terminal device. A data channel between the application media device and the application service device is used by the application media device to send the data of the terminal device to the application service device, or used by the application service device to send the user operation information of the terminal device to the application media device.

In a possible design, the application media device is further configured to receive the user operation information from the terminal device through the data channel.

It can be learned that the application media device may directly receive the user operation information from the terminal device through the data channel between the application media device and the terminal device.

In a possible design, the application media device is further configured to: receive data of the terminal device through the data channel, and send the data of the terminal device to the application service device. The application service device is further configured to: obtain a call start event, a call notification message, or a call connection event in the data of the terminal device, and send first service page information corresponding to the call start event, the call notification message, or the call connection event to the application media device.

It can be learned that, when the data of the terminal device includes the call start event, the call notification message, or the call connection event, the application service device may obtain the corresponding first service page information (namely, the initial service page information) based on the call start event, the call notification message, or the call connection event, and send the initial service page information to the application media device through the data channel. Then, the application media device sends the initial service page information to the terminal device.

In a possible design, the application service device is configured to: receive a data channel establishment request message of the terminal device, and send the data channel establishment indication message to the application media device in response to the data channel establishment request message.

It can be learned that the data channel establishment indication message sent by the application service device to the application media device is determined based on the data channel establishment request message of the terminal device.

In a possible design, the application service device is further configured to: receive the user operation information of the terminal device, and send second service page information corresponding to the user operation information to the application media device.

It can be learned that, when the terminal device interacts with a UI page (or referred to as a UI), the corresponding user operation information may be sent to the application service device through a data channel, so that the application service device obtains the corresponding second service page information based on the user operation information, and sends the second service page information corresponding to the user operation information to the terminal device through the application media device. Therefore, the terminal device updates the UI page in a call interface.

In a possible design, the application media device is further configured to send page indication information to the terminal device through the data channel, where the page indication information indicates the terminal device to display a UI page corresponding to the first service page information or buffer the UI page.

It can be learned that, after receiving the first service page information, the terminal device may determine, based on the page indication information, whether to directly display the UI page or first buffer the UI page, so that the terminal device can implement the interactive service in the call more flexibly.

In a possible design, the application media device is further configured to: receive service termination operation information from the terminal device through the data channel, and send the service termination operation information of the terminal device to the application service device. The application service device is further configured to send a data channel release indication message to the application media device, to indicate the application media device to release the data channel with the terminal device. The service termination operation information of the terminal device indicates to terminate the interactive service in the call.

It can be learned that, when the terminal device terminates the interactive service in the call, for example, a user selects a human customer service, the terminal device may send the service termination operation information to the application media device through the data channel, and the application media device sends the service termination operation information to the application service device, so that the application service device may indicate the application media device to release the data channel with the terminal device, to avoid a waste of resources.

In a possible design, the application service device is further configured to: receive a call end event from the telephony server, and send a data channel release indication message to the application media device based on the call end event, to indicate the application media device to release the data channel with the terminal device.

It can be learned that, the application service device may further obtain the data channel release indication message based on the call end event reported by the telephony server, and send the data channel release indication message to the application media device through the data channel, to indicate the application media device to release the data channel, to avoid a waste of data resources.

In a possible design, when detecting that the terminal device initiates or receives the call service, the application service device sends a data channel establishment indication message to the application media device if authentication on the terminal device succeeds, to indicate the application media device to establish a data channel with the terminal device. An authentication manner of the terminal device includes one or more of access authentication, third-party login authentication, user name and password login authentication, or authentication by a device management DM server.

It can be learned that, before indicating the application media device to establish the data channel with the terminal device, the application service device may verify, to a corresponding server based on the authentication manner of the UE, whether the terminal device is a valid device, to avoid access of an unauthorized user and ensure security of the call processing system.

According to a second aspect, an embodiment of this application provides a call processing system. The call processing system includes an application service device and an application media device. The application service device is configured to: establish a data channel with a terminal device when detecting that the terminal device initiates or receives a call service, send first service page information corresponding to the call service to the terminal device through the data channel, receive user operation information from the terminal device through the data channel, and send the user operation information to the application media device. The application media device is configured to: receive the user operation information from the application service device, convert the user operation information into audio information, and send the audio information to a call center through a media channel between the terminal device and the call center.

It can be learned that, the application service device in the call processing system includes both a function of a control plane and a function of a media plane, and is mainly configured to exchange data with the terminal device and control the application media device to send the audio information to the call center, so that the original call service can be associated with an interactive data channel service. In addition, after the call service is connected, the first service page information (namely, initial service page information) is sent to the terminal device through the data channel, so that the terminal device can implement an interactive service in a call. In this way, efficiency of processing the call service by the call processing system is improved.

In a possible design, the application media device is further configured to serially connect the terminal device, the application media device and the call center to form a media channel when the call service is connected, so as to send the audio information to the call center through the media channel between the terminal device and the call center. Specifically, the application media device is configured to: establish a media channel with the call center when the call service is connected, and send the audio information to the call center through the media channel.

It can be learned that the application media device may be placed into the media channel between the terminal device and the call center in a serial connection manner, to help implement synchronization between the interactive service in the data channel and announcement playback in the media channel.

In a possible design, the application service device is configured to: receive a call start event or a call request from a telephony server, and determine, based on the call start event or the call request, that the terminal device initiates or receives the call service. Alternatively, the application service device is configured to: receive a data channel establishment request message from the terminal device, and determine, based on the data channel establishment request message, that the terminal device initiates or receives the call service.

In a possible design, the call request message is an invite message.

In a possible design, the application service device is configured to: receive a call answer message from a telephony server or the terminal device, and determine, based on the call answer message, that the terminal device receives the call service.

In a possible design, the call answer message is a 200 ok message.

It can be learned that that the application service device detects that the terminal device initiates or receives the call service may be determined based on the call start event reported by the telephony server, or may be determined based on the data channel establishment request message reported by the terminal device.

In a possible design, the application service device is further configured to obtain first service page information corresponding to the call start event; and the application service device sends the first service page information to the terminal device through the data channel. Optionally, the application service device may specifically obtain, based on a called number included in the call start event, first service page information corresponding to the called number.

In a possible design, the application service device is further configured to obtain, based on a calling number included in the call start event, first service page information corresponding to the calling number. The foregoing design may be used in a scenario in which the terminal device receives the call service.

It can be learned that the application service device may obtain the corresponding first service page information based on the call start event, and send the corresponding first service page information to the terminal device.

In a possible design, the application service device is further configured to: obtain second service page information corresponding to the user operation information based on the user operation information, and send the second service page information to the terminal device through the data channel.

It can be learned that the application service device may push the corresponding second service page information to the terminal device based on the user operation information, so that the terminal device may obtain a UI page corresponding to a user operation.

In a possible design, the application service device is further configured to send page indication information to the terminal device through the data channel, where the page indication information indicates the terminal device to display a UI page corresponding to the service page information or buffer the UI page.

It can be learned that the application service device may send the page indication information to the terminal device, to indicate the terminal device to directly display or buffer the corresponding UI page.

In a possible design, the application service device is further configured to: receive service termination operation information from the terminal device, and release the data channel with the terminal device based on the service termination operation information. The service termination operation information of the terminal device indicates to terminate the interactive service in the call.

It can be learned that, when the terminal device terminates the interactive service in the call, for example, a user selects a human customer service, the terminal device may send the service termination operation information to the application service device through the data channel. The application service device may release the data channel with the terminal device based on the service termination operation information sent by the terminal device.

In a possible design, the application service device is further configured to: receive a call end event from the telephony server, and release the data channel with the terminal device based on the call end event.

It can be learned that, the application service device may further obtain a data channel release indication message based on the call end event reported by the telephony server, and release the data channel, to avoid a waste of data resources.

In a possible design, when detecting that the terminal device initiates or receives the call service, the application service device sends a data channel establishment indication message to the application media device if authentication on the terminal device succeeds, to indicate the application media device to establish a data channel with the terminal device. An authentication manner of the terminal device includes one or more of access authentication, third-party login authentication, user name and password login authentication, or authentication by a device management DM server.

It can be learned that, before indicating the application media device to establish the data channel with the terminal device, the application service device may verify, to a corresponding server based on the authentication manner of the UE, whether the terminal device is a valid device, to avoid access of an unauthorized user and ensure security of the call processing system.

According to a third aspect, an embodiment of this application provides a call processing method. The method may be implemented through interaction between an application service device and an application media device. The application service device has a function of a control plane, and the application media device has functions of a DC data plane and a media plane, that is, the control plane and the media plane are separated.

The application service device sends a data channel establishment indication message to the application media device when detecting that a terminal device initiates or receives a call service, to indicate the application media device to establish a data channel with the terminal device. The application media device receives the data channel establishment indication message from the application service device, establishes the data channel with the terminal device, and sends service page information corresponding to the call service to the terminal device through the data channel.

In a possible design, the application media device receives user operation information of the terminal device, converts the user operation information into audio information, and sends the audio information to a call center through a media channel between the terminal device and the call center.

In a possible design, the application media device receives data of the terminal device through the data channel, and sends the data of the terminal device to the application service device. The application service device receives the data of the terminal device, obtains the user operation information of the terminal device from the data of the terminal device, and sends the user operation information of the terminal device to the application media device.

In a possible design, the application media device receives the user operation information from the terminal device through the data channel.

In a possible design, the application service device sends first service page information to the application media device when detecting that the call service is connected. Correspondingly, the application media device receives the first service page information.

In a possible design, the application media device receives data of the terminal device through the data channel, and sends the data of the terminal device to the application service device. Correspondingly, the application service device receives the data of the terminal device. The application service device obtains a call start event, a call notification message, or a call connection event in the data of the terminal device, and sends first service page information corresponding to the call start event, the call notification message, or the call connection event to the application media device.

In a possible design, the application service device receives a data channel establishment request message of the terminal device, and sends the data channel establishment indication message to the application media device in response to the data channel establishment request message.

In a possible design, the application service device receives the user operation information of the terminal device, and sends second service page information corresponding to the user operation information to the application media device.

In a possible design, the application media device sends page indication information to the terminal device through the data channel, where the page indication information indicates the terminal device to display a UI page corresponding to the first service page information or buffer the UI page.

According to a fourth aspect, an embodiment of this application provides another call processing method. The method may be implemented through interaction between an application service device and an application media device.

The application service device establishes a data channel with a terminal device when detecting that the terminal device initiates or receives a call service, sends first service page information corresponding to the call service to the terminal device through the data channel, receives user operation information from the terminal device through the data channel, and sends the user operation information to the application media device. The application media device receives the user operation information from the application service device, converts the user operation information into audio information, and sends the audio information to a call center through a media channel between the terminal device and the call center.

In a possible design, the application media device serially connects the terminal device, the application media device and the call center to form the media channel when the call service is connected.

In a possible design, the application service device receives a call start event from a telephony server, and determines, based on the call start event, that the terminal device initiates or receives the call service. Alternatively, the application service device receives a data channel establishment request message from the terminal device, and determines, based on the data channel establishment request message, that the terminal device initiates or receives the call service.

In a possible design, the application service device obtains first service page information corresponding to the call start event, and sends the first service page information to the terminal device through the data channel.

In a possible design, the application service device obtains, based on a called number included in the call start event, first service page information corresponding to the called number.

In a possible design, the application service device obtains, based on a calling number included in the call start event, first service page information corresponding to the calling number. The foregoing design may be used in a scenario in which the terminal device receives the call service.

In a possible design, the application service device obtains second service page information corresponding to the user operation information based on the user operation information, and sends the second service page information to the terminal device through the data channel.

In a possible design, the application service device sends page indication information to the terminal device through the data channel, where the page indication information indicates the terminal device to display a UI page corresponding to the service page information or buffer the UI page.

According to a fifth aspect, an embodiment of this application provides a call processing apparatus. The device has a function of implementing the call processing method provided in the third aspect. The function may be implemented by hardware, or may be implemented by hardware by executing corresponding software. The hardware or the software includes one or more modules corresponding to the function.

According to a sixth aspect, an embodiment of this application provides a call processing apparatus. The device has a function of implementing the call processing method provided in the fourth aspect. The function may be implemented by hardware, or may be implemented by hardware by executing corresponding software. The hardware or the software includes one or more modules corresponding to the function.

According to a seventh aspect, an embodiment of this application provides a computer-readable storage medium. The readable storage medium includes a program or instructions. When the program or the instructions are run on a computer, the computer is enabled to perform some or all methods according to any one of the third aspect or the possible implementations of the third aspect.

According to an eighth aspect, an embodiment of this application provides a computer-readable storage medium. The readable storage medium includes a program or instructions. When the program or the instructions are run on a computer, the computer is enabled to perform some or all methods according to any one of the fourth aspect or the possible implementations of the fourth aspect.

According to a ninth aspect, an embodiment of this application provides a chip or a chip system. The chip or the chip system includes at least one processor and an interface. The interface and the at least one processor are interconnected through a line. The at least one processor is configured to run a computer program or instructions, to perform some or all methods according to any one of the third aspect or the possible implementations of the third aspect.

According to a tenth aspect, an embodiment of this application provides a chip or a chip system. The chip or the chip system includes at least one processor and an interface. The interface and the at least one processor are interconnected through a line. The at least one processor is configured to run a computer program or instructions, to perform some or all methods according to any one of the fourth aspect or the possible implementations of the fourth aspect.

The interface in the chip may be an input/output interface, a pin, a circuit, or the like.

The chip system in the foregoing aspects may be a system on chip (SoC), a baseband chip, or the like. The baseband chip may include a processor, a channel encoder, a digital signal processor, a modem, an interface module, and the like.

In a possible implementation, the chip or the chip system described above in this application further includes at least one memory, and the at least one memory stores computer instructions. The memory may be a storage unit inside the chip, for example, a register or a cache, or may be a storage unit (for example, a read-only memory or a random access memory) of the chip.

According to an eleventh aspect, an embodiment of this application provides a computer program or a computer program product, including code or instructions. When the code or the instructions are run on a computer, the computer is enabled to perform some or all methods according to any one of the third aspect or the possible implementations of the third aspect.

According to a twelfth aspect, an embodiment of this application provides a computer program or a computer program product, including code or instructions. When the code or the instructions are run on a computer, the computer is enabled to perform some or all methods according to any one of the fourth aspect or the possible implementations of the fourth aspect.

According to a thirteenth aspect, an embodiment of this application provides a call processing apparatus, including a processor and a memory. The memory stores computer instructions, and the processor invokes the computer instructions, so that the call processing apparatus performs some or all method procedures according to any one of the foregoing aspects.

In a possible design, the call processing apparatus is an application service device.

In a possible design, the call processing apparatus is an application media device.

BRIEF DESCRIPTION OF THE DRAWINGS

To describe technical solutions of embodiments of this application more clearly, the following briefly describes the accompanying drawings for describing embodiments.

FIG. 6A to FIG. 6E are a schematic diagram of a procedure of processing an interactive service in a call according to an embodiment of this application;

FIG. 10A to FIG. 10D are a schematic diagram of another procedure of processing an interactive service in a call according to an embodiment of this application;

DETAILED DESCRIPTION OF ILLUSTRATIVE EMBODIMENTS

Figure 1:
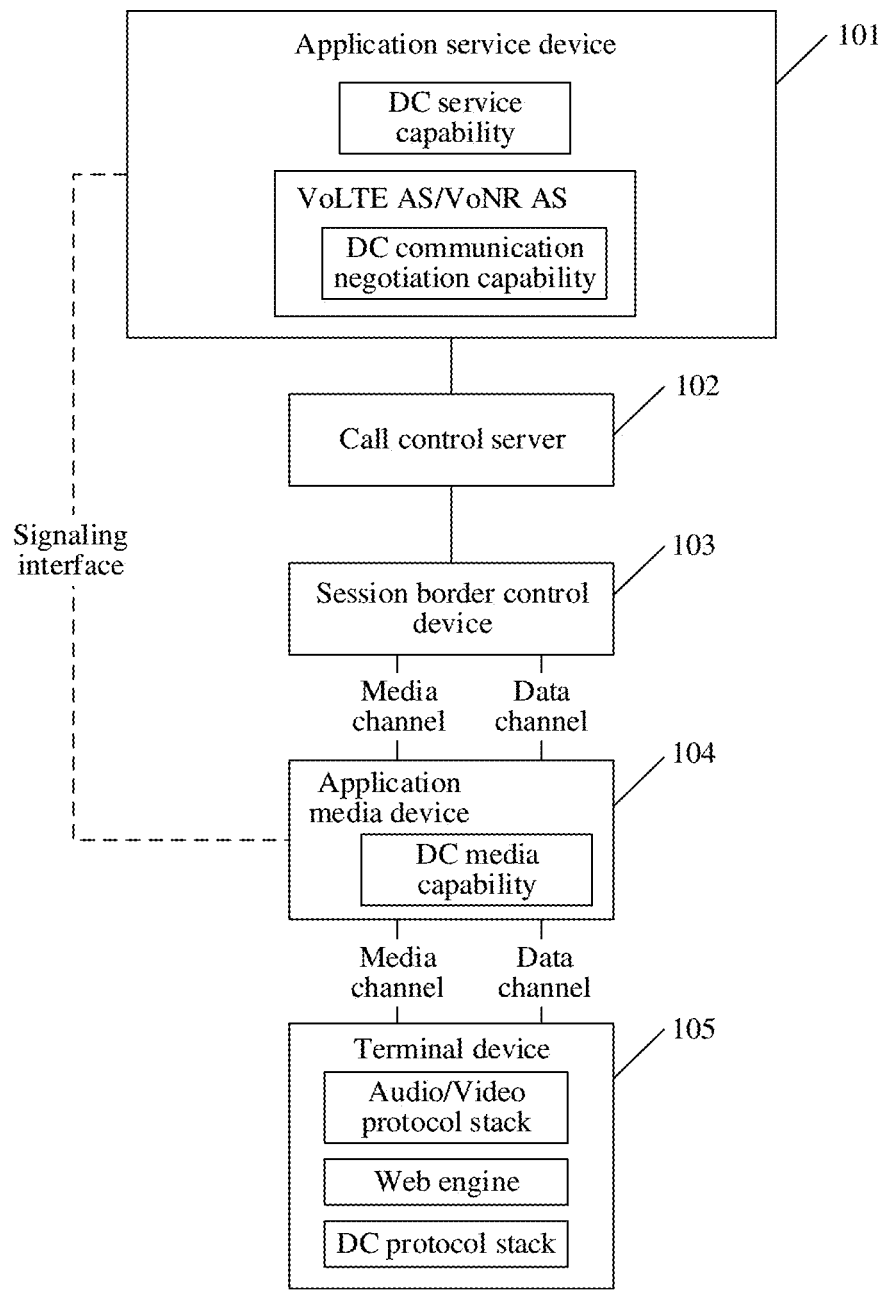
FIG. 1 is a schematic structural diagram of a call processing system according to an embodiment of this application.

The following describes technical solutions in embodiments of this application with reference to the accompanying drawings in embodiments of this application.

In embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term such as "example" or "for example" is intended to present a relative concept in a specific manner.

In embodiments of this application, the terms "second" and "only" are used for the purpose of description, and shall not be understood as indicating or implying relative importance or implicitly indicating a quantity of indicated technical features. Therefore, a feature limited by "second" or "only" may explicitly or implicitly include one or more such features. In descriptions of this application, unless otherwise specified, "a plurality of" means two or more than two.

The term "at least one" in this application means one or more, and the term "a plurality of" in this application means two or more. For example, a plurality of packets mean two or more packets.

It should be understood that the terms used in descriptions of various examples in this specification are merely intended to describe specific examples, but are not intended to constitute a limitation. The terms "one" ("a" and "an") and "the" of singular forms used in the descriptions of the various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, and B may alternatively be determined based on A and/or other information.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

The following describes technical solutions in embodiments of this application with reference to the accompanying drawings in embodiments of this application.

A telecommunication network call center that is based on an IP multimedia subsystem (IMS) is widely used in industries such as telecommunication, bank, insurance, and consumption industries, and is usually referred to as an automatic agent, a customer center, or a customer service hotline.

In an aspect, an interactive voice response (IVR) is a voice platform of the customer service hotline, and can provide multi-level voice menus and answer calls through pre-recorded or synthesized voices. In this way, the IVR provides a voice menu navigation function for customers when the customers make incoming calls. However, when using an IVR voice navigation service, a mobile user needs to carefully or even repeatedly listen to the voice navigation to select a correct key option, causing a call processing delay and reducing processing efficiency of the customer service hotline.

In another aspect, a voice customer service is introduced to the call center/customer service hotline. The voice customer service is based on an automatic speech recognition (ASR) technology, to be specific, voice recognition is performed by using artificial intelligence (AI), to perform service interaction based on a voice recognition result. However, due to impact of regional dialects, accent differences, speaking habits, unique terms in various industries, and the like, voice recognition accuracy of the voice customer service is low, and therefore processing accuracy and processing efficiency of the voice customer service are reduced.

In still another aspect, the mobile user may also implement, through a terminal device having an interactive service function, an IMS session service procedure that is based on 3GPP TS 24.229 and an interaction procedure in an audio/video/fax/text manner supported through session initiation protocol negotiation (SIP OA), and the terminal device also supports dual tone multi-frequency (DTMF) announcement playback and digit collection. However, an interactive operation of the user on the terminal device during a call can be implemented only by terminals of various vendors based on a standard. If a feature/function is added, a standard needs to be formulated first, and then terminal vendors perform development and network access authentication. As a result, an implementation periodicity is long and implementation depends on a plurality of terminal vendors.

To resolve the foregoing problems, embodiments of this application provide a call processing system. The call processing system can implement an interactive service in a call, and therefore efficiency of processing the interactive service (for example, a customer service hotline service) in the call by the call processing system is improved. It may be understood that, the interactive service in the call in embodiments of this application includes an IMS session service procedure in 3GPP TS 24.229 and an interactive service in an IMS that is exchanged in an audio/video/fax/text manner supported through SIP OA negotiation.

A call processing system provided in an embodiment of this application includes an application service device, an application media device, a content server (CS), a telephony application server (TAS), a call control server, a session border control device (SBC), a call center, and a terminal device.

The application service device may be an enriched calling application server (ECS-AS), the application media device may be an enriched calling media (enriched calling media, ECM) device, and the call control server may be a call session control function (CSCF) device.

The ECS-AS is configured to provide an interactive service in a call, and is a newly added logical device in the call processing system. A manner of newly addition may be that the ECS-AS is an independent logical device, or may be combined with a multimedia telephony server (MMTEL AS) (in other words, functions of the ECS-AS are combined into the MMTEL AS). This is not limited in this embodiment. For different terminal devices, interaction manners between the ECS-AS and the terminal device are different. For example, when the ECS-AS interacts with a plug-in terminal, the ECS-AS directly establishes a data channel (DC) with the plug-in terminal to transfer interactive service content. The ECS-AS may further control the ECM to provide a DTMF announcement playback function. For another example, when the ECS-AS interacts with a native terminal, the ECS-AS controls the ECM to establish a data channel with the native terminal to transfer interactive service content.

The ECM is configured to establish a data channel with the terminal device or provide the DTMF announcement playback function under control of the ECS-AS. The ECS-AS and the ECM may be deployed on a same physical device, or may be separately deployed on different physical devices. This is not limited in this embodiment. When the ECS-AS and the ECM are deployed on different physical devices, a control protocol between the ECS-AS and the ECM may be a media gateway control protocol (the H.248 protocol) or a hypertext transfer protocol (HTTP).

The CS is configured to store data related to an interactive service. For example, the CS stores a user interface (UI) page element and a control file. The CS may be deployed on a same physical device as the ECS-AS, or may be separately deployed on a physical device. When the CS is separately deployed on a physical device, an address of the CS may be carried in a uniform resource locator (URL) address message sent by the ECS-AS to the terminal device, to notify the terminal device of the address of the CS. Alternatively, the address of the CS may be carried in a message sent by a device management (DM) server to the terminal device. This is not limited in this embodiment.

The TAS is configured to provide a voice service and a multimedia service for the terminal device, and supports a plurality of mainstream telecommunication network protocols, for example, an SIP and an intelligent network application protocol (INAP). In this embodiment of this application, the ECS-AS may subscribe to a call event from the TAS. In this case, after receiving INVITE call signaling (which may be referred to as an invite message), the TAS may report a call start event to the ECS-AS.

As a call control center of an IMS core, the CSCF may implement functions such as user access, authentication, session routing, and service triggering on an IP transmission platform. The CSCF may include a serving CSCF (S-CSCF), an interrogating CSCF (I-CSCF), and the like.

The SBC may be deployed between an access network and a core network, and provide a border control function between the access network and an IMS core network and between IMS core networks. The SBC can provide functions such as access control, quality of service control, and firewall traversal. The call processing system in this embodiment of this application includes a calling SBC and a called SBC (also referred to as a called media resource device (MRF)), where the calling SBC serves a calling device, and the called SBC serves a called device. The SBC may include a function of a proxy CSCF (P-CSCF), in other words, the P-CSCF may be deployed in the SBC.

The call center uses functions such as an IVR, and may process a large quantity of incoming and outgoing call services and service operations. In other words, the call center is a service organization including a group of service personnel in a centralized place. Usually, the call center uses computer communication technologies to handle consultation requirements from enterprises and customers.

The terminal device may also be referred to as user equipment (UE). The terminal device may be a mobile phone, a tablet computer (pad), a computer having a wireless transceiver function, a virtual reality (VR) terminal, an augmented reality (AR) terminal, a vehicle, a wireless terminal in industrial control, a wireless terminal in self driving, a wireless terminal in a smart city, or the like.

In an example, FIG. 1 is a schematic diagram of a structure of a call processing system according to an embodiment of this application. The call processing system includes an application service device 101, a call control server 102 (including an S-CSCF/I-CSCF), a session border control device 103 (including a P-CSCF), an application media device 104, and a terminal device 105.

A network side architecture of the call processing system is in a mode of separating a data channel (DC) service capability, a DC communication negotiation capability, and a DC media capability. The DC service capability is responsible for receiving data content provided by an application or the terminal device and performing related logic processing, and may be integrated into the application service device shown in FIG. 1. The DC communication negotiation capability includes a SIP OA negotiation process, and may be integrated into a VoLTE (Voice over LTE) AS or a VoNR (VoNR) AS shown in FIG. 1. The VoLTE AS and the VoNR AS may be deployed in an MMTEL AS. The DC media capability is integrated into the application media device, and is used to implement call services and DC data services with the terminal device, as shown in FIG. 1.

Specifically, the MMTEL AS in FIG. 1 may be disposed in the application service device 101; in other words, the application service device 101 shown in FIG. 1 integrates the DC service capability and the DC communication negotiation capability, and may implement a control plane function of the call processing system. Optionally, the MMTEL AS may alternatively be separated from the application service device, and is separately disposed in a device, to implement the DC communication negotiation capability. The application media device 104 provides the DC media capability; in other words, the application media device 104 may implement a media plane function of the call processing system. For example, the application media device 104 establishes a data channel and a media channel with the terminal device, sends DC service data to the terminal device through the data channel, and sends multimedia data to the terminal device through the media channel. The application service device 101 may control, through a signaling interface, the data channel of the application media device 104 to transmit the DC service data, and control the media channel to transmit the multimedia data. The terminal device 105 includes an audio/video protocol stack, a DC protocol stack, and a web engine; in other words, the terminal device may implement a call, and may implement an interactive service in the call.

In an implementation, the terminal device in this embodiment of this application is a plug-in terminal. A plug-in terminal shown in FIG. 2a may include modules such as an enriched calling engine, an operating system, a telephony management application, and a coprocessor (CP). In the terminal shown in FIG. 2a, the telephony management application may invoke an enriched call, to be specific, the telephony management application and an enriched calling engine APP may be started at the same time, and cooperate to implement a call service provided in this embodiment. The enriched calling engine APP and the telephony management application run on an application processor (AP) of the terminal. The coprocessor CP is also referred to as a baseband chip plus a coprocessor or a multimedia accelerator, and may enhance a multimedia function. The CP in FIG. 2a supports a SIP, a session description protocol (SDP), an audio/video real-time transport protocol (RTP), and the like. According to the foregoing protocols, the terminal device may initiate, modify, or terminate an interactive multimedia session, to implement an interactive service in a call. The enriched calling engine in FIG. 2a may be used as an independent APP to provide a corresponding function, and the enriched calling engine may include a DC UI and a web engine. The web engine is configured to parse a UI page, and the DC UI is configured to display the UI page parsed by the web engine.

Figure 2A:
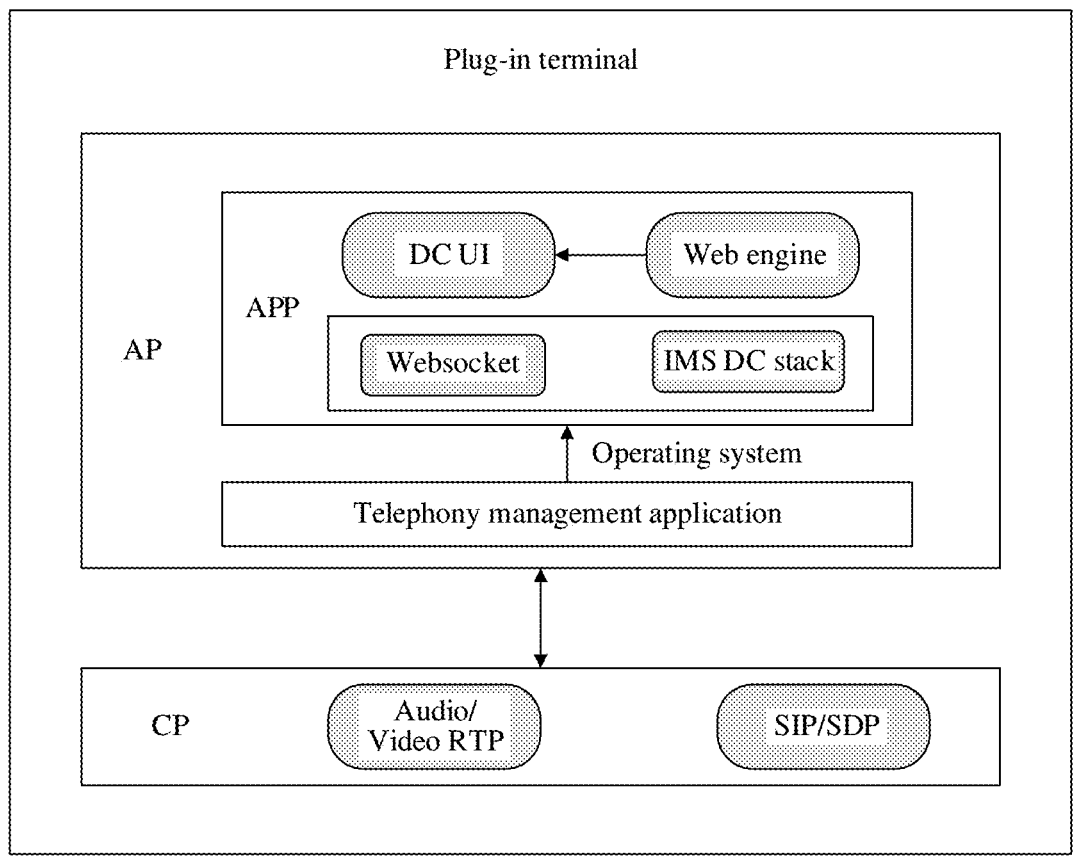
FIG. 2a is a schematic structural diagram of a plug-in terminal according to an embodiment of this application.
Figure 2B:
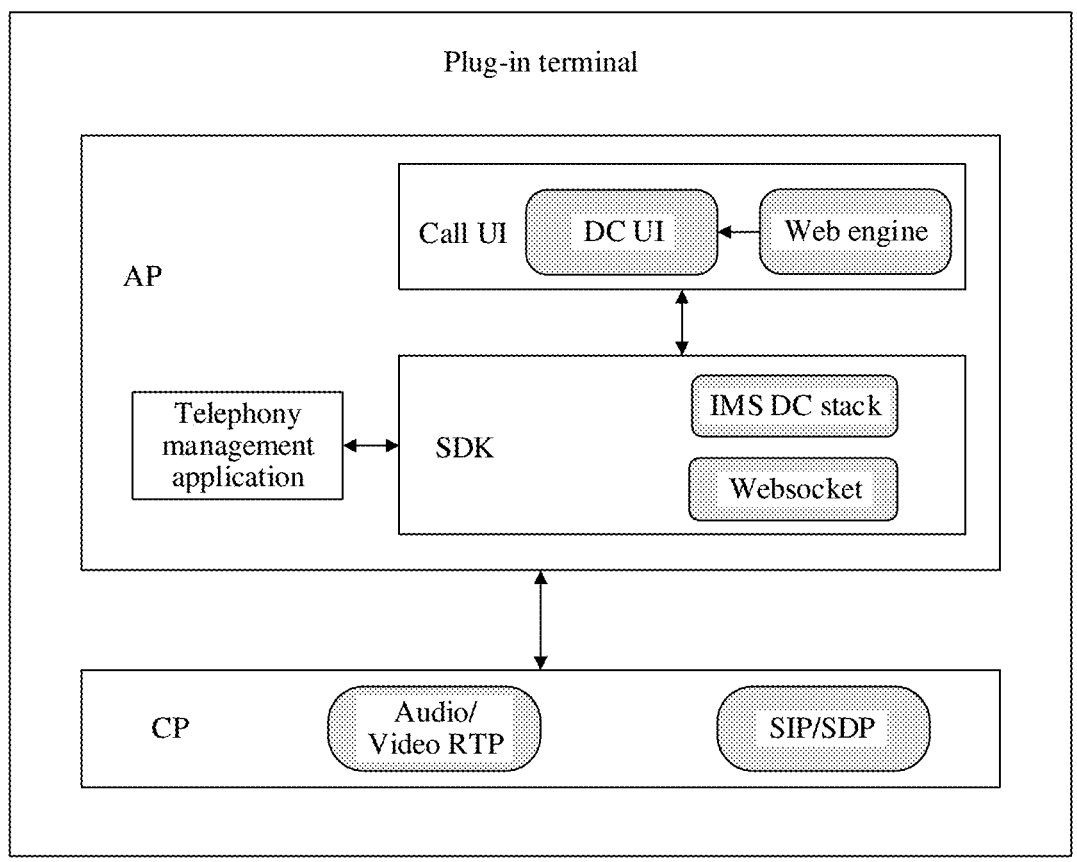
FIG. 2b is a schematic structural diagram of another plug-in terminal according to an embodiment of this application.

FIG. 2b is a schematic structural diagram of another plug-in terminal according to an embodiment of this application. An enriched calling engine in FIG. 2b may directly serve as a system service (for example, implemented by using a native software development kit (SDK)) in the terminal to provide a corresponding function. FIG. 2b also includes a DC UI and a web engine, configured to implement functions similar to those of the DC UI and the web engine shown in FIG. 2a. Details are not described herein again.

In the plug-in terminals shown in FIG. 2a and FIG. 2b, a DC protocol stack of an SDK solution may include but is not limited to a stream control transmission protocol (SCTP), a datagram transport layer security (DTLS) protocol, a user datagram protocol (UDP), and the like. The foregoing protocols may be negotiated by using a websocket in the AP. For example, port numbers of a transmit end and a receive end, internet protocol (IP) addresses, and the like are negotiated by using the websocket, to establish an IP connection between the transmit end and the receive end. Optionally, the plug-in terminal device may further support another protocol stack (for example, an HTTP protocol stack). This is not limited in this embodiment.

Figure 3:
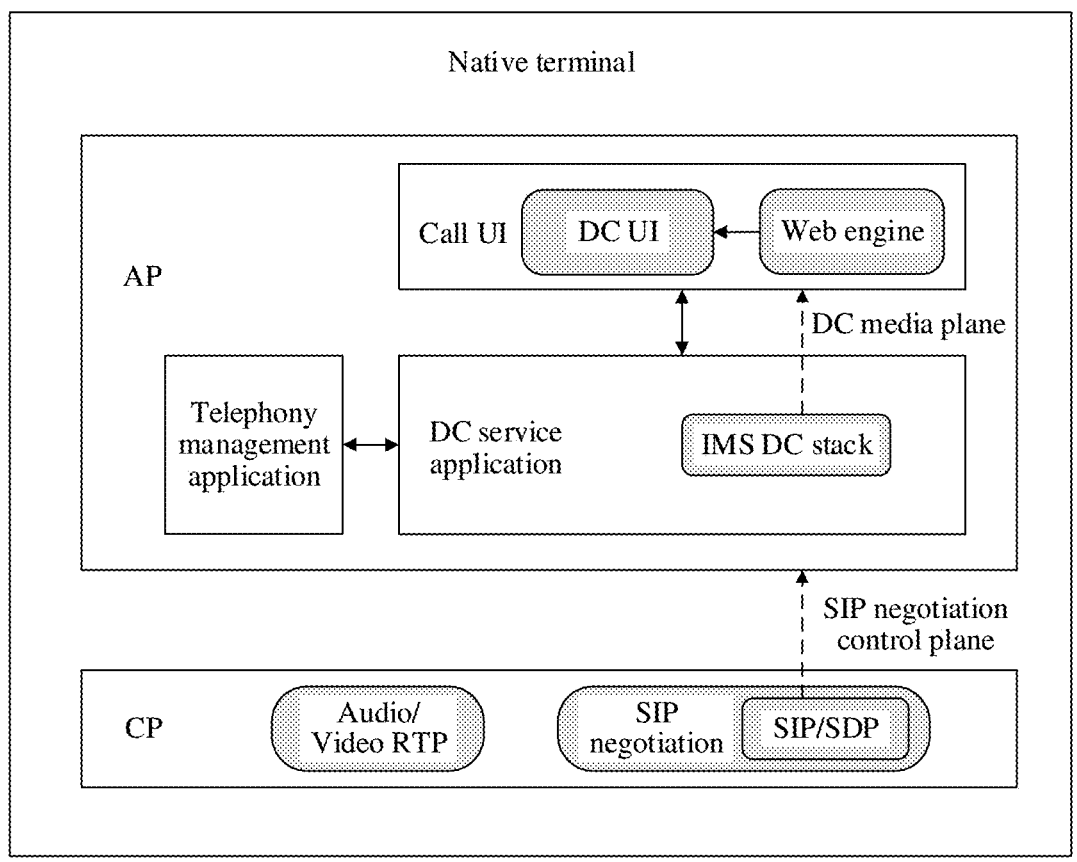
FIG. 3 is a schematic structural diagram of a native terminal according to an embodiment of this application.

In another implementation, the terminal device in this embodiment of this application is a native terminal. With reference to FIG. 3, different from the plug-in terminal, the native terminal is a DCMTSI (data channel multimedia telephony service for IMS) client that does not require an enriched calling engine and complies with 3GPP TS 26.114-g52 and a protocol standard of a subsequent version. The native terminal includes an application processor AP and a coprocessor CP. The application processor may run a telephony management application, a call UI application, and a DC service. When the telephony management application makes or answers a call, a data channel is established through SIP signaling negotiation of the CP. A DC protocol stack of the native terminal includes but is not limited to an SCTP/DTLS/UDP protocol, and may be negotiated by using a SIP in the CP (in other words, a built-in websocket is not required).

In the call processing system shown in FIG. 1, a plug-in terminal is used as an example, and a data channel is established between the plug-in terminal and the application media device. It indicates that the DC media capability/data channel establishment is terminated at the application media device. The application media device sends data in the data channel (for example, data sent by the terminal device to the application media device through the data channel) to the application service device through the signaling interface. The application service device identifies the data in the data channel and controls execution of a DC service, for example, indicates the application media device to send corresponding UI page content to the terminal device through the data channel. Similarly, when the terminal device is a native terminal, a data channel is also established between the native terminal and the application media device. It indicates that the DC media capability/data channel establishment is terminated at the application media device.

The following describes in detail functions of the application service device, the application media device, and the terminal device in the call processing system shown in FIG. 1, a connection relationship between the devices, and a data/signaling flow direction between the devices.

The application service device is configured to implement the DC service capability and the DC communication negotiation capability, and may be considered as a control plane device of the call processing system. The application media device is configured to implement the DC media capability and data channel establishment, and may be considered as a media plane device of the call processing system. In other words, a control plane and a media plane in the call processing system shown in FIG. 1 are separated. The application service device and the application media device may be connected through a signaling interface, and a data channel is established between the application media device and the terminal device, as shown in FIG. 1.

In an implementation, the application service device is configured to send a data channel establishment indication message to the application media device when detecting that the terminal device initiates or receives a call service, to indicate the application media device to establish a data channel with the terminal device. The application media device is configured to: receive the data channel establishment indication message from the application service device, establish the data channel with the terminal device, and send first service page information corresponding to the call service to the terminal device through the data channel.

If the application service device subscribes to a call event from a telephony server TAS, when the terminal device initiates or receives the call service, the application service device may detect that the terminal device initiates or receives the call service. There are two cases in which the application service device detects that the terminal device initiates or receives the call service.

Case 1: The application service device receives a call start event from the telephony server, and determines, based on the call start event, that the terminal device initiates or receives the call service.

For example, a specific manner of triggering the application service device to receive the call start event from the TAS is as follows: A user makes a call, the terminal device sends INVITE call signaling to a CSCF of a calling IMS core, the CSCF forwards the INVITE call signaling to the TAS, and the TAS reports the call start event to the application service device. Correspondingly, the application service device receives the call start event, and determines, based on the call start event, that the terminal device is initiating the call service.

Case 2: The application service device receives a data channel establishment request message from the terminal device, and determines, based on the data channel establishment request message, that the terminal device initiates or receives the call service.

For example, when a user makes a call, an operating system in the terminal device may notify an enriched calling engine that the call starts, and the enriched calling engine may send the data channel establishment request message to an ECS-AS. Correspondingly, the ECS-AS receives the data channel establishment request message, and determines, based on the data channel establishment request message, that the terminal device is initiating the call service.

In an implementation, the application service device is further configured to: receive a data channel establishment request message of the terminal device, and send the data channel establishment indication message to the application media device in response to the data channel establishment request message.

The application service device may further send the data channel establishment indication message to the application media device based on the data channel establishment request message of the terminal device, to indicate the application media device to establish the data channel with the terminal device. Correspondingly, the application media device receives the data channel establishment indication message, and establishes the data channel with the terminal device.

Optionally, before detecting that the terminal device initiates the call service and sending the data channel establishment indication information to the application media device, the application service device may further perform authentication on the terminal device. An authentication manner described in this embodiment may include bidirectional authentication between a calling side and a called side, or unidirectional authentication from the terminal device to the application service device. Specifically, the authentication manner of the terminal device includes one or more of access authentication, third-party login authentication, user name and password login authentication, or authentication by a device management DM server.

1. The access authentication is applicable to the terminal device implemented in an SDK manner shown in FIG. 2b, or the native terminal shown in FIG. 3. For example, a system service of the native terminal may implement bidirectional authentication between a calling side and a called side in an IMS generic bootstrapping architecture (GBA) manner.

2. The third-party login authentication is applicable to the terminal device implemented in an APP integration manner shown in FIG. 2a. For example, authentication on an APP in the terminal device by a gateway of an operator succeeds, and the user logs in with a local number with one-click authorization to complete unidirectional authentication from the terminal device to the application service device. The third-party login authentication manner that is based on the local number can avoid newly deploying an account server and managing a user name and account system, so that an implementation procedure of the solution is simplified.

3. The user name and password login authentication is applicable to the terminal device implemented in an APP integration manner shown in FIG. 2a. For example, the user completes unidirectional authentication from the terminal device to the application service device by entering a user name and a password.

4. Deploying the device management server is applicable to the terminal device implemented in a system service/APP integration manner shown in FIG. 2a, FIG. 2b, and FIG. 3. The authentication manner uses messages such as a 5th generation (5G) message, and an authentication token is obtained from the DM server by using the 5G message, to implement unidirectional authentication from the terminal device to the application service device.

After authentication on the terminal device succeeds, the application service device determines that the terminal device is a valid device, and sends the data channel establishment indication message to the application media device, to indicate the application media device to establish the data channel with the terminal device. Correspondingly, the application media device receives the data channel establishment indication message, and therefore establishes the data channel with the terminal device. The data channel may be an IMS data channel, and is used to transmit related data of an interactive service in a call. For example, the application media device sends, to the terminal device through the data channel, a UI page corresponding to the call service, so that the terminal device may display the UI page on a call interface for the user to interact and browse.

In an implementation, the application media device is further configured to: receive user operation information of the terminal device, convert the user operation information into audio information, and send the audio information to a call center through a media channel between the terminal device and the call center. The audio information in this embodiment includes a DTMF signal. For example, the application media device may convert the user operation information into the DTMF signal, and send the DTMF signal to the call center in an in-band manner. According to a protocol standard, an IMS session service procedure that is based on 3GPP TS 24.229 may support audio/video/fax/text interaction and DTMF announcement playback and digit collection through SIP OA negotiation. In other words, the application media device generates the audio information based on a user operation, and sends the audio information to the call center, to implement synchronization between the interactive service in the data channel and the DTMF announcement playback in the media channel.

Optionally, to implement synchronization between the interactive service in the data channel and the DTMF announcement playback in the media channel, the application media device may establish a media channel with the call center, and send the audio information to the call center through the media channel with the call center. When the call service is connected, the media channel is established between the terminal device and the call center. For example, a media channel is established between the terminal device and a calling SBC, a media channel is established between the calling SBC and a called IMS core, and a media channel is established between the called IMS core and the call center. It can be learned that the foregoing media channel may implement voice interworking between the terminal device and the call center. Based on this, the application media device may serially connect the terminal device, the application media device and the call center to form a media channel between the terminal device and the call center. For example, the application media device establishes a media channel with the calling SBC and a media channel with the called IMS core, to establish the media channel with the call center, and may send the audio information to the call center through the media channel.

In an implementation, the application service device is further configured to send the first service page information to the application media device when detecting that the call service (a call) is connected. The application media device is further configured to receive the first service page information.

There may be the following two cases in which the application service device detects that the call service is connected.

Case 1: The application service device receives a call connection event from the telephony server, and determines, based on the call connection event, that the call service of the terminal device is connected.

For example, the call center sends a 200 ok (200 for short) message to the called IMS core, to indicate that the call center starts announcement playback. The called IMS core sends a 200 message to the calling IMS core, and the CSCF in the calling IMS core sends a 200 message to the TAS. The TAS receives the 200 message sent by the CSCF, and determines that the call center starts the announcement playback. The TAS may send the call connection event to the application service device. Correspondingly, the application service device receives the call connection event sent by the TAS, and therefore determines that the call service between the terminal device and the call center is connected.

Case 2: The application service device receives a call notification message from the terminal device, and determines, based on the call notification message, that the call service of the terminal device is connected.

For example, the call center sends a 200 message to the called IMS core, to indicate that the call center starts announcement playback. The called IMS core sends a 200 message to the calling IMS core, the CSCF in the calling IMS core sends a 200 message to the TAS, and the TAS sends a 200 message to the terminal device. The terminal device receives the 200 message sent by the TAS, and determines that the call center starts the announcement playback. The terminal device may send the call notification message to the application service device. Correspondingly, the application service device receives the call notification message sent by the terminal device, and therefore determines that the call service between the terminal device and the call center is connected.

In this embodiment, the application service device sends the first service page information to the application media device after determining that the call service is connected. The first service page information may be initial service page information corresponding to the call service. For example, if the call service initiated by the terminal device is that the terminal device dials a customer service hotline of an operator, the application service device may obtain first service page information corresponding to a customer service hotline service of the operator when detecting that the terminal device dials the customer service hotline of the operator.

The first service page information includes a UI page element and a control file. The UI page element refers to all page elements that constitute a UI page, and may include but is not limited to a text, a text box, a picture, a video, and the like on the UI page. For example, the UI page described in this embodiment may be a hypertext markup language 5.0 (HTML5) page, and elements that constitute the entire HTML5 page, such as a text box, a picture, and a video in the HTML5 page, are all referred to as UI page elements. The control file refers to a JavaScript script (JS script for short) that can be used to edit the UI page. The JS script includes a rendering rule of the UI page, a display location of the UI page element, and an address or an identifier of a next-level UI page to which a directional UI page element points. For example, a UI page 1 includes a directional UI page element. After the user taps the UI page element, the terminal device may determine, based on a JS script, an address or an identifier of a next-level UI page to which the UI page element points, to display the next-level UI page on a display interface.

It can be learned that the terminal device combines the UI page element and the control file. In other words, the terminal device may display the UI page on the display interface of the terminal device, and provide an interactive operation for the user based on the control file. The first service page information in this embodiment may include UI page elements of a plurality of UI pages and a control file of each UI page.

Optionally, the first service page information may further include URL addresses of the UI page element and the control file. In other words, the first service page information does not directly include the HTML5 page, but includes a URL address of the HTML5 page. After receiving the URL address of the HTML5 page, the terminal device may determine, based on the URL address, a content server that stores the HTML5 page and the JS script, and obtain the HTML5 page and the JS script from the corresponding content server through a data channel.

In an implementation, the application media device is further configured to: receive data of the terminal device through the data channel, and send the data of the terminal device to the application service device. The application service device is further configured to: receive the data of the terminal device, obtain a call start event, a call notification message, or a call connection event in the data of the terminal device, and send first service page information corresponding to the call start event, the call notification message, or the call connection event to the application media device.

The application service device parses the received data of the terminal device, and may obtain the call start event, the call notification message, or the call connection event in the data of the terminal device. Further, the application service device may obtain the corresponding first service page information based on the call start event, the call notification message, or the call connection event. For example, the call start event usually includes a calling number and a called number. In this case, the application service device may obtain, based on the called number or the calling number, first service page information corresponding to the called number or the calling number. After obtaining the corresponding first service page information, the application service device may send the corresponding first service page information to the application media device. For another example, the application service device receives the call connection event, and determines that the call center starts to play a ring tone when the call is initially connected. In this case, the application service device may obtain an initial HTML5 page.

Optionally, after obtaining the first service page information, the application media device may send the first service page information to the terminal device through the data channel. Correspondingly, the terminal device receives the first service page information, and downloads an actual service page resource based on a page requirement. For example, the terminal device receives a URL address of an initial page, and obtains the initial page and a JS script from a corresponding content server based on the URL address of the initial page. After the call service is connected, the terminal device may display the initial page on a call interface. In this embodiment, after the application service device detects that the call service is connected, the terminal device displays an HTML5 page on the call interface. Therefore, after the terminal device receives the first service page information, if the call between the terminal device and the call center is not confirmed to be connected, the terminal device may first buffer the first service page information, that is, not display the HTML5 page.

Optionally, after detecting that the call service is connected, the application service device may further send page indication information to the application media device. Correspondingly, the application media device receives the page indication information from the application service device, and sends the page indication information to the terminal device through the data channel, where the page indication information indicates the terminal device to display the UI page corresponding to the first service page information or buffer the UI page. For example, if the terminal device receives and buffers the first service page information in advance, after the call service is connected, the application media device delivers the page indication information to the terminal device, to indicate the terminal device to display the initial HTML5 page. In this way, the terminal device may display the initial HTML5 page on the display interface.

In an implementation, the application media device is further configured to: receive data of the terminal device through the data channel, and send the data of the terminal device to the application service device. The application service device is further configured to: receive the data of the terminal device, obtain the user operation information of the terminal device from the data of the terminal device, and send the user operation information of the terminal device to the application media device.

Because the control plane is separated from the media plane, the application media device may receive the data of the terminal device through the data channel. In this case, the application media device, as a data relay role, may send the data of the terminal device to the application service device. The application service device receives the data of the terminal device, and may parse the data of the terminal device to obtain the user operation information of the terminal device. The application service device then sends the user operation information of the terminal device to the application media device. For example, the terminal device sends the user operation information to an ECM through a data channel, but the ECM cannot identify that received data is the user operation information. The ECM may send the data of the terminal device to the ECS-AS. The ECS-AS parses the data of the terminal device, obtains the user operation information of the terminal device, and sends the user operation information of the terminal device to the application media device.

The user operation information is information converted from an operation input by the user on the UI page of the terminal device. In other words, the user operation information indicates the operation performed by the user on the UI page of the terminal device. The user operation information may include but is not limited to information such as a tap operation, a swipe operation, or an entered character string of the user on the UI page.

Optionally, the application media device is further configured to receive the user operation information from the terminal device through the data channel. A format of the user operation information sent by the terminal device to the application media device through the data channel is different from a format of the user operation information sent by the application service device to the application media device. The format of the user operation information sent by the terminal device to the application media device through the data channel is a user-defined coding format in a websocket protocol. The format of the user operation information sent by the application service device to the application media device is a json format in a RESTful protocol or a text format or a bin format in H.248. It can be learned that formats of the user operation information from the two data sources are different.

In an implementation, the application service device is further configured to: receive the user operation information of the terminal device, and send second service page information corresponding to the user operation information to the application media device.

After obtaining the user operation information, the terminal device may send the user operation information to the application media device through the data channel, and the application media device may forward the user operation information to the application service device. Correspondingly, the application service device receives the user operation information from the terminal device, and parses the user operation information, to obtain the second service page information corresponding to the user operation information. For example, the user operation information received by the application service device is that the user taps "1. Service query" on the UI page, and the application service device determines, after parsing, to obtain second service page information corresponding to "1. Service query".

After obtaining the second service page information corresponding to the user operation information, the application service device sends the second service page information corresponding to the user operation information to the application media device. The application media device sends the second service page information to the terminal device through the data channel. Correspondingly, the terminal device receives the second service page information, and displays, on the call interface, a UI page corresponding to the second service page information.

Optionally, operations performed by the user on UI pages of the terminal device may be a cyclic process. In other words, the user may perform a plurality of times of operations on the UI pages. Correspondingly, the terminal device may separately obtain an operation performed by the user on the UI page each time, generate corresponding user operation information, and send a plurality of pieces of user operation information to the application media device through the data channel. The plurality of pieces of user operation information may correspond to a plurality of pieces of second service page information, or may correspond to one piece of second service page information. That the plurality of pieces of user operation information correspond to one piece of second service page information means that the second service page information includes UI page elements and control files of a plurality of UI pages. In this case, the terminal device may obtain a UI page element and a control file of a specific UI page that corresponds to a specific user operation.

In an implementation, if the terminal device no longer uses the interactive service in the call, for example, the user chooses to transfer to a human customer service, the terminal device may send service termination operation information to the application media device through the data channel, to release the data channel. The service termination operation information indicates to terminate the interactive service in the call. Correspondingly, the application media device receives the service termination operation information from the terminal device, and forwards the service termination operation information to the application service device. The application service device determines, based on the service termination operation information, that the user no longer uses the data channel, and sends a data channel release event to the application media device, to indicate the application media device to release the data channel. In this example, when the user transfers to the human customer service, the media channel between the terminal device and the call center is still connected. The application media device may send announcement playback switching information to the media channel based on the service termination operation information, and the call center receives the announcement playback switching information and transfers to the human customer service.

Optionally, if the terminal device no longer uses the interactive service in the call, for example, the user hangs up, the terminal device may send BYE signaling to the calling IMS core, and the calling IMS core forwards the BYE signaling to the telephony server. The telephony server receives the BYE signaling, determines that the user hangs up, and may send a call end event to the application service device. Correspondingly, the application service device receives the call end event, and generates data channel release indication information based on the call end event, to indicate the application media device to release the data channel. In this case, because the user has hung up, the media channel between the terminal device and the call center may also be released. The application service device may further send a media channel release indication message to the application media device, to indicate the application media device to release the media channel with the call center.

Figure 4A:
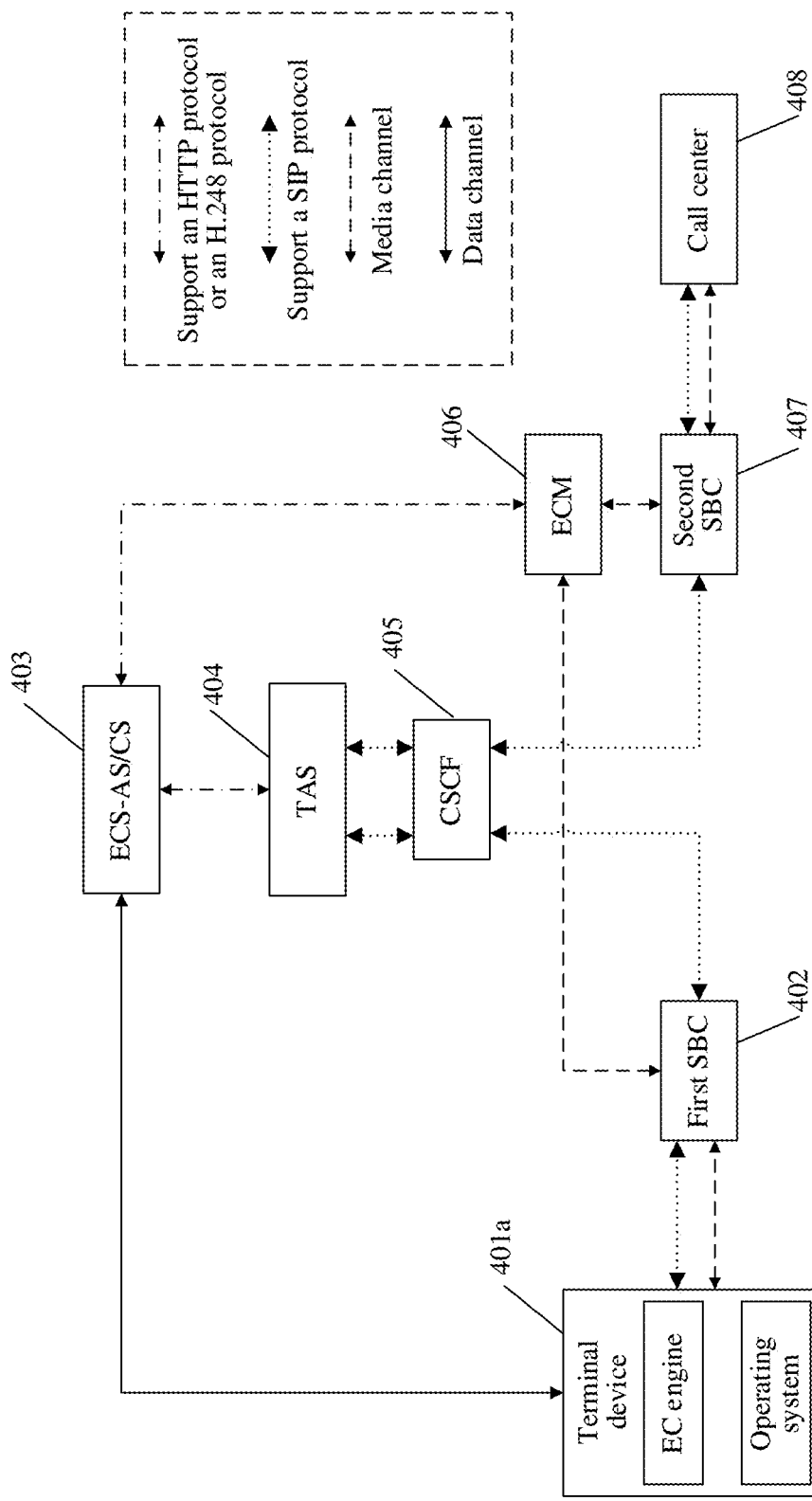
FIG. 4a is a schematic structural diagram of another call processing system according to an embodiment of this application.

FIG. 4a is a schematic structural diagram of another call processing system according to an embodiment of this application. The call processing system includes a terminal device 401a, a first SBC 402, an ECS-AS/CS 403, a TAS 404, a CSCF 405, an ECM 406, a second SBC 407, and a call center 408. In the call processing system shown in FIG. 4a, the terminal device 401a is a plug-in terminal, that is, the terminal device 401a may be the plug-in terminal shown in FIG. 2a or FIG. 2b. The plug-in terminal may be started by using a call event of an operating system (operating system, OS) of the terminal. The terminal device displays a UI page on a call interface of the terminal device in a manner of a floating window or a manner of directly covering the call interface, and provides an interaction operation through an enriched calling engine. The UI page in this embodiment may also be referred to as a service page, an HTML5 page, or a visual menu. The foregoing nouns actually represent the UI page that bears an interactive service in a call in this embodiment.

As shown in FIG. 4a, a media channel and a data channel are established between the terminal device 401a and the first SBC 402 in FIG. 4a. In addition, a signaling interface between the terminal device 401a and the first SBC 402 may perform signaling negotiation based on a SIP protocol. The terminal device 401a further establishes a data channel with the ECS-AS/CS 403, to transmit data related to the interactive service. The first SBC 402 serves the terminal device 401a.

A media channel or a data channel is also established between devices, or signaling negotiation is performed between the devices through a signaling interface. For example, the ECS-AS/CS 403 and the TAS 404 perform signaling negotiation through a signaling interface based on an HTTP protocol or an H.248 protocol. For another example, the ECS-AS/CS 403 and the ECM 406 perform signaling negotiation through a signaling interface based on an HTTP protocol or an H.248 protocol. For another example, the TAS 404 and the CSCF 405, the CSCF 405 and the first SBC 402, and the CSCF 405 and the second SBC 407 separately perform signaling negotiation through signaling interfaces based on a SIP protocol. For another example, a media channel is established between the ECM 406 and the first SBC 402, and a media channel is established between the ECM 406 and the second SBC 407, where the media channel is used to transmit a multimedia service based on an RTP. For another example, a media channel is established between the second SBC 407 and the call center 408, and is used to transmit multimedia audios and videos. The second SBC 407 and the call center 408 perform signaling negotiation through a signaling interface based on a SIP protocol.

In the call processing system shown in FIG. 4a, the first SBC 402 may be considered as a calling SBC, and the second SBC 407 may be considered as a called SBC. A calling party and a called party are relative, and the second SBC 407 serves the call center. If the terminal device 401a and the call center 408 are located in a same IMS network, the first SBC 402 and the second SBC 407 may be a same device.

In addition, the ECS-AS/CS 403 and the ECM 406 may also be combined into one device, for example, combined into one application server. This is not limited in this embodiment.

Figure 4B:
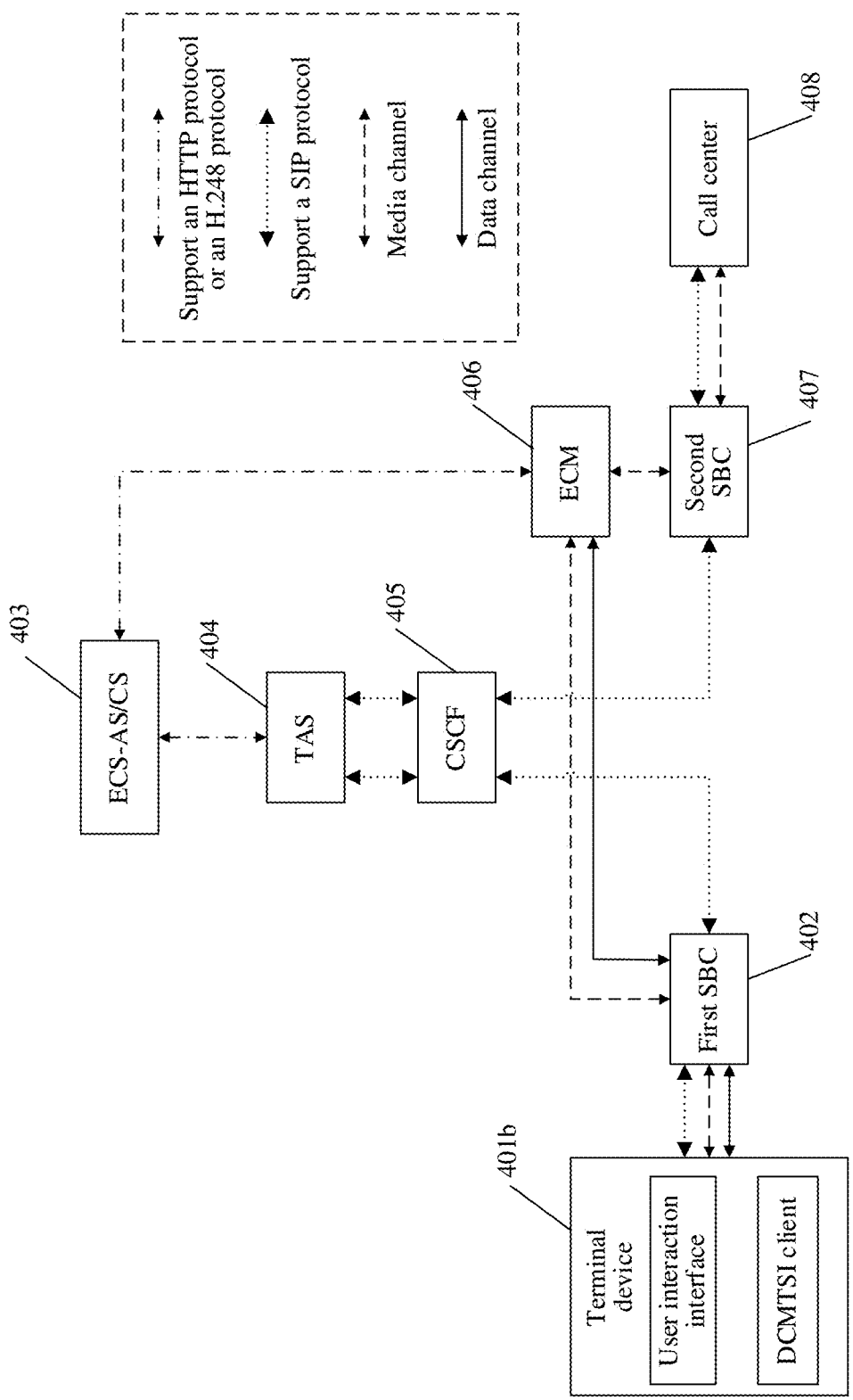
FIG. 4b is a schematic structural diagram of another call processing system according to an embodiment of this application.

FIG. 4b is a schematic structural diagram of still another call processing system according to an embodiment of this application. FIG. 4b is similar to FIG. 4a, and includes a first SBC 402, an ECS-AS/CS 403, a TAS 404, a CSCF 405, an ECM 406, a second SBC 407, and a call center 408. However, different from FIG. 4a, a terminal device 401b in FIG. 4b is a native terminal, that is, the terminal device 401b may be the native terminal shown in FIG. 3.

A media channel and a data channel are also established between the terminal device 401b in FIG. 4b and the first SBC 402, and the terminal device 401b in FIG. 4b and the first SBC 402 perform signaling negotiation through a signaling interface based on a SIP protocol, as shown in FIG. 4b. Different from the connection relationships in FIG. 4a, in FIG. 4b, there is no data channel between the terminal device 401b and the ECS-AS/CS 403, and a data channel is established between the terminal device 401b and the ECM 406 to implement a function of the data channel between the terminal device 401a and the ECS-AS/CS 403 in FIG. 4a.

The ECS-AS/CS 403 and the ECM 406 in FIG. 4b may also be combined into one device, for example, combined into one application server. When the ECS-AS/CS 403 and the ECM 406 are combined, the data channel between the terminal device 401b and the ECM 406 may be considered as a data channel between the terminal device 401b and the application server.

In FIG. 4b, a media channel or a data channel is also established between devices, and signaling negotiation is performed between the devices through a signaling interface. For a connection relationship between other devices, refer to the descriptions in FIG. 4a. Details are not described herein again.

In an example, the enriched calling application server ECS-AS, the enriched calling media device ECM, the content server CS, and the telephony application server TAS (for example, a VoLTE AS) may be combined into one device, and the device may be referred to as an application server, configured to implement functions of the ECS-AS/ECM/CS/TAS. Optionally, the enriched calling application server ECS-AS, the enriched calling media device ECM, and the content server CS may be combined into one device, and the telephony application server TAS is a separate device. Signaling exchange may be performed between the application server and the TAS based on an HTTP protocol or an H.248 protocol. Optionally, the enriched calling application server ECS-AS and the content server CS may be combined into one device, the enriched calling media device ECM is a separate device, and the telephony application server TAS is a separate device, to separately implement corresponding functions.

Figure 4C:
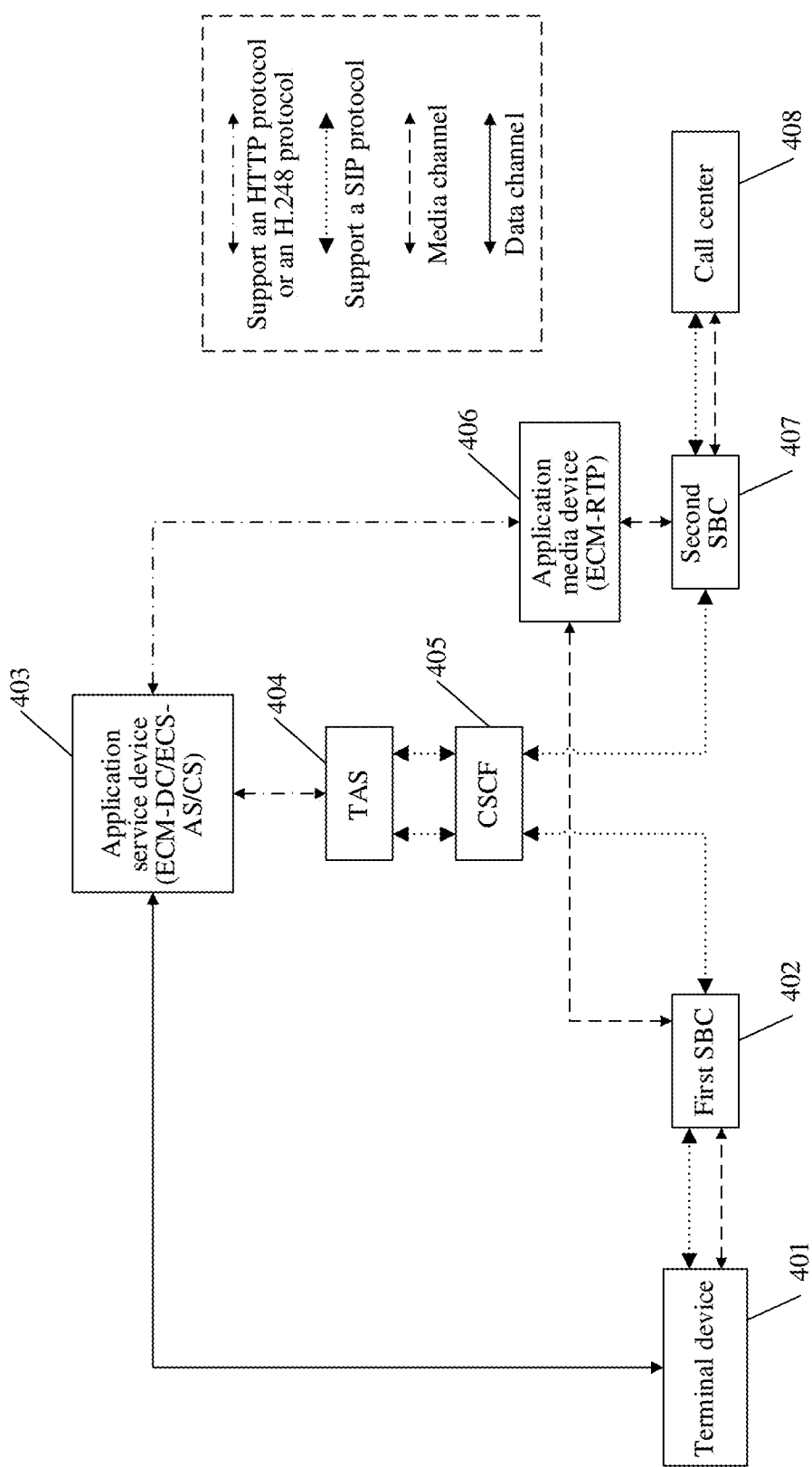
FIG. 4c is a schematic structural diagram of another call processing system according to an embodiment of this application.

Optionally, the ECM in FIG. 4a or FIG. 4b may be further divided into an ECM-RTP and an ECM-DC. As shown in FIG. 4c, an ECM-RTP is a separate device (an application media device), and an ECM-DC, an ECS-AS, and a CS are combined into one device (an application service device). In other words, a media channel is established between the application media device and a terminal device to transmit multimedia data, and a data channel is established between the application service device and the terminal device to transmit DC service data.

The following describes in detail interaction between devices in a call processing system shown in FIG. 4c.

In an implementation, the application service device is configured to: establish a data channel with the terminal device when detecting that the terminal device initiates or receives a call service, send first service page information corresponding to the call service to the terminal device through the data channel, receive user operation information from the terminal device through the data channel, and send the user operation information to the application media device. The application media device is configured to: receive the user operation information from the application service device, convert the user operation information into audio information, and send the audio information to a call center through a media channel between the terminal device and the call center.

In the call processing system shown in FIG. 4c, the application service device may subscribe to a call event from a telephony server TAS. Therefore, when the terminal device initiates or receives the call service, the application service device may detect that the terminal device initiates or receives the call service. There are two cases in which the application service device detects that the terminal device initiates or receives the call service.

Case 1: The application service device receives a call start event from the telephony server, and determines, based on the call start event, that the terminal device initiates or receives the call service. For a specific implementation, refer to related descriptions of a corresponding part in the embodiment of FIG. 1. Details are not described herein again.

Case 2: The application service device receives a data channel establishment request message from the terminal device, and determines, based on the data channel establishment request message, that the terminal device initiates or receives the call service. For a specific implementation, refer to related descriptions of a corresponding part in the embodiment of FIG. 1. Details are not described herein again.

Optionally, before detecting that the terminal device initiates the call service and establishing the data channel with the terminal device, the application service device may further perform authentication on the terminal device. Specifically, an authentication manner of the terminal device includes one or more of access authentication, third-party login authentication, user name and password login authentication, or authentication by a device management DM server. For a specific implementation, refer to related descriptions of authentication in the embodiment of FIG. 1. Details are not described herein again.

When detecting that the terminal device initiates or receives the call service, the application service device may establish the data channel with the terminal device. The data channel may be considered as a dedicated data channel. For the application service device, the data channel is used to transmit related data of an interactive service in a call, or the data channel may be used to transmit an indication message between the application service device and the terminal device. For example, the application service device sends a UI page of the interactive service in the call to the terminal device through the data channel, so that the terminal device may display the UI page on a display interface for a user to interact and browse.

In an implementation, the application service device obtains first service page information corresponding to the call start event. The application service device sends the first service page information to the terminal device through the data channel.

When the application service device receives the call start event from the telephony server, the application service device may obtain the corresponding first service page information based on the call start event. Optionally, the application service device obtains, based on a called number or a calling number included in the call start event, first service page information corresponding to the called number or the calling number. For example, if the call service initiated by the terminal device is that the terminal device dials a customer service hotline of an operator, the application service device may obtain first service page information corresponding to a customer service hotline service of the operator when detecting that the terminal device dials the customer service hotline of the operator. On the contrary, if the call service received by the terminal device is a customer service hotline dialed by the operator, the application service device may obtain first service page information corresponding to a customer service hotline service of the operator when detecting that the terminal device receives the customer service hotline of the operator.

For related descriptions of the first service page information, refer to related descriptions of the first service page information in the embodiment of FIG. 1. Details are not described herein again.

Optionally, after obtaining the first service page information, the application service device may send the first service page information to the terminal device through the data channel. Correspondingly, the terminal device receives the first service page information, and downloads an actual service page. For a specific implementation, refer to related descriptions of a corresponding part in the embodiment of FIG. 1. Details are not described herein again.

In an implementation, when the application service device detects that the call service is connected, the application service device sends the first service page information corresponding to the call service to the terminal device through the data channel. For a specific implementation in which the application service device detects that the call service is connected, refer to corresponding descriptions in the embodiment of FIG. 1. Details are not described herein again.

In an implementation, the application service device is further configured to: obtain second service page information corresponding to the user operation information based on the user operation information, and send the second service page information to the terminal device through the data channel.

For descriptions of the user operation information, refer to corresponding descriptions in the embodiment of FIG. 1. Details are not described herein again. After obtaining the user operation information, the terminal device may send the user operation information to the application service device through the data channel. Correspondingly, the application service device receives the user operation information from the terminal device, and parses the user operation information, to obtain the second service page information corresponding to the user operation information. For example, the user operation information received by the application service device is that the user taps "1. Service query" on the UI page, and the application service device determines, after parsing, to obtain second service page information corresponding to "1. Service query".

Optionally, operations performed by the user on UI pages of the terminal device may be a cyclic process. In other words, the user may perform a plurality of times of operations on the UI pages. Correspondingly, the terminal device may separately obtain an operation performed by the user on the UI page each time, generate corresponding user operation information, and send a plurality of pieces of user operation information to the application service device through the data channel. The application service device may obtain corresponding second service page information based on the plurality of pieces of user operation information, and send the corresponding second service page information to the terminal device.

In an implementation, the application service device is further configured to send page indication information to the terminal device through the data channel, where the page indication information indicates the terminal device to display a UI page corresponding to the service page information or buffer the UI page. For a specific implementation, refer to corresponding descriptions in the embodiment of FIG. 1. Details are not described herein again.

In an implementation, the application media device is further configured to serially connect the terminal device, the application media device and the call center to form a media channel when the call service is connected.

When the call service is connected, the media channel is established between the terminal device and the call center. For example, a media channel is established between the terminal device and a calling SBC, a media channel is established between the calling SBC and a called IMS core, and a media channel is established between the called IMS core and the call center. It can be learned that the foregoing media channel may implement voice interworking between the terminal device and the call center. Based on this, the application media device may serially connect the terminal device, the application media device and the call center to form a media channel between the terminal device and the call center. For example, the application media device establishes a media channel with the calling SBC and a media channel with the called IMS core, to establish the media channel with the call center, and may send the audio information to the call center through the media channel.

In an implementation, if the terminal device no longer uses the interactive service in the call, for example, the user chooses to transfer to a human customer service, the terminal device may send service termination operation information to the application service device through the data channel, to release the data channel. For a specific implementation, refer to corresponding descriptions in the embodiment of FIG. 1. Details are not described herein again.

Optionally, if the terminal device no longer uses the interactive service in the call, the application service device releases the data channel with the terminal device, and sends a media channel release indication message to the application media device, to indicate the application media device to release the media channel with the call center. For a specific implementation, refer to corresponding descriptions in the embodiment of FIG. 1. Details are not described herein again.

Figure 5:
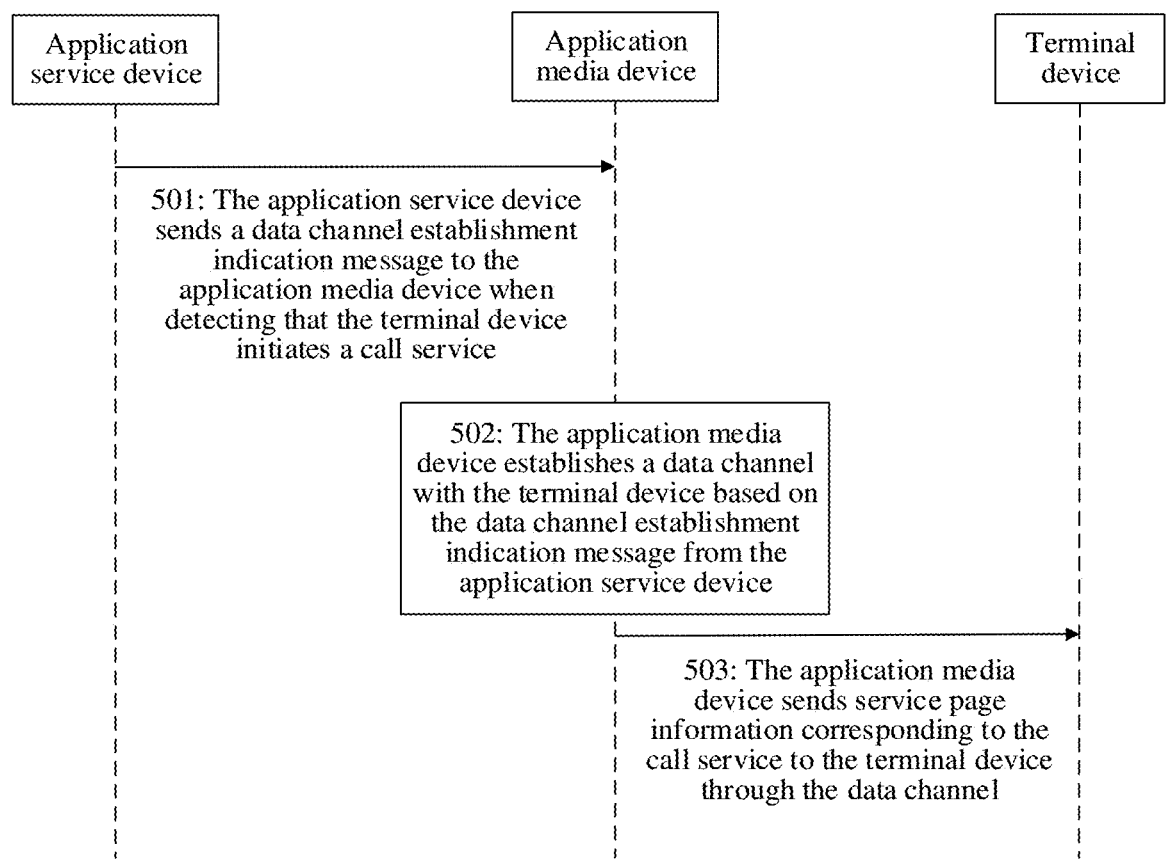
FIG. 5 is a schematic flowchart of a call processing method according to an embodiment of this application.
Figure 6A:
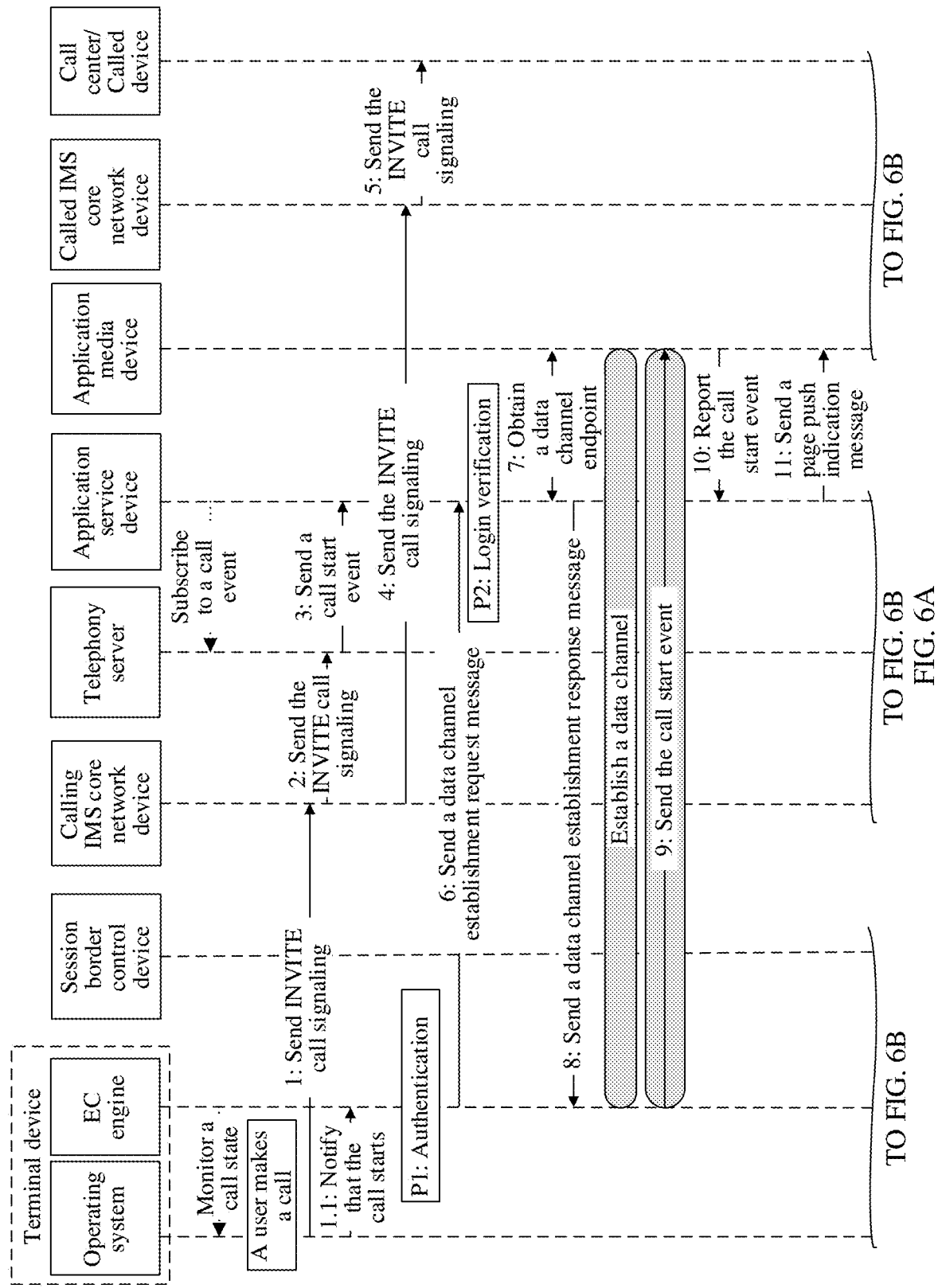
Figure 6B:
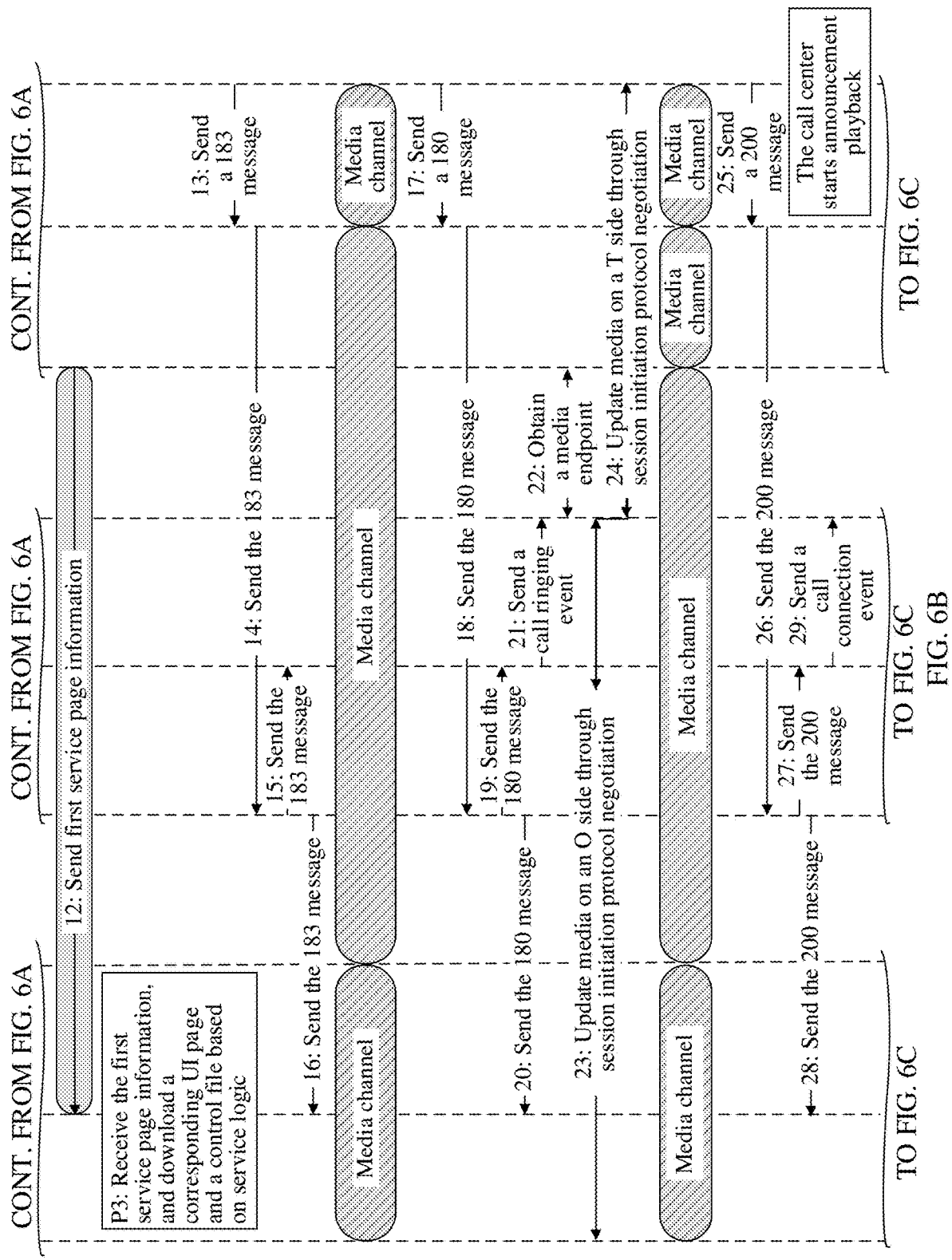
Figure 6E:
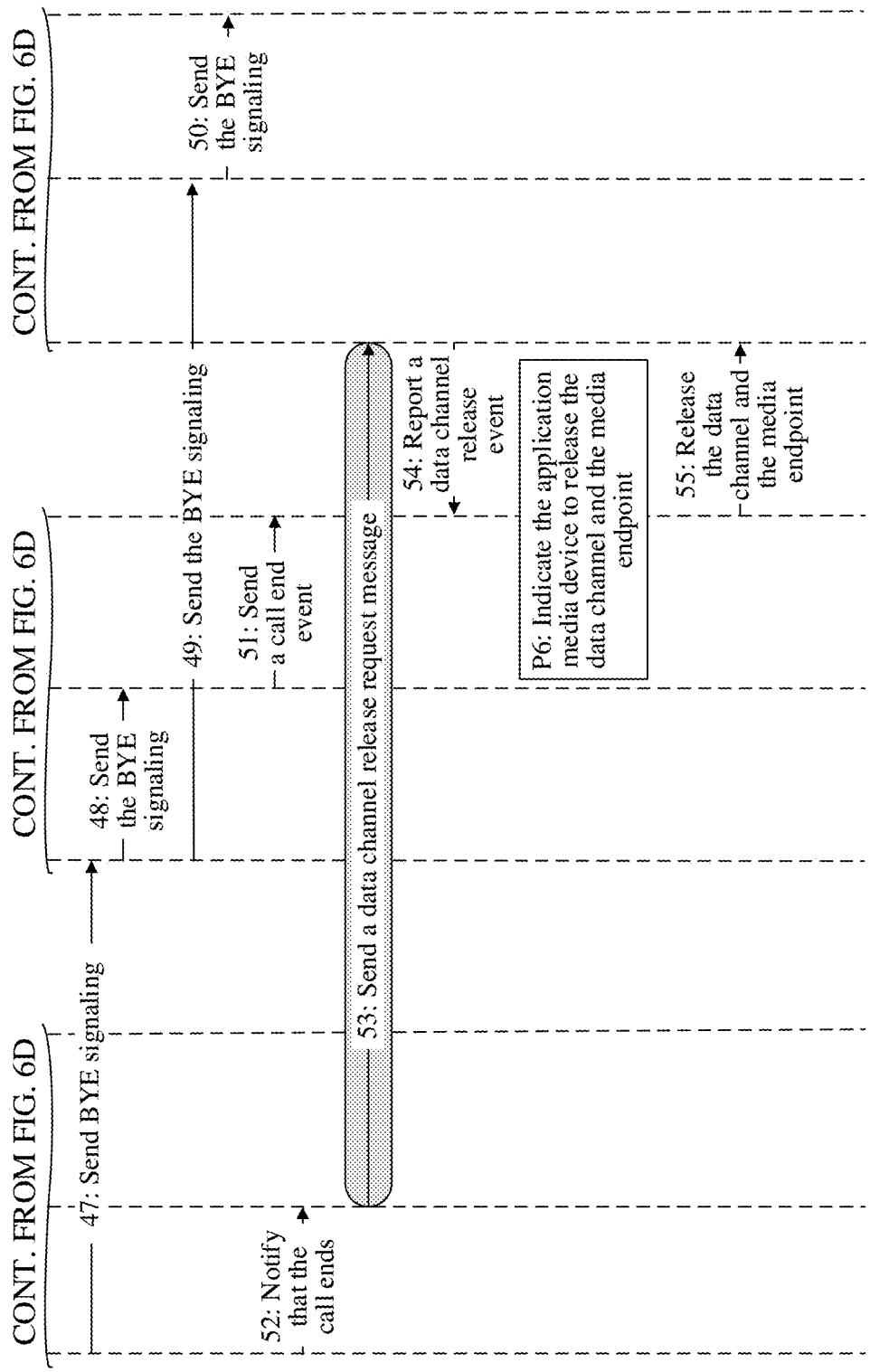
Figure 7A:
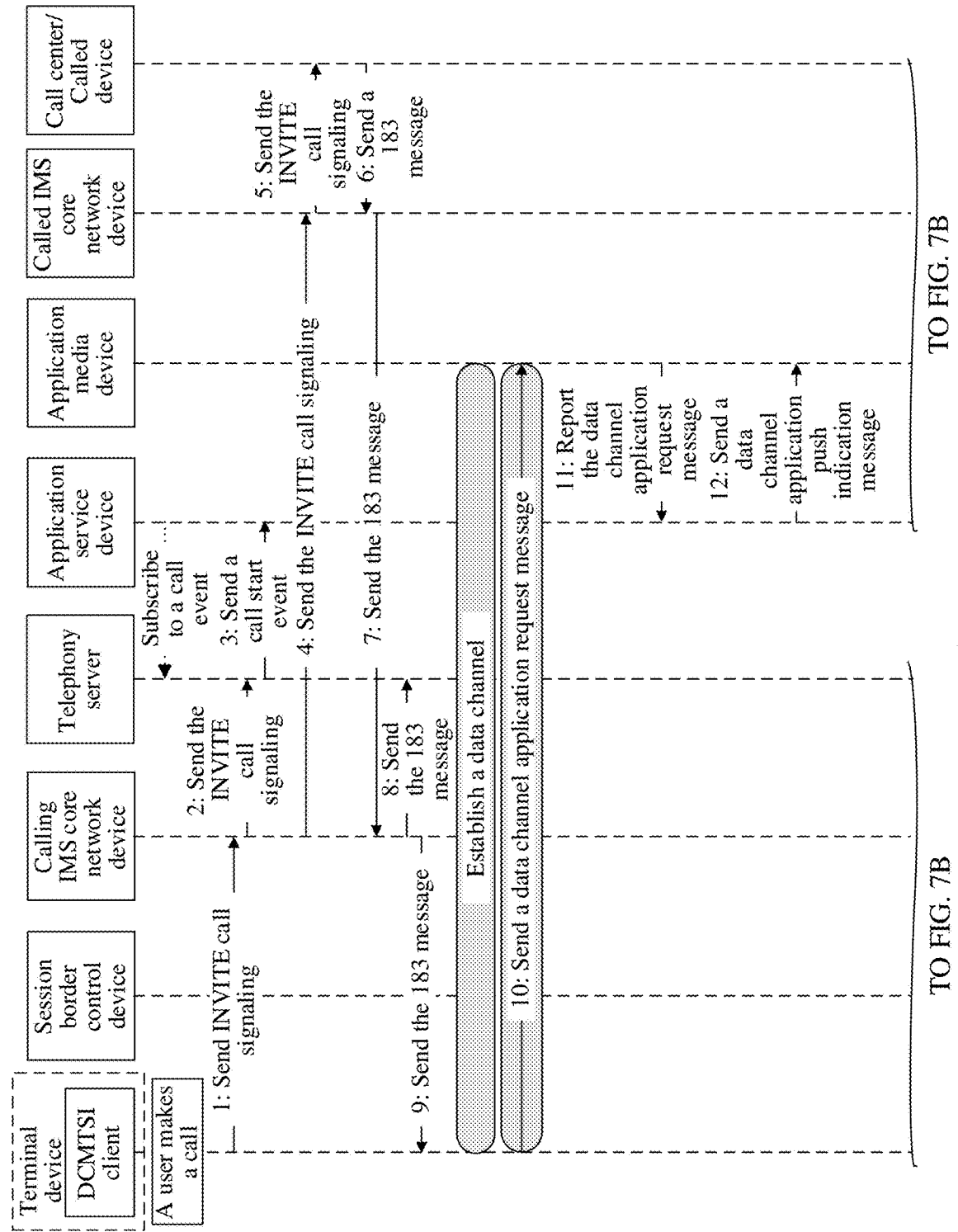
FIG. 7A to FIG. 7E are a schematic diagram of another procedure of processing an interactive service in a call according to an embodiment of this application.
Figure 7B:
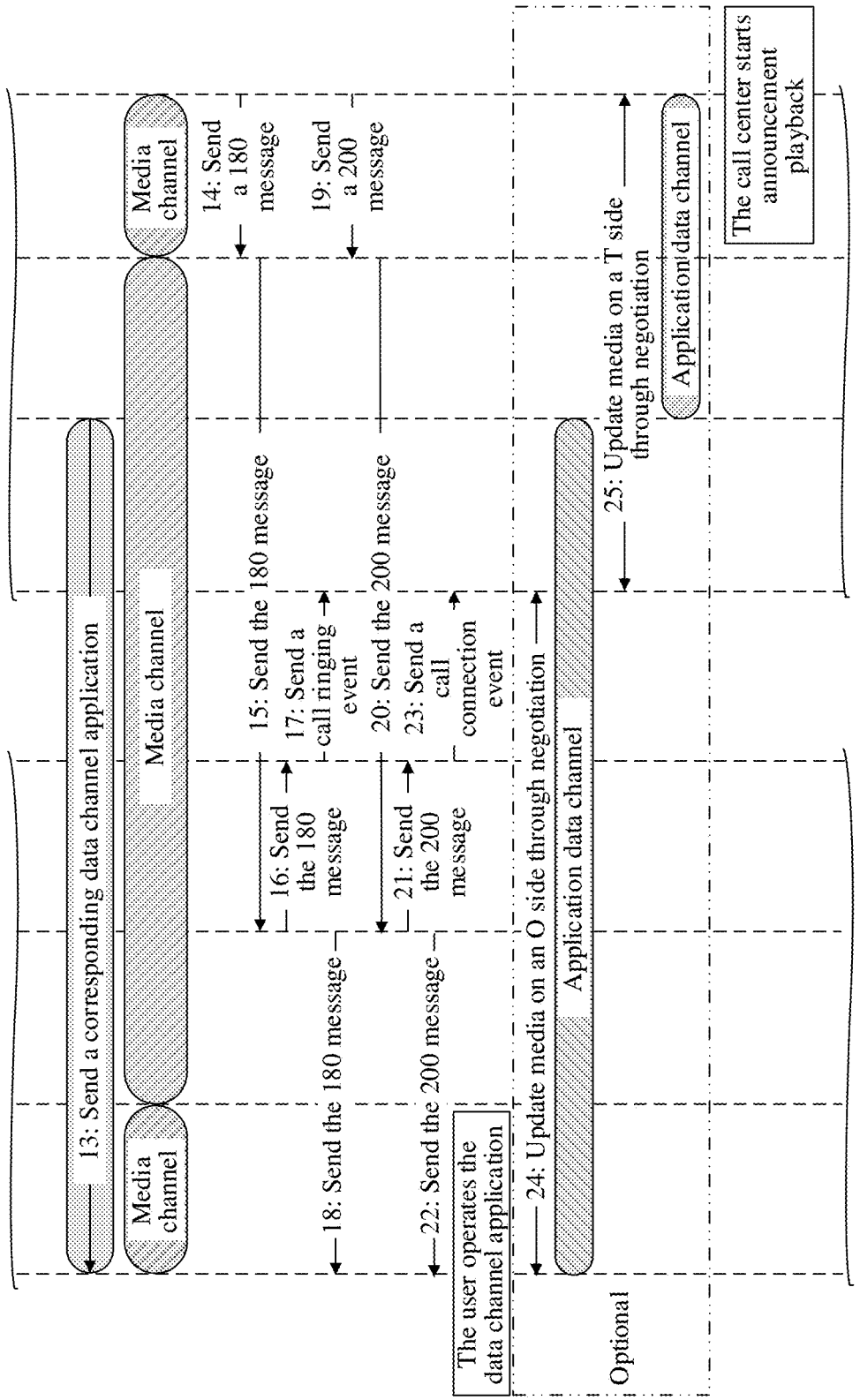
Figure 7C:
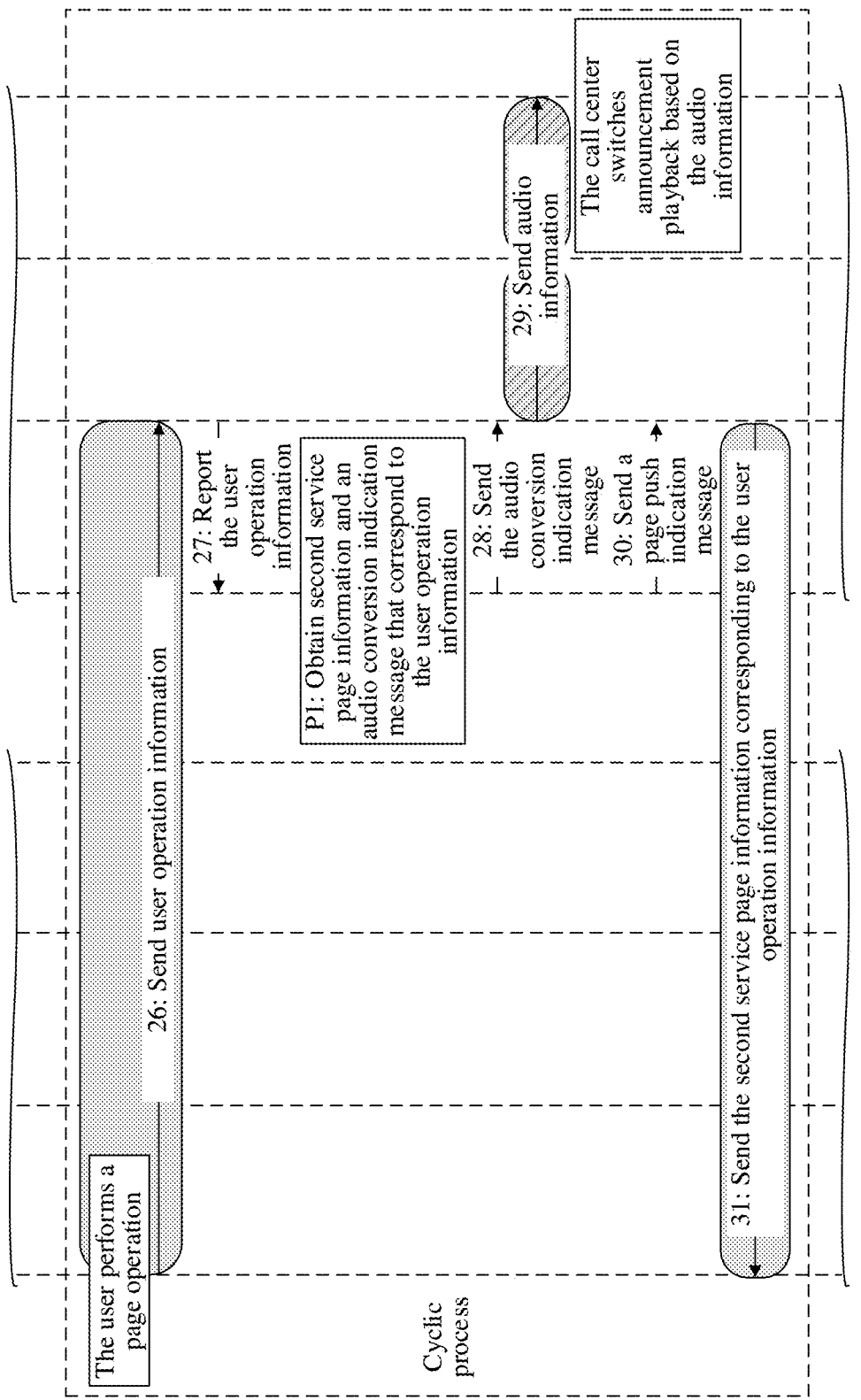
Figure 7D:
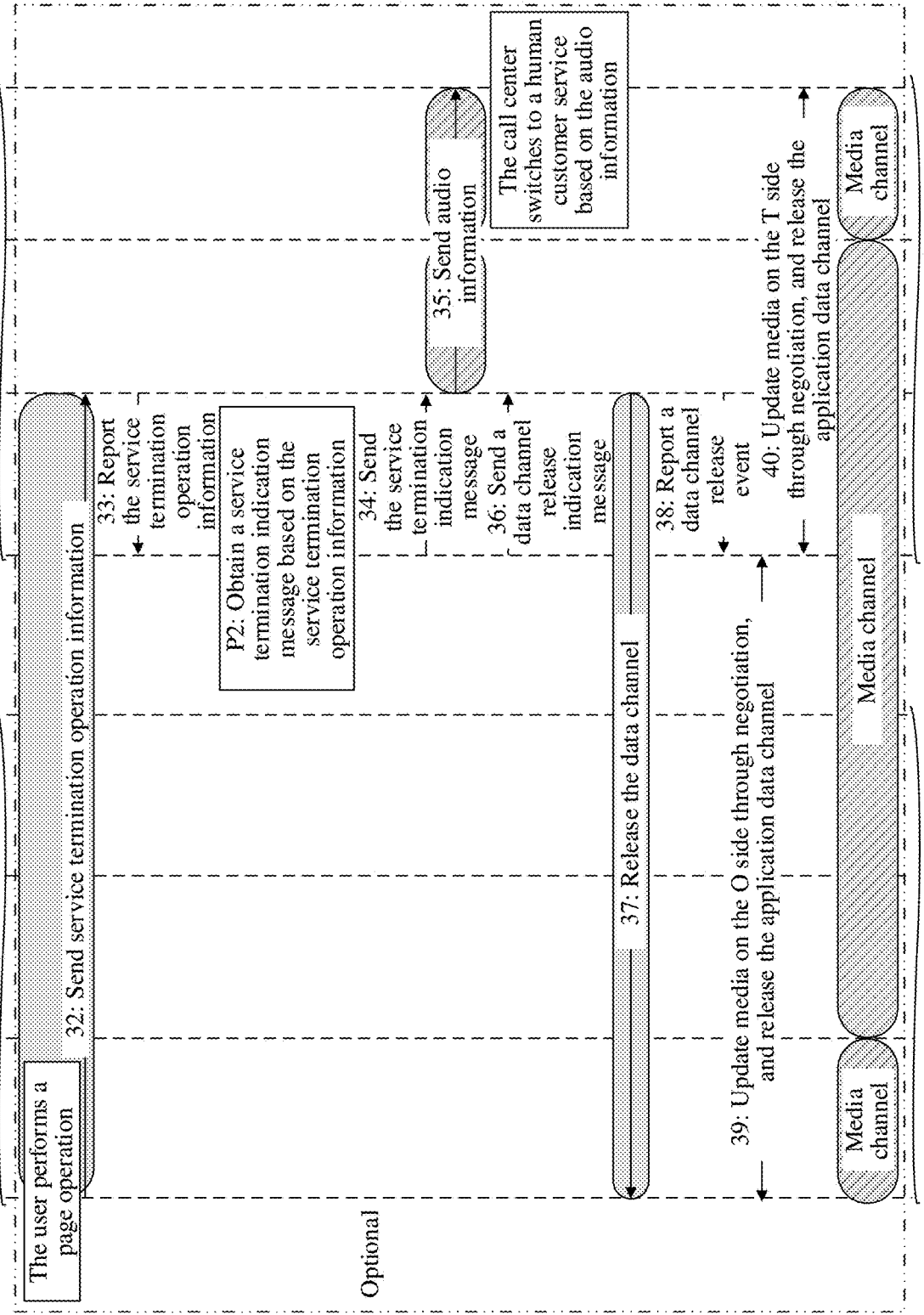
Figure 7E:
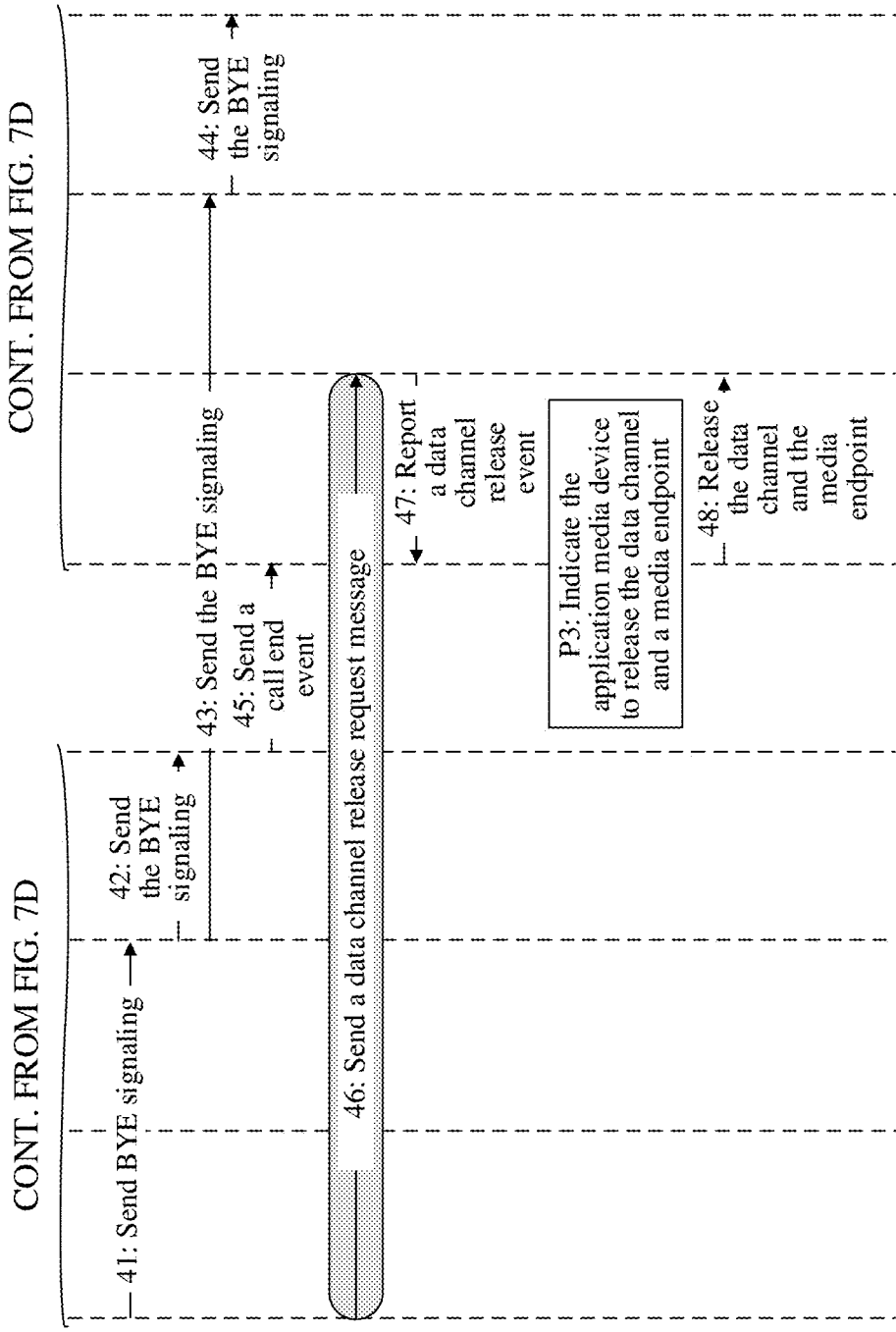

FIG. 5 is a schematic flowchart of a call processing method according to an embodiment of this application. The call processing method is implemented through interaction between the application service device, the application media device, and the terminal device in the call processing system shown in FIG. 1, and includes the following steps.

501: The application service device sends a data channel establishment indication message to the application media device when detecting that the terminal device initiates or receives a call service, to indicate the application media device to establish a data channel with the terminal device.

502: The application media device establishes the data channel with the terminal device based on the data channel establishment indication message from the application service device.

503: The application media device sends service page information corresponding to the call service to the terminal device through the data channel.

For a specific implementation, refer to corresponding descriptions in the embodiment of FIG. 1. Details are not described herein again.

In an implementation, the application media device further receives user operation information of the terminal device, converts the user operation information into audio information, and sends the audio information to a call center through a media channel between the terminal device and the call center.

For a specific implementation, refer to corresponding descriptions in the embodiment of FIG. 1. Details are not described herein again.

In an implementation, the application media device further receives data of the terminal device through the data channel, and sends the data of the terminal device to the application service device. The application service device receives the data of the terminal device, obtains the user operation information of the terminal device from the data of the terminal device, and sends the user operation information of the terminal device to the application media device.

For a specific implementation, refer to corresponding descriptions in the embodiment of FIG. 1. Details are not described herein again.

In an implementation, the application media device further receives the user operation information from the terminal device through the data channel.

For a specific implementation, refer to corresponding descriptions in the embodiment of FIG. 1. Details are not described herein again.

In an implementation, the application service device further sends first service page information to the application media device when detecting that the call service is connected. The application media device receives the first service page information.

For a specific implementation, refer to corresponding descriptions in the embodiment of FIG. 1. Details are not described herein again.

In an implementation, the application media device further receives data of the terminal device through the data channel, and sends the data of the terminal device to the application service device. The application service device receives the data of the terminal device. The application service device further obtains a call start event, a call notification message, or a call connection event in the data of the terminal device, and sends first service page information corresponding to the call start event, the call notification message, or the call connection event to the application media device.

For a specific implementation, refer to corresponding descriptions in the embodiment of FIG. 1. Details are not described herein again.

In an implementation, the application service device further receives a data channel establishment request message of the terminal device, and sends the data channel establishment indication message to the application media device in response to the data channel establishment request message.

For a specific implementation, refer to corresponding descriptions in the embodiment of FIG. 1. Details are not described herein again.

In an implementation, the application service device further receives the user operation information of the terminal device, and sends second service page information corresponding to the user operation information to the application media device.

For a specific implementation, refer to corresponding descriptions in the embodiment of FIG. 1. Details are not described herein again.

In an implementation, the application media device further sends page indication information to the terminal device through the data channel, where the page indication information indicates the terminal device to display a UI page corresponding to the first service page information or buffer the UI page.

For a specific implementation, refer to corresponding descriptions in the embodiment of FIG. 1. Details are not described herein again.

In conclusion, the call processing method shown in FIG. 5 can implement an interactive service in a call, and therefore efficiency of processing the call service by the call processing system is improved.

The following describes in detail a service procedure in which the call processing method in the embodiment of FIG. 5 is applied to the call processing system shown in FIG. 1.

In an example, FIG. 6A to FIG. 6E are a schematic diagram of a procedure of processing an interactive service in a call according to an embodiment of this application. The schematic diagram of the procedure shown in FIG. 6A to FIG. 6E is a schematic diagram of a procedure of processing a service when the call processing method shown in FIG. 5 is applied to the call processing system shown in FIG. 1 and the terminal device in the call system shown in FIG. 1 is a plug-in terminal. An enriched calling engine may register a detected call state of the terminal device with an operating system of the terminal device, and an application service device (an enriched calling AS) may subscribe to a call event from a telephony server (TAS), as shown by dashed arrows in the service procedure in FIG. 6A to FIG. 6E.

In FIG. 6A to FIG. 6E, devices for performing various service procedures include the terminal device (the plug-in terminal), a session border control device, a calling IMS core network device (including a call control server), the telephony server (including an open interface open API), the application service device, an application media device, a called IMS core network device, and a call center/called device. The following service procedures are specifically included.

Steps 1 to 5: A user makes a call, and the terminal device sends INVITE call signaling, where the signaling is forwarded to the called IMS core network device (namely, a called IMS core) through the calling IMS core network device (namely, a calling IMS core), and then forwarded to the call center/called device by the called IMS core network device. The calling IMS core network device may further forward the INVITE call signaling to the telephony server, and the telephony server sends a call start event to the application service device based on the subscribed call event.

The call of the terminal device is triggered to the application service device in two manners:

Manner 1: The call is triggered to the application service device through the telephony server (the open API).

Manner 2: The call is triggered to the application service device through the call control server (a CSCF).

Optionally, when the user makes the call, the operating system of the terminal device obtains the call start event, and sends the call start event to the enriched calling engine, as shown in step 1.1 in FIG. 6A to FIG. 6E.

Step P1: The enriched calling engine of the terminal device performs authentication. An authentication manner shown in step P1 may include IMS GBA authentication (for example, access authentication) between the terminal device and an IMS network, or unidirectional authentication (for example, third-party login authentication) from the terminal device to an application server. For a specific implementation, refer to the descriptions of the authentication manner in the foregoing embodiment. Details are not described herein again.

Step 6: After authentication succeeds, the enriched calling engine of the terminal device sends a data channel establishment request message to the application service device. The data channel establishment request message includes an authentication token.

Step 7: The application service device obtains data channel endpoint information from the application media device, where the endpoint information may include an IP address and/or a port (port) number. For example, the application service device sends a data channel establishment indication message to the application media device, and the application media device may feed back the data channel endpoint information to the application service device.

Step P2: The application service device verifies the authentication token to a corresponding server based on the authentication manner in P1.

Step 8: The application service device verifies the token to the corresponding server based on the authentication manner of the terminal device. After verification succeeds, the application service device sends a data channel connection response message to the terminal device, and indicates the application media device to establish a data channel with the enriched calling engine of the terminal device.

Steps 9 to 12: The enriched calling engine sends the call start event to the application media device through the data channel. The application media device forwards the call start event to the application service device. The call start event may include a calling number and a called number of the current call. The application service device may send a page push indication message to the application media device based on the call start event, to indicate the application media device to send first service page information to the enriched calling engine. The application media device may first send the first service page information to the terminal device. After receiving the first service page information, the terminal device may first buffer the first service page information, and then display a corresponding UI page after determining that a call service is connected.

Step P3: The enriched calling engine receives the first service page information, and downloads the corresponding UI page and a control file. If the application service device sends a URL address of an HTML5 page, the enriched calling engine needs to download the complete HTML5 page from a corresponding content server, and whether to buffer or directly display the HTML5 page depends on whether the call is connected (in other words, after the terminal device determines that the call service is connected, the corresponding UI page is displayed).

Steps 13 to 16: The call center/called device sends a 183 message to the called IMS core network device, where the 183 message indicates that the call is in progress. The called IMS core network device sends the 183 message to the calling IMS core network device, so that a calling side (the terminal device) establishes a media channel with a called side (the call center/called device). The calling IMS core network device may further send the 183 message to the telephony server and the enriched calling engine, so that the terminal device establishes a media channel with the call center/called device.

Steps 17 to 20: The call center/called device sends a 180 message to the called IMS core network device, where the 180 message indicates that the call is ringing. The called IMS core network device sends the 180 message to the calling IMS core network device, to indicate that the called side rings. The calling IMS core network device may further send the 180 message to the telephony server and the enriched calling engine, to indicate that the called side rings.

Step 21: The telephony server sends a call ringing event to the application service device based on a call subscription event.

Steps 22 to 24: After obtaining a media endpoint from an enriched calling media, the application service device updates media on an original O side and a terminal T side through SIP negotiation, and serially connects the terminal device, the application media device and the call center to form a voice media channel, so as to facilitate subsequent conversion into an in-band signal based on an interaction operation of the user. The O side refers to the terminal device, and the T side refers to the call center/called device.

As shown in FIG. 6A to FIG. 6E, after the application media device is serially connected with the terminal device and the call center, the media channel between the terminal device and the call center is formed by four segments, that is, terminal device-session border control device-application media device-called IMS core network device-call center/called device.

Steps 25 to 28: The call center/called device sends a 200 ok message (200 message for short) to the called IMS core network device, where the 200 message indicates that the call has been connected, and the call center starts announcement playback (or the terminal device starts the call with the called device). The called IMS core network device sends the 200 message to the calling IMS core network device. The calling IMS core network device may further send the 200 message to the telephony server and the enriched calling engine, to indicate that the call has been connected.

Step 29: The telephony server sends a call connection event to the application service device based on a call subscription event.

Steps 30 to 33: The application service device receives the call connection event from the telephony server, and may send a page push indication message to the application media device. Correspondingly, the application media device receives the page push indication message, and sends indication message or the first service page information to the enriched calling engine of the terminal device through the data channel. Optionally, if the enriched calling engine has buffered the first service page information in advance, the enriched calling engine may display the UI page on a call interface based on the indication message. After the user performs a page operation, the operating system obtains user operation information corresponding to the page operation performed by the user, and the enriched calling engine sends the user operation information to the application media device through the data channel. The application media device forwards the user operation information to the application service device.

Step P4: The application service device obtains second service page information based on the user operation information, and obtains an audio conversion indication message based on the user operation information.

Steps 34 to 37: The application service device obtains the audio conversion indication message based on the user operation information, and sends the audio conversion indication message to the application media device. The application media device performs conversion into audio information based on the audio conversion indication message, and sends the audio information to the call center/called device in an in-band manner.

The application service device may further obtain the corresponding second service page information based on the user operation information, and obtain a page push indication message. The page push indication message indicates the application media device to send a second service page to the terminal device. The application media device sends the second service page information to the enriched calling engine through the data channel. Correspondingly, after receiving the second service page information, the enriched calling engine may obtain a corresponding UI page and a control file (same as step P3). Steps 30 to 37 described in this embodiment may be cyclic, in other words, the user may perform a plurality of times of page operations, and the application service device and the application media device also perform a plurality of times of corresponding operations based on user operation information.

In this embodiment, if the user chooses to actively close the second service page information displayed on a user interface or chooses to transfer to a human customer service, steps 38 to 46 may be further included.

Steps 38 and 39: After the user performs a page operation, the operating system obtains service termination operation information corresponding to the page operation performed by the user, and the enriched calling engine sends the service termination operation information to the application media device through the data channel. The application media device reports the service termination operation information to the application service device.

Step P5: The application service device performs service identification based on the service termination operation information, and obtains a service audio termination indication message and a data channel release indication message based on the service termination operation information.

Steps 40 to 44: The application service device sends the service audio termination indication message to the application media device. The application media device generates service audio termination information based on the service audio termination indication message, and sends the service audio termination information to the call center through the media channel. The call center switches to the human customer service based on the service audio termination information. In addition, the application service device may further send the data channel release indication message to the application media device, to indicate the application media device to release the data channel with the terminal device. After release is completed, the application media device further reports a data channel release event to the application service device, to notify the application service device that the data channel has been released.

Steps 45 and 46: The application service device updates media on the O side/T side through SIP negotiation, and the application media device exits the media channel.

Steps 47 to 50: After the user hangs up, the terminal device sends BYE signaling, where the BYE signaling is forwarded to the called IMS core network device through the calling IMS core network device, and then forwarded to the call center/called device by the called IMS core network device.

Step 51: The telephony server sends a call end event to the application service device based on a call subscription event.

Step 52: The operating system of the terminal device captures the call end event, and notifies the enriched calling engine that the call ends.

Steps 53 to 55: The enriched calling engine of the terminal device sends a data channel release request message to the application media device. The application media device reports a data channel release event to the application service device, and the application service device indicates the application media device to release the data channel and the media endpoint.

In this embodiment, if the application service device has released the data channel in steps 40 to 44, steps 53 to 55 may not be performed.

In an example, FIG. 7A to FIG. 7E are a schematic diagram of another procedure of processing an interactive service in a call according to an embodiment of this application. The schematic diagram of the procedure shown in FIG. 7A to FIG. 7E is a schematic diagram of a procedure in which the call processing method shown in FIG. 5 is applied to the call processing system shown in FIG. 1 and the terminal device in the call system shown in FIG. 1 is a native terminal. An application service device (including a function of an enriched calling AS) subscribes to a call event from a telephony server (TAS), as shown by a dashed arrow in the service procedure in FIG. 7A to FIG. 7E.

In FIG. 7A to FIG. 7E, similar to FIG. 6A to FIG. 6E, devices for performing various service procedures include the terminal device (the native terminal), a session border control device, a calling IMS core network device (including a call control server), the telephony server (including an open interface), the application service device (including a data channel server), an application media device, a called IMS core network device, and a call center/called device. The following service procedures are specifically included.

Steps 1 to 9: The native terminal establishes a data channel (for example, a bootstrap data channel) through SIP signaling negotiation.

Transmission of an INVITE message between the terminal device and the call center/called device and transmission of a 183 message between the terminal device and the call center/called device are similar to the transmission processes in FIG. 6A to FIG. 6E. For details, refer to the descriptions in steps 1 to 8 in FIG. 6A to FIG. 6E. Details are not described herein again. INVITE call signaling in FIG. 7A to FIG. 7E includes information related to the data channel. For example, the INVITE message includes information such as an attribute, quality of service, and a stream ID of the data channel, and is used for data channel negotiation.

Optionally, in this embodiment, the native terminal may alternatively establish the data channel through negotiation using another message. For example, the application service device negotiates, using an UPDATE message, with the terminal device to establish the data channel, or the application service device negotiates, using a Re-Invite message, with the terminal device to establish the data channel.

Steps 10 to 13: After the native terminal establishes the data channel, the terminal device sends a data channel application request message to the application media device through the data channel, to request to obtain a data channel application (where a function is similar to the call start event in steps 9 to 12 in FIG. 6A to FIG. 6E) corresponding to a current call service. The data channel application request message may also include a calling number/called number, so that the application service device associates the data channel application request message with the INVITE message in steps 1 to 5.

For example, the native terminal sends a data channel application request message to an ECM, to request to obtain a data channel application of the call center/called device. The application media device reports the data channel application request message to the application service device, and then the application service device sends a data channel application push indication message to the application media device, to indicate the application media device to send the corresponding data channel application (similar to the first service page information in FIG. 6A to FIG. 6E) to the terminal device through the data channel. The data channel application (DC APP) includes an HTML web page (including a JS script), an image, a style sheet, and the like.

Optionally, a data channel server described in 3GPP TS 26.114 is configured to establish a data channel with the native terminal, and may distribute a data channel application to the terminal device. In other words, the data channel server may also implement a function similar to that of an ECS-AS in the procedure of processing the interactive service in the call.

Steps 14 to 22: A 180 message and a 200 message are transmitted between the terminal device and the call center/called device. A process of transmitting the 180 message and the 200 message between the terminal device and the call center/called device is similar to the transmission process in FIG. 6A to FIG. 6E. For details, refer to the descriptions in steps 13 to 20 in FIG. 6A to FIG. 6E. Details are not described herein again.

Step 23: The telephony server sends a call connection event to the application service device based on a call subscription event.

Steps 24 and 25: After the terminal device operates the data channel application of the call center/called device, for example, when the terminal device allows use of the data channel application of the call center/called device, a corresponding application data channel (for example, a non-bootstrap data channel) is established between the terminal device and the call center/called device.

The native terminal may establish only a data channel with the ECM, and does not need to establish application data channels for different applications. In other words, the data channel application between the terminal device and the ECM may be directly transmitted on the data channel, that is, steps 24 and 25 are optional steps in this embodiment.

Optionally, for a business-to-customer (B2C) or customer-to-business (C2B) service, a unilateral application data channel (for example, a non-bootstrap data channel from the terminal device to the application media device) may be established; for a customer-to-customer (C2C) service, a non-bootstrap data channel from a calling-side terminal device to a called-side terminal device may be established. For the B2C or C2B service, a data channel application between the terminal device and the application media device may be the first service page information or the second service page information in the foregoing embodiment. For the C2C service, a data channel application between the calling-side terminal device and the called-side terminal device may be a call contact card. For example, the calling-side terminal device may send the call contact card to the called-side terminal device. The call contact card may be considered as an initial service page, and includes a UI page element, indicating identity information, an incoming call intention, or the like of the calling-side terminal device.

Steps 26 to 31: The call center may perform announcement playback based on user operation information. There are two implementations for the native terminal. One implementation is consistent with that of the plug-in terminal. A user inputs an operation by clicking a button on a UI page. The terminal device converts the user operation into the user operation information, and sends the user operation information to the application media device through the data channel. The application media device forwards the user operation information to the application service device. The application service device indicates the application media device to convert the user operation information into audio information, and sends the audio information to the call center through a media channel. In the other implementation, the terminal device directly sends audio information corresponding to the user operation information to the call center through a media channel when sending the user operation information to the application media device through the data channel, without a need of a reporting operation of the application service device and DTMF conversion.

Steps 32 to 48: The data channel and the media channel between the terminal device and the call center/called device are released. A process of releasing the data channel and the media channel is similar to the release process in FIG. 6A to FIG. 6E. For details, refer to the descriptions in steps 38 to 55 in FIG. 6A to FIG. 6E. Details are not described herein again.

In conclusion, when the call processing method provided in embodiments of this application is applied to the call processing system shown in FIG. 1, an overall service procedure is similar to that in FIG. 6A to FIG. 6E. A difference lies in that types of established data channels are different, resulting in a difference in some steps. However, the two service procedures are essentially the same.

Figure 8:
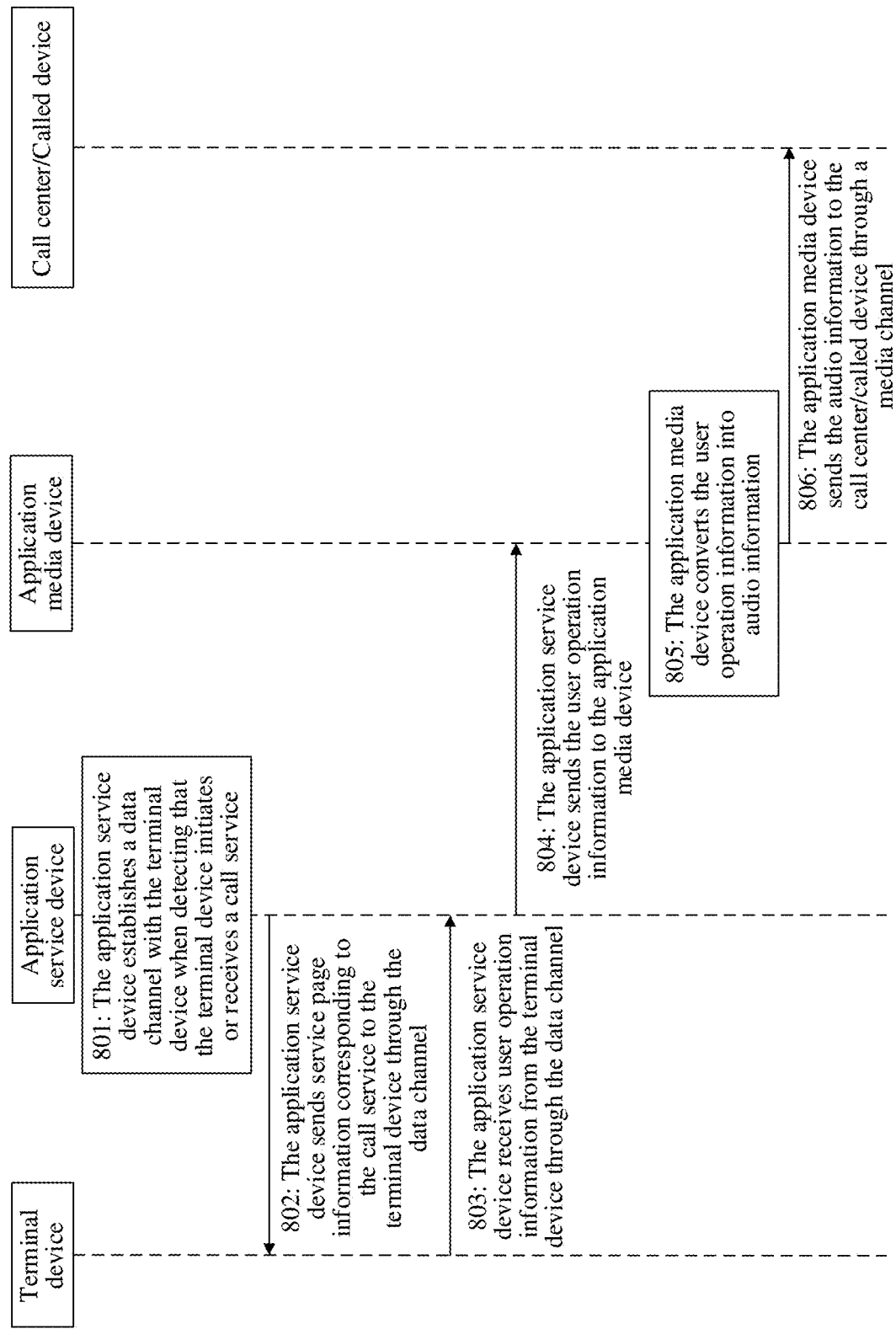
FIG. 8 is a schematic flowchart of another call processing method according to an embodiment of this application.
Figure 9A:
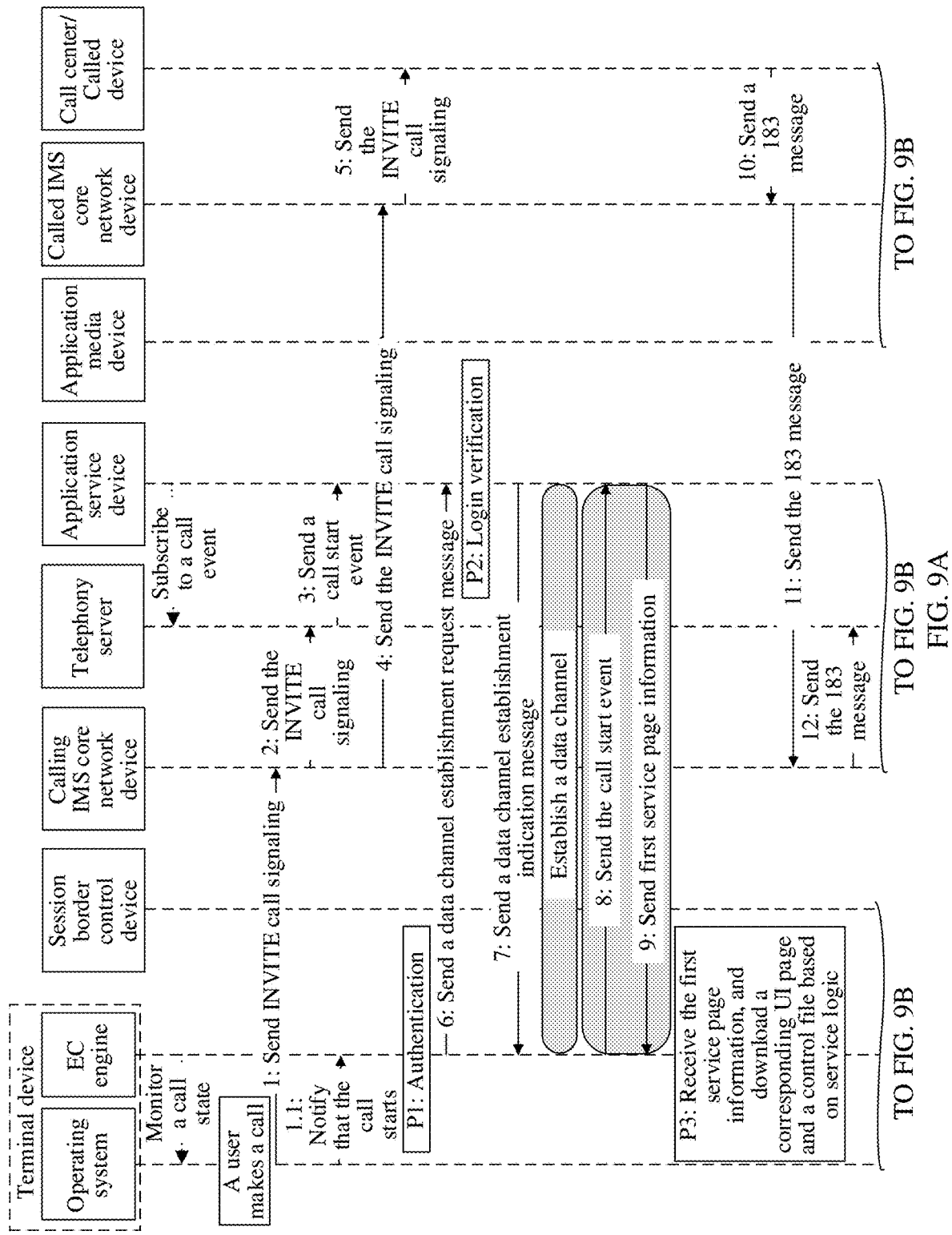
FIG. 9A to FIG. 9E are a schematic diagram of another procedure of processing an interactive service in a call according to an embodiment of this application.
Figure 9B:
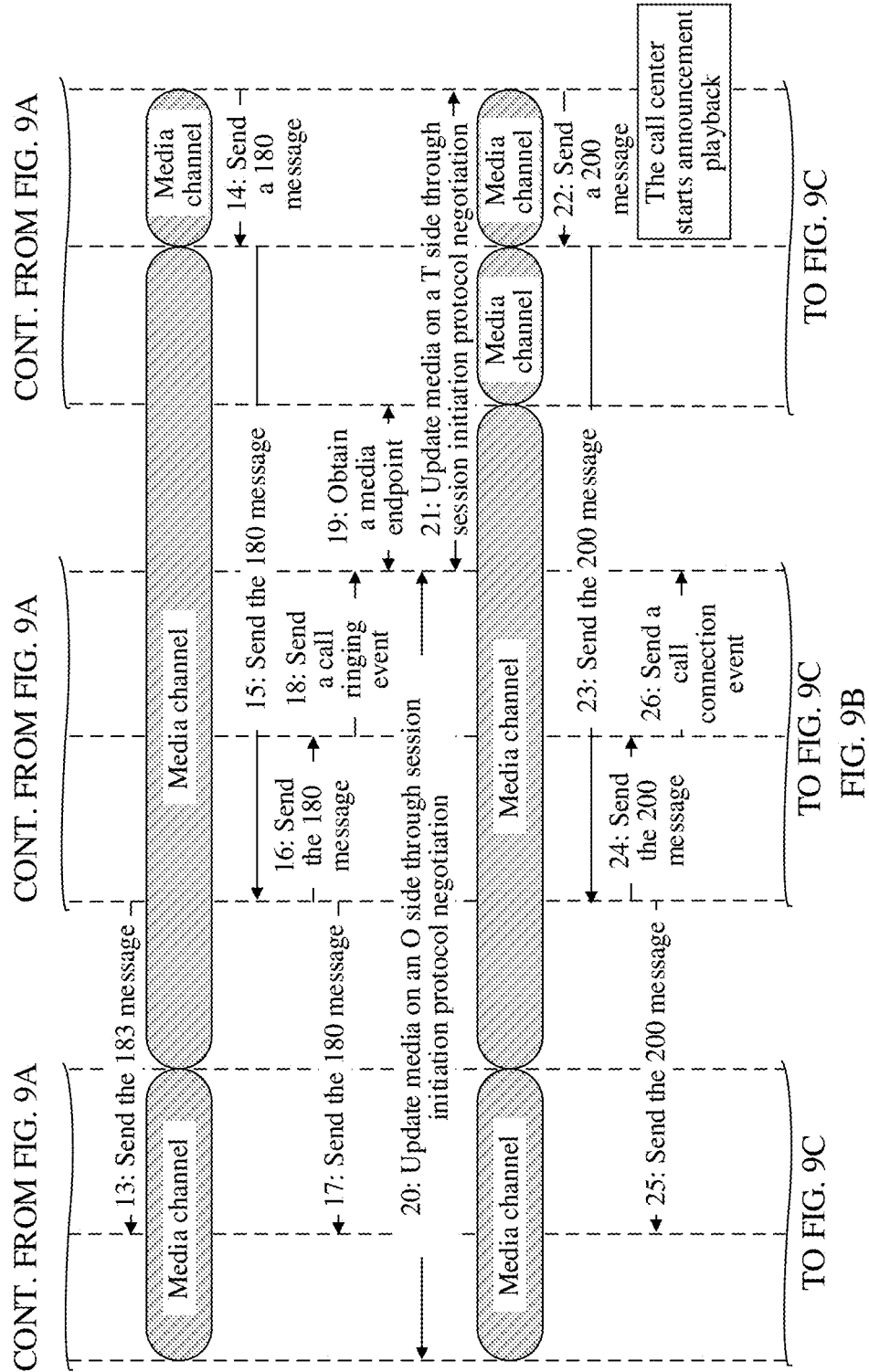
Figure 9C:
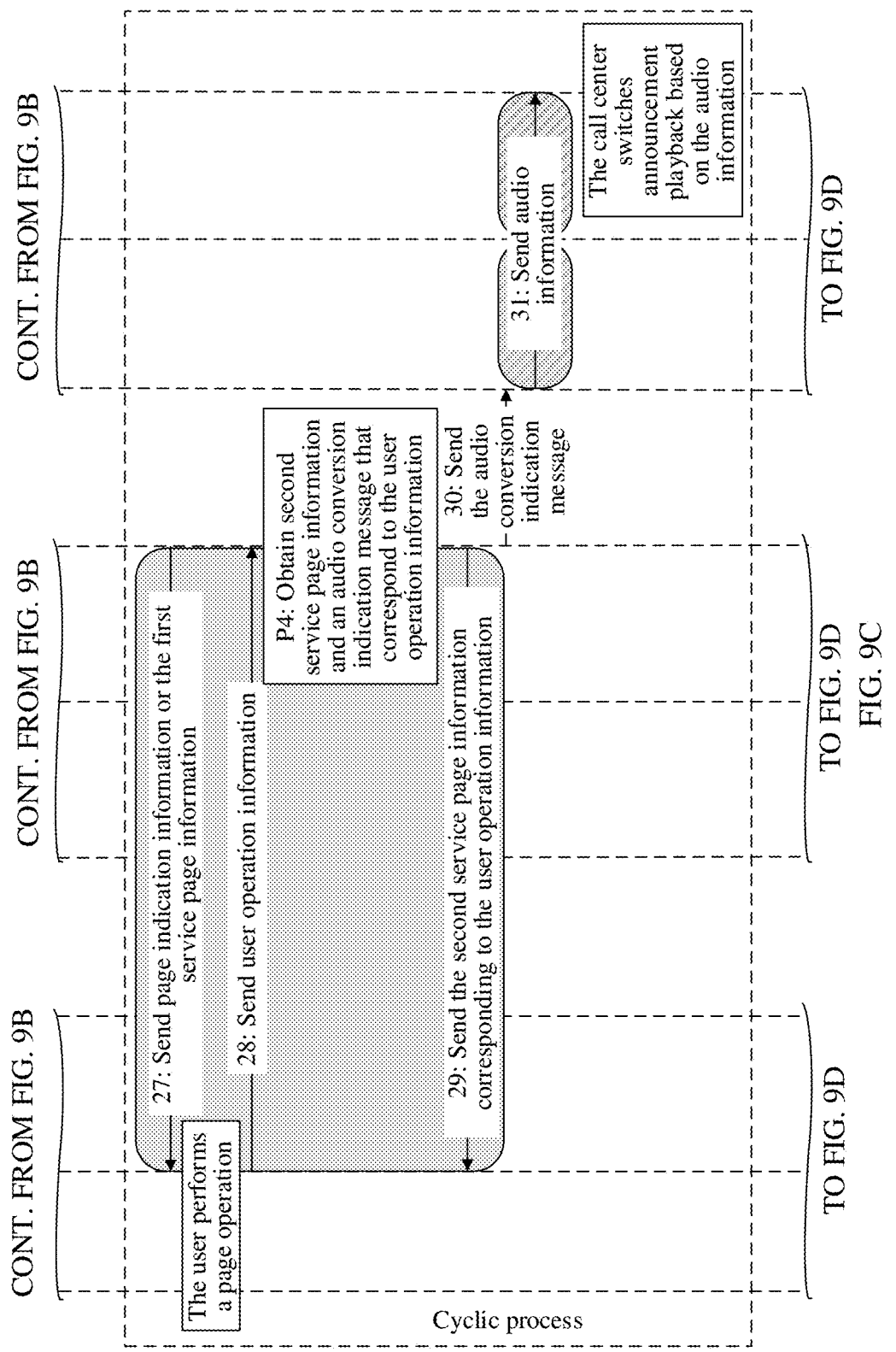
Figure 9D:
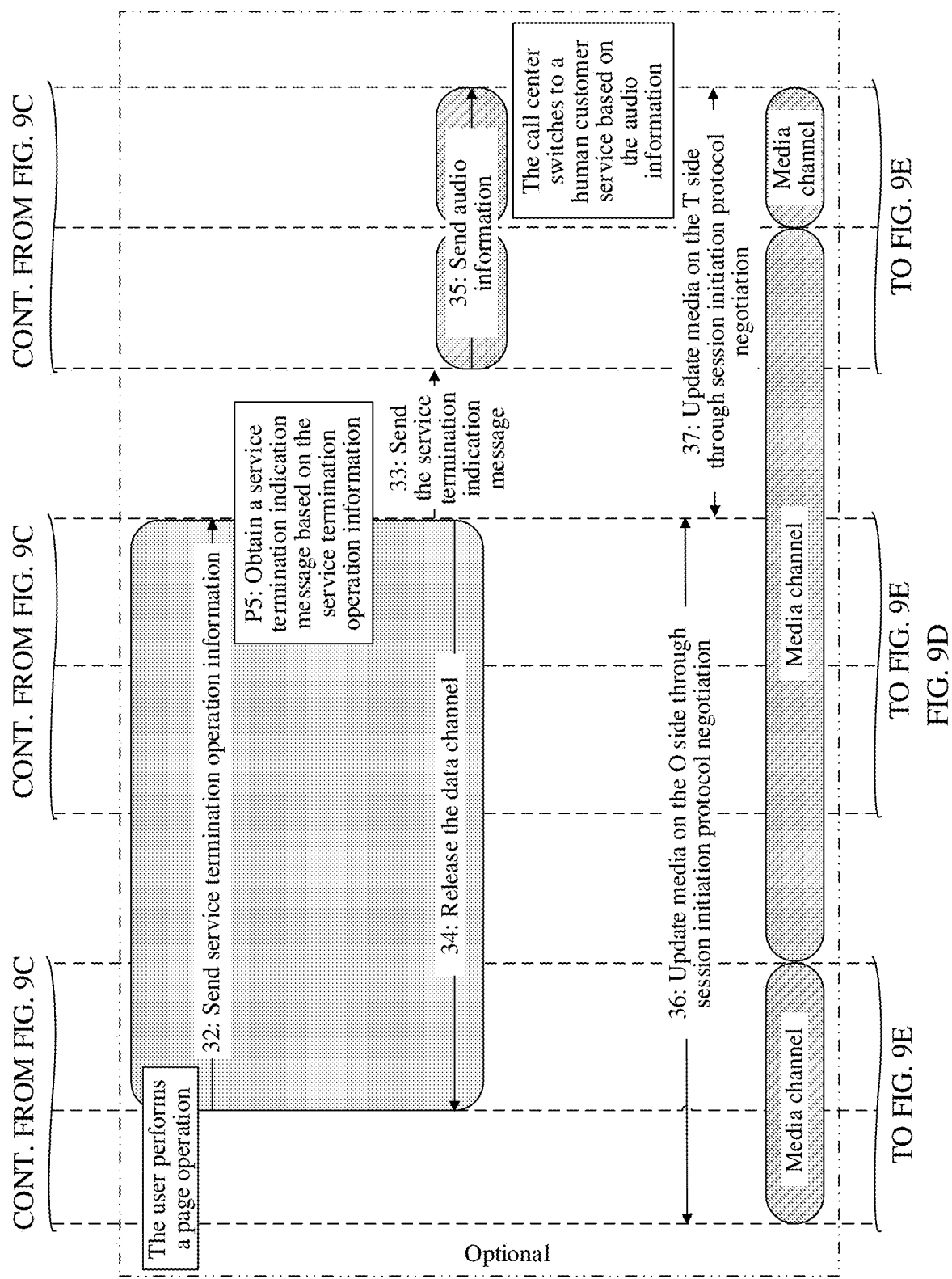
Figure 9E:
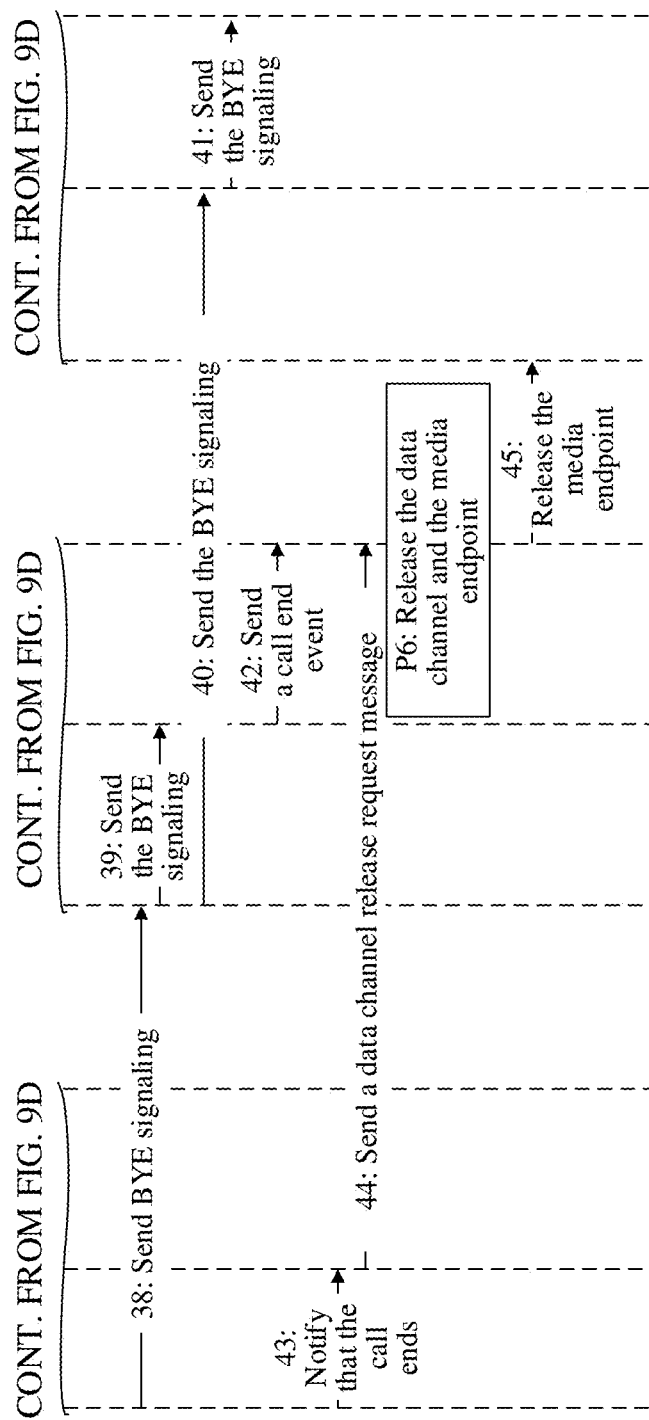
Figure 10A:
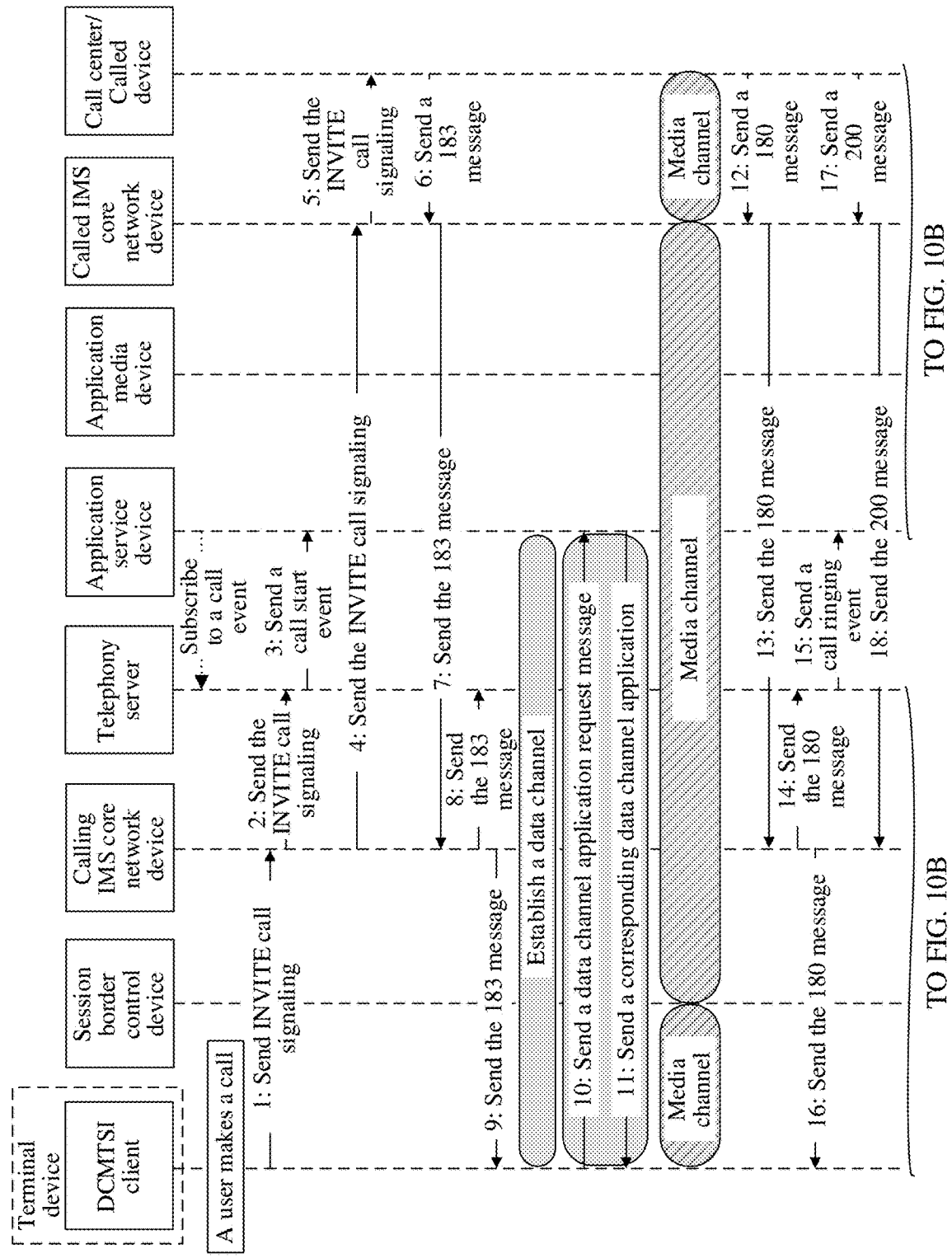
Figure 10C:
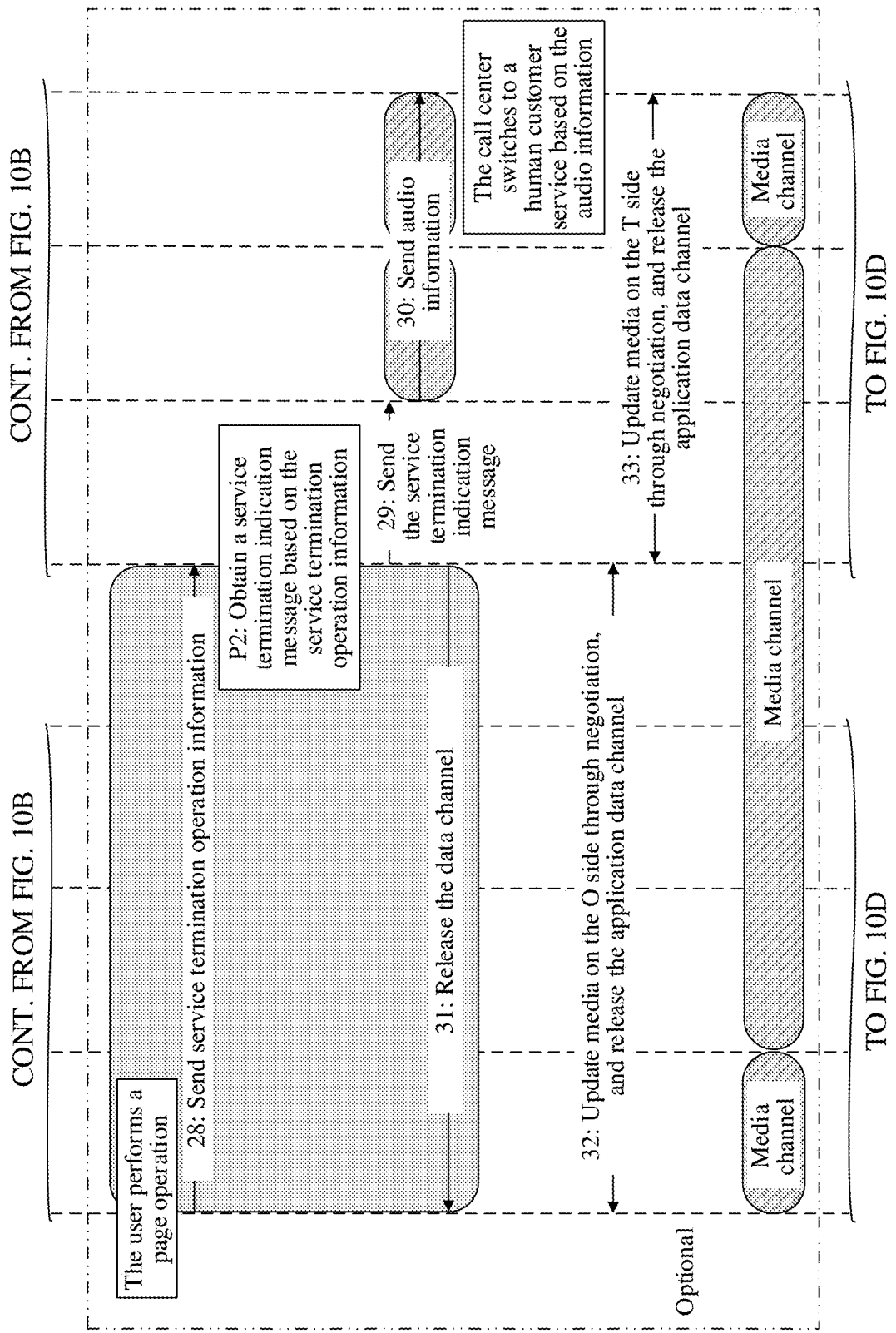

FIG. 8 is a schematic flowchart of another call processing method according to an embodiment of this application. The call processing method is implemented through interaction between the application service device, the application media device, the terminal device, and the call center/called device in the call processing system shown in FIG. 4a or FIG. 4b, and includes the following steps.

801: The application service device establishes a data channel with the terminal device when detecting that the terminal device initiates or receives a call service.

802: The application service device sends service page information corresponding to the call service to the terminal device through the data channel.

803: The application service device receives user operation information from the terminal device through the data channel.

804: The application service device sends the user operation information to the application media device.

805: The application media device converts the user operation information into audio information.

806: The application media device sends the audio information to the call center/called device through a media channel.

For a specific implementation, refer to corresponding descriptions in the embodiments of FIG. 4a and FIG. 4b. Details are not described herein again.

In an implementation, the application media device serially connects the terminal device, the application media device and the call center to form a media channel when the call service is connected.

For a specific implementation, refer to corresponding descriptions in the embodiments of FIG. 4a and FIG. 4b. Details are not described herein again.

In an implementation, the application service device further receives a call start event from a telephony server, and determines, based on the call start event, that the terminal device initiates or receives the call service. Alternatively, the application service device receives a data channel establishment request message from the terminal device, and determines, based on the data channel establishment request message, that the terminal device initiates or receives the call service.

For a specific implementation, refer to corresponding descriptions in the embodiments of FIG. 4a and FIG. 4b. Details are not described herein again.

In an implementation, the application service device further obtains first service page information corresponding to the call start event based on the call start event.

For a specific implementation, refer to corresponding descriptions in the embodiments of FIG. 4a and FIG. 4b. Details are not described herein again.

In an implementation, the application service device further obtains, based on a called number included in the call start event, first service page information corresponding to the called number.

For a specific implementation, refer to corresponding descriptions in the embodiments of FIG. 4a and FIG. 4b. Details are not described herein again.

In an implementation, the application service device obtains second service page information corresponding to the user operation information based on the user operation information, and sends the second service page information to the terminal device through the data channel.

For a specific implementation, refer to corresponding descriptions in the embodiments of FIG. 4a and FIG. 4b. Details are not described herein again.

In an implementation, the application service device further sends page indication information to the terminal device through the data channel, where the page indication information indicates the terminal device to display a UI page corresponding to the service page information or buffer the UI page.

For a specific implementation, refer to corresponding descriptions in the embodiments of FIG. 4a and FIG. 4b. Details are not described herein again.

In conclusion, the call processing method shown in FIG. 8 can also implement an interactive service in a call, and therefore efficiency of processing the call service by the call processing system is improved.

The following describes in detail a service procedure in which the call processing method in the embodiment of FIG. 8 is applied to the call processing system shown in FIG. 4a. FIG. 9A to FIG. 9E are a schematic diagram of another procedure of processing an interactive service in a call according to an embodiment of this application. The terminal device in the call processing system in FIG. 4a is a plug-in terminal, that is, implements the interactive service through an enriched calling engine and an operating system. The enriched calling engine registers a detected call state of the terminal device with the operating system of the terminal device, and an application service device (including a function of an enriched calling AS) subscribes to a call event from a telephony server (TAS), as shown by dashed arrows in the service procedure in FIG. 9A to FIG. 9E.

In FIG. 9A to FIG. 9E, devices for performing various service procedures include the terminal device, a session border control device, a calling IMS core network device (including a call control server), the telephony server (including an open interface open API), the application service device, an application media device, a called IMS core network device, and a call center/called device. The following service procedures are specifically included.

Steps 1 to 5: A user makes a call, and the terminal device sends INVITE call signaling, where the signaling is forwarded to the called IMS core network device (namely, a called IMS core) through the calling IMS core network device (namely, a calling IMS core), and then forwarded to the call center/called device by the called IMS core network device. The calling IMS core network device may further forward the INVITE call signaling to the telephony server, and the telephony server sends a call start event to the application service device based on the subscribed call event.

The call of the terminal device is triggered to the application service device in two manners:

Manner 1: The call is triggered to the application service device through the telephony server (the open API).

Manner 2: The call is triggered to the application service device through the call control server (a CSCF).

Optionally, when the user makes the call, the operating system of the terminal device obtains the call start event, and sends the call start event to the EC engine, as shown in step 1.1 in FIG. 9A to FIG. 9E.

Step P1: The enriched calling engine of the terminal device performs authentication. An authentication manner shown in step P1 may include IMS GBA authentication (for example, access authentication) between the terminal device and an IMS network, or unidirectional authentication (for example, third-party login authentication) from the terminal device to an application server. For a specific implementation, refer to the descriptions of the authentication manner in the foregoing embodiment. Details are not described herein again.

Step 6: After authentication succeeds, the enriched calling engine of the terminal device sends a data channel establishment request message to the application service device. The data channel establishment request message includes an authentication token.

Step P2: The application service device verifies the authentication token to a corresponding server based on the authentication manner in P1.

Step 7: The application service device verifies the token to the corresponding server based on the authentication manner of the terminal device. After verification succeeds, the application service device sends a data channel connection response message to the terminal device, and establishes a data channel with the enriched calling engine of the terminal device.

Step 8: The enriched calling engine sends a call start event to the application service device through the data channel. The call start event may include a calling number and a called number.

Step 9: The application service device obtains first service page information corresponding to the call start event based on the call start event of the telephony server and/or the call start event sent by the enriched calling engine, and sends the first service page information to the enriched calling engine.

For example, the application service device may obtain first service page information corresponding to the called number in the call start event. The application service device may further create a session and record a session identifier (identity, ID). In this case, the application service device may first send the first service page information to the terminal device. After receiving the first service page information, the terminal device may first buffer the first service page information, and then display a corresponding UI page after determining that a call service is connected. For detailed descriptions of the first service page information, refer to the descriptions of the first service page information in the foregoing embodiment. Details are not described herein again.

Step P3: The enriched calling engine receives the first service page information, and downloads the corresponding UI page and a control file.

Steps 10 to 13: The call center/called device sends a 183 message to the called IMS core network device, where the 183 message indicates that the call is in progress. The called IMS core network device sends the 183 message to the calling IMS core network device, so that a calling side establishes a media channel with a called side. The calling IMS core network device may further send the 183 message to the telephony server and the enriched calling engine, so that the terminal device establishes a media channel with the call center/called device.

Steps 14 to 17: The call center/called device sends a 180 message to the called IMS core network device, where the 180 message indicates that the call is ringing. The called IMS core network device sends the 180 message to the calling IMS core network device, to indicate that the called side rings. The calling IMS core network device may further send the 180 message to the telephony server and the enriched calling engine, to indicate that the called side rings.

Step 18: The telephony server sends a call ringing event to the application service device based on a call subscription event.

Steps 19 to 21: After obtaining a media endpoint from an enriched calling media, the application service device updates media on an O side and a T side through SIP negotiation, and serially connects the terminal device, the application media device and the call center to form a voice media channel, so as to facilitate subsequent conversion into an in-band signal based on an interaction operation of the user.

Steps 22 to 25: The call center/called device sends a 200 ok message (200 message for short) to the called IMS core network device, where the 200 message indicates that the call has been connected, and the call center starts announcement playback (or the terminal device starts the call with the called device). The called IMS core network device sends the 200 message to the calling IMS core network device. The calling IMS core network device may further send the 200 message to the telephony server and the enriched calling engine, to indicate that the call has been connected.

Step 26: The telephony server sends a call connection event to the application service device based on a call subscription event.

Step 27: The application service device sends page indication information or the first service page information to the enriched calling engine through the data channel. Optionally, if the enriched calling engine has buffered the first service page information in advance, the enriched calling engine may display the UI page on a call interface based on the page indication information. If the terminal device refreshes the UI page after the call service is connected, the application service device may send new service page information to the enriched calling engine through the data channel.

Step 28: After the user performs a page operation, the operating system obtains user operation information corresponding to the page operation performed by the user, and the enriched calling engine sends the user operation information to the application service device through the data channel.

Step P4: The application service device performs service identification based on the reported user operation information, and obtains second service page information based on the user operation information, or obtains an audio conversion indication message based on the user operation information.

Steps 29 to 31: The application service device sends the audio conversion indication message to the application media device. Correspondingly, the application media device receives the audio conversion indication message, and generates audio information based on the audio conversion indication information, to convert the user operation into the audio information (for example, a DTMF signal). Then, the application media device sends the audio information to the call center/called device in an in-band manner.

The application service device further sends the second service page information to the enriched calling engine through the data channel. Correspondingly, after receiving the second service page information, the enriched calling engine may download a corresponding UI page and a control file (same as step P3). Steps 27 to 31 described in this embodiment may be cyclic, in other words, the user may perform a plurality of times of page operations, and the application service device and the application media device also perform a plurality of times of corresponding operations based on user operation information.

Optionally, in this embodiment, if the user chooses to actively close the second service page information displayed on a user interface or chooses to transfer to a human customer service, steps 32 to 37 may be further included.

Step 32: After the user performs a page operation, the operating system obtains service termination operation information corresponding to the page operation performed by the user, and the enriched calling engine sends the service termination operation information to the application service device through the data channel, to terminate the current interactive service.

Step P5: The application service device performs service identification based on the service termination operation information, and obtains a service termination indication message based on the service termination operation information.

Steps 33 to 35: The application service device determines, based on the service termination operation information, that the terminal device no longer needs the data channel (for example, the user actively closes the second service page information displayed on the user interface or transfers to the human customer service), and releases the data channel with the enriched calling engine.

For example, if the user chooses to transfer to the human service, the application service device further sends human service transfer indication information to the application media device, to indicate the application media device to convert an operation of transferring to the human service into audio information, and the application media device sends the audio information to the call center in an in-band manner. The call center switches to the human customer service.

Steps 36 and 37: The application service device updates media on the O side/T side through SIP negotiation, and the application media device exits the media channel.

Steps 38 to 41: After the interactive service is completed, the user hangs up, and the terminal device may send BYE signaling, where the BYE signaling is forwarded to the called IMS core network device through the calling IMS core network device, and then forwarded to the call center/called device by the called IMS core network device.

Step 42: The telephony server sends a call end event to the application service device based on a call subscription event.

Step 43: The operating system of the terminal device captures the call end event, and notifies the enriched calling engine that the call ends.

Step 44: The enriched calling engine of the terminal device sends a data channel release request message to the application service device.

Steps P6 and step 45: The application service device releases the data channel and releases the media endpoint.

In this embodiment, if the application service device has released the data channel in step 34, steps 44 and 45 may not be performed.

In conclusion, when the call processing method provided in embodiments of this application is applied to the call processing system shown in FIG. 4a, an overall service procedure is shown in FIG. 9A to FIG. 9E. To be specific, the interactive service in the call is implemented when the user makes the call, starting from sending the INVITE call signaling by the terminal device. The interactive service in the call is terminated when the user transfers to the human customer service, the user actively closes the interaction page, or the terminal device sends the BYE signaling (in other words, the user hangs up).

The following describes in detail a service procedure in which the call processing method in embodiments of this application is applied to the call processing system shown in FIG. 4b. FIG. 10A to FIG. 10D are a schematic diagram of another procedure of processing an interactive service in a call according to an embodiment of this application. The terminal device in the call processing system shown in FIG. 4b is a native terminal, that is, implements the interactive service in the call through a DCMTSI client (including a data channel and a web engine that support the interactive service in the call) specified in a protocol. An application service device (including a function of an enriched calling AS) may subscribe to a call event from a telephony server (TAS), as shown by a dashed arrow in the service procedure in FIG. 10A to FIG. 10D.

In FIG. 10A to FIG. 10D, similar to FIG. 9A to FIG. 9E, devices for performing various service procedures include the terminal device, a session border control device, a calling IMS core network device (including a call control server), the telephony server (including an open interface), the application service device (including a data channel server), an application media device, a called IMS core network device, and a call center/called device. The following service procedures are specifically included.

Steps 1 to 9: The native terminal establishes a data channel (for example, a bootstrap data channel) through SIP signaling negotiation.

Transmission of an INVITE message between the terminal device and the call center/called device and transmission of a 183 message between the terminal device and the call center/called device are similar to the transmission processes in FIG. 9A to FIG. 9E. For details, refer to the descriptions in steps 1 to 5 and steps 10 to 13 in FIG. 9A to FIG. 9E, or refer to related descriptions in steps 1 to 9 in FIG. 7A to FIG. 7E. Details are not described herein again.

Step 10: After the native terminal establishes the data channel with the application service device, the terminal device sends a data channel application request message to the application service device through the data channel, to request to obtain a data channel application (where a function is similar to the call start event in step 8 in FIG. 9A to FIG. 9E) corresponding to a current call service. The data channel application request message may also include a calling number/called number, so that the application service device associates the data channel application request message with the INVITE message in steps 1 to 5.

For example, the native terminal sends a data channel application request message to an ECS-AS, to request to obtain a data channel application (similar to the first service page information in FIG. 9A to FIG. 9E) of the call center/called device. The data channel application (data channel application, DC APP) includes an HTML web page (including a JS script), an image, a style sheet, and the like.

Optionally, a data channel server described in 3GPP TS 26.114 is configured to establish a data channel with the native terminal, and may distribute a data channel application to the terminal device. In other words, the DCS may also implement a function of the ECS-AS in the procedure of processing the interactive service in the call.

Step 11: The application service device sends the corresponding data channel application to the terminal device (similar to step 9 in FIG. 9A to FIG. 9E).

Optionally, the application service device includes a data channel repository (data channel repository, DCR) function described in 3GPP TS 26.114, which may be used to store a data channel application of the native terminal. In other words, the data channel repository may also implement a function similar to that of a CS in the procedure of processing the interactive service in the call. The data channel repository may be deployed independently, or may be deployed together with the application service device.

Steps 12 to 21: A 180 message and a 200 message are transmitted between the terminal device and the call center/called device. A process of transmitting the 180 message and the 200 message between the terminal device and the call center/called device is similar to the transmission process in FIG. 9A to FIG. 9E. For details, refer to the descriptions in steps 14 to 25 in FIG. 9A to FIG. 9E. Details are not described herein again.

Steps 22 and 23: After the terminal device operates the data channel application of the call center/called device, for example, when the terminal device allows use of the data channel application of the call center/called device, a corresponding application data channel (for example, a non-bootstrap data channel) is established between the terminal device and the call center/called device.

The native terminal may establish only a data channel with the ECS-AS, and does not need to establish application data channels for different applications. In other words, the data channel application between the terminal device and the ECS-AS may be directly transmitted on the data channel, that is, steps 22 and 23 are optional steps in this embodiment.

Optionally, for a business-to-customer (B2C) or customer-to-business (C2B) service, a unilateral application data channel (for example, a non-bootstrap data channel from the terminal device to the application service device) may be established; for a customer-to-customer (C2C) service, a non-bootstrap data channel from a calling-side terminal device to a called-side terminal device may be established. For the B2C or C2B service, a data channel application between the terminal device and the application service device may be the first service page information or the second service page information in the foregoing embodiment. For the C2C service, a data channel application between the calling-side terminal device and the called-side terminal device may be a call contact card. For example, the calling-side terminal device may send the call contact card to the called-side terminal device. The call contact card may be considered as an initial service page, and includes a UI page element, indicating identity information, an incoming call intention, or the like of the calling-side terminal device.

Steps 24 to 27: The call center/called device obtains user operation information of the terminal device, and performs announcement playback based on the user operation information. There are two possible implementations for the native terminal. One implementation is consistent with that of the plug-in terminal. A user inputs an operation by clicking a button on a UI page. The terminal device converts the user operation into the user operation information, and sends the user operation information to the application service device through the data channel. The application service device indicates the application media device to convert the user operation information into audio information (for example, a DTMF signal), and sends the audio information to the call center/called device through a media channel. In the other implementation, the terminal device directly sends audio information corresponding to the user operation information to the call center/called device through a media channel when sending the user operation information to the application service device through the data channel, without a need of a reporting operation of the application service device and DTMF conversion.

Steps 28 to 40: The data channel and the media channel between the terminal device and the call center/called device are released. A process of releasing the data channel and the media channel is similar to the release process in FIG. 9A to FIG. 9E. For details, refer to the descriptions in steps 32 to 45 in FIG. 9A to FIG. 9E. Details are not described herein again.

In conclusion, when the call processing method provided in embodiments of this application is applied to the call processing system shown in FIG. 4b, an overall service procedure is similar to that in FIG. 9A to FIG. 9E. A difference lies in that types of established data channels are different, resulting in a difference in some steps. However, the two service procedures are essentially the same.

The foregoing describes in detail the call processing systems and the call processing methods in embodiments of this application with reference to FIG. 1 to FIG. 10D. The following describes in detail call processing apparatuses in embodiments of this application with reference to FIG. 11 and FIG. 12. It should be understood that the call processing apparatuses shown in FIG. 11 and FIG. 12 can implement one or more steps in the method procedures shown in FIG. 5 to FIG. 10D. To avoid repetition, details are not described herein again.

Figure 11:
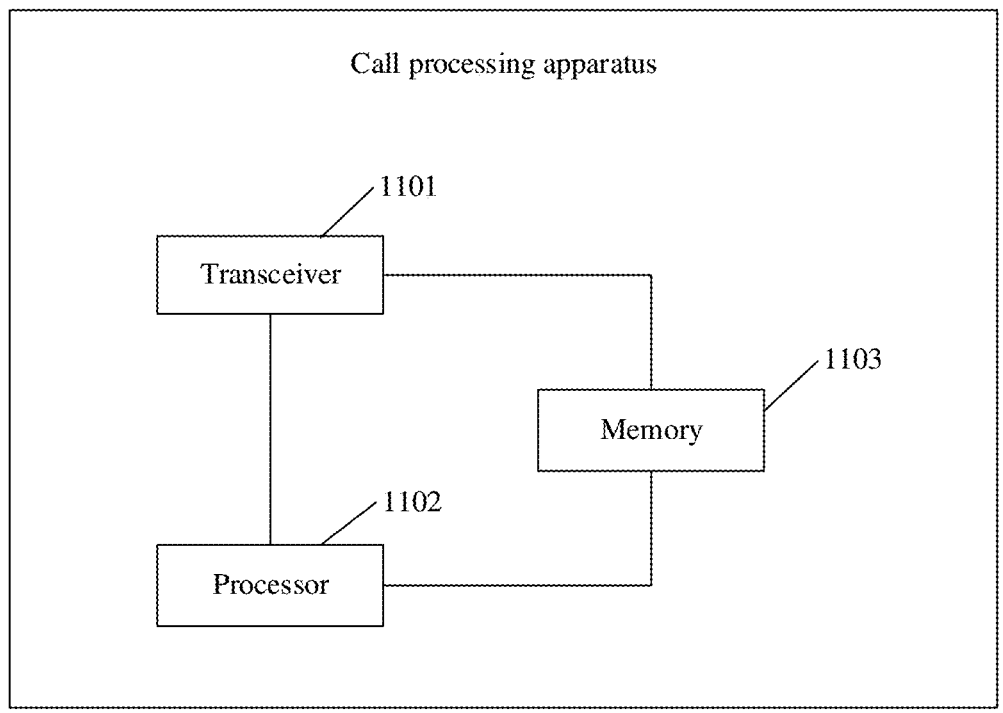
FIG. 11 is a schematic structural diagram of a call processing apparatus according to an embodiment of this application.

FIG. 11 is a schematic structural diagram of a call processing apparatus according to an embodiment of this application. The call processing apparatus may be a device (for example, a chip) that performs the call processing methods in the embodiments of FIG. 5 to FIG. 7E. The call processing apparatus may include a transceiver 1101, at least one processor 1102, and a memory 1103. The transceiver 1101, the processor 1102, and the memory 1103 may be connected to each other through one or more communication buses, or may be connected to each other in another manner.

The transceiver 1101 may be configured to send data or receive data. It may be understood that the transceiver 1101 is a general term, and may include a receiver and a transmitter.

The processor 1102 may be configured to process data of the call processing apparatus. The processor 1102 may include one or more processors. For example, the processor 1102 may be one or more central processing units (CPUs), a network processor (NP), a hardware chip, or any combination thereof. When the processor 1102 is one CPU, the CPU may be a single-core CPU, or may be a multi-core CPU.

The memory 1103 is configured to store program code and the like. The memory 1103 may include a volatile memory, for example, a random access memory (RAM). Alternatively, the memory 1103 may include a non-volatile memory, for example, a read-only memory (ROM), a flash memory, a hard disk drive (HDD), or a solid-state drive (SSD). Alternatively, the memory 1103 may include a combination of the foregoing types of memories.

The processor 1102 and the memory 1103 may be coupled through an interface, or may be integrated together. This is not limited in this embodiment.

The transceiver 1101 and the processor 1102 may be configured to perform the call processing method in the embodiment of FIG. 5. A specific implementation is as follows:

The transceiver 1101 is configured to send a data channel establishment indication message to the processor when detecting that a terminal device initiates or receives a call service, to indicate the processor to establish a data channel with the terminal device.

The processor 1102 is configured to establish the data channel with the terminal device.

The transceiver 1101 is further configured to send service page information corresponding to the call service to the terminal device through the data channel.

In an implementation, the transceiver 1101 is further configured to receive user operation information of the terminal device.

The processor 1102 is further configured to convert the user operation information into audio information.

The transceiver 1101 is further configured to send the audio information to a call center through a media channel between the terminal device and the call center.

In an implementation, the transceiver 1101 is further configured to receive data of the terminal device through the data channel.

The processor 1102 is further configured to obtain the user operation information of the terminal device from the data of the terminal device.

In an implementation, the transceiver 1101 is further configured to receive the user operation information from the terminal device through the data channel.

In an implementation, when it is detected that the call service is connected, the transceiver 1101 is further configured to send first service page information.

In an implementation, the processor 1102 is further configured to obtain a call start event, a call notification message, or a call connection event in the data of the terminal device, and the transceiver 1101 is further configured to send first service page information corresponding to the call start event, the call notification message, or the call connection event.

In an implementation, the transceiver 1101 is further configured to: receive a data channel establishment request message of the terminal device, and send the data channel establishment indication message to the processor in response to the data channel establishment request message.

In an implementation, the transceiver 1101 is further configured to: receive the user operation information of the terminal device, and send second service page information corresponding to the user operation information.

In an implementation, the transceiver 1101 is further configured to send page indication information to the terminal device through the data channel, where the page indication information indicates the terminal device to display a UI page corresponding to the first service page information or buffer the UI page.

Figure 12:
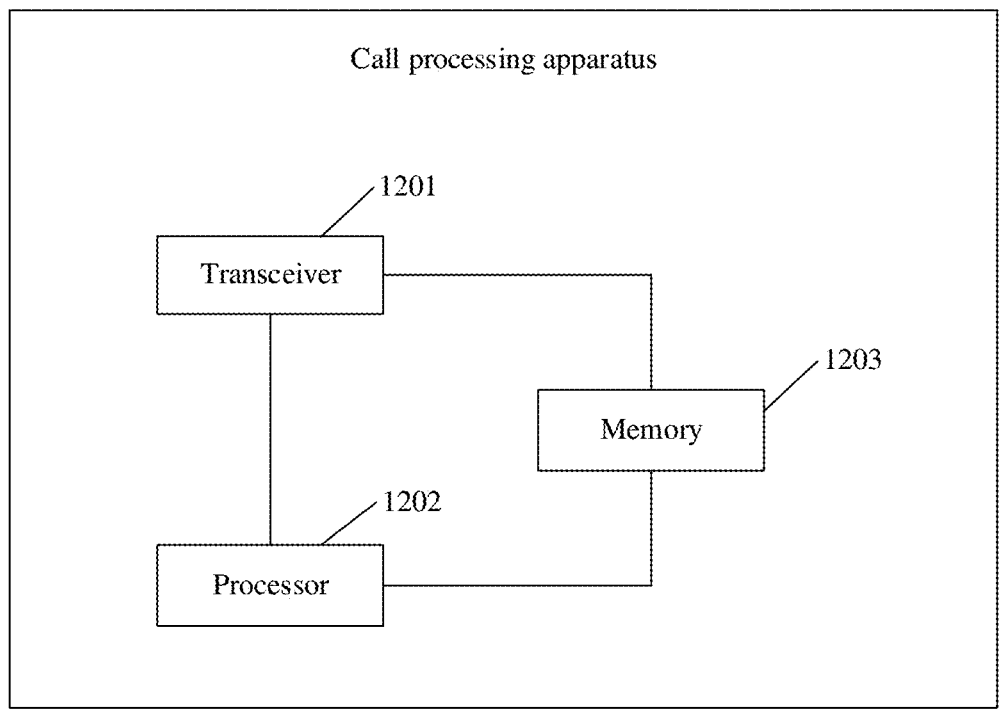
FIG. 12 is a schematic structural diagram of a call processing apparatus according to an embodiment of this application.

FIG. 12 is a schematic structural diagram of another call processing apparatus according to an embodiment of this application. The call processing apparatus may include a transceiver 1201, at least one processor 1202, and a memory 1203. The transceiver 1201, the processor 1202, and the memory 1203 may be connected to each other through one or more communication buses, or may be connected to each other in another manner.

The transceiver 1201 may be configured to send data or receive data. It may be understood that the transceiver 1201 is a general term, and may include a receiver and a transmitter.

The processor 1202 may be configured to process data of the call processing apparatus. The processor 1202 may include one or more processors. For example, the processor 1202 may be one or more central processing units (CPUs), a network processor (NP), a hardware chip, or any combination thereof. When the processor 1202 is one CPU, the CPU may be a single-core CPU, or may be a multi-core CPU.

The memory 1203 is configured to store program code and the like. The memory 1203 may include a volatile memory, for example, a random access memory (RAM). Alternatively, the memory 1203 may include a non-volatile memory, for example, a read-only memory (ROM), a flash memory, a hard disk drive (HDD), or a solid-state drive (SSD). Alternatively, the memory 1203 may include a combination of the foregoing types of memories.

The processor 1202 and the memory 1203 may be coupled through an interface, or may be integrated together. This is not limited in this embodiment.

The transceiver 1201 and the processor 1202 may be configured to perform the call processing methods in the embodiments of FIG. 8 to FIG. 10D. A specific implementation is as follows:

The processor 1202 is configured to establish a data channel with a terminal device when detecting that the terminal device initiates or receives a call service.

The transceiver 1201 is configured to: send first service page information corresponding to a call service to the terminal device through the data channel, and receive user operation information from the terminal device through the data channel.

The processor 1202 is further configured to convert the user operation information into audio information.

The transceiver 1201 is further configured to send the audio information to a call center through a media channel between the terminal device and the call center.

In an implementation, the processor 1202 is further configured to serially connect the terminal device, the call processing apparatus and the call center to form a media channel when the call service is connected.

In an implementation, the transceiver 1201 is further configured to receive a call start event from a telephony server, and the processor 1202 is further configured to determine, based on the call start event, that the terminal device initiates or receives the call service.

Alternatively, the transceiver 1201 is further configured to receive a data channel establishment request message from the terminal device, and the processor 1202 is further configured to determine, based on the data channel establishment request message, that the terminal device initiates or receives the call service.

In an implementation, the processor 1202 is further configured to obtain first service page information corresponding to the call start event, and the transceiver 1201 is further configured to send the first service page information to the terminal device through the data channel.

In an implementation, the processor 1202 is further configured to obtain, based on a called number included in the call start event, first service page information corresponding to the called number.

In an implementation, the processor 1202 is further configured to obtain second service page information corresponding to the user operation information based on the user operation information, and the transceiver 1201 is further configured to send the second service page information to the terminal device through the data channel.

In an implementation, the transceiver 1201 is further configured to send page indication information to the terminal device through the data channel, where the page indication information indicates the terminal device to display a UI page corresponding to the service page information or buffer the UI page.

An embodiment of this application provides a computer-readable storage medium. The computer-readable storage medium stores a program or instructions. When the program or the instructions are run on a computer, the computer is enabled to perform the call processing method in embodiments of this application.

An embodiment of this application provides a chip or a chip system. The chip or the chip system includes at least one processor and an interface. The interface and the at least one processor are interconnected through a line. The at least one processor is configured to run a computer program or instructions, to perform the call processing method in embodiments of this application.

The interface in the chip may be an input/output interface, a pin, a circuit, or the like.

The chip system in the foregoing aspect may be a system on chip (SoC), a baseband chip, or the like. The baseband chip may include a processor, a channel encoder, a digital signal processor, a modem, an interface module, and the like.

In an implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may be aware that, in combination with the examples described in embodiments disclosed in this specification, units and algorithm steps can be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
an application service device; and
an application media device;
wherein the application service device is configured to:
  receive a data channel establishment request message from a terminal device, wherein the data channel establishment request requests to establish a data channel;
  send a data channel establishment indication message to the application media device in response to receiving the data channel establishment request message, to indicate to the application media device to establish the data channel with the terminal device; and
wherein the application media device is configured to:
  receive the data channel establishment indication message from the application service device;
  establish the data channel with the terminal device; and
  send first service page information corresponding to a call service to the terminal device through the data channel.

2. The system according to claim 1, wherein the application media device is further configured to:
receive user operation information of the terminal device;
convert the user operation information into audio information; and
send the audio information to a call center through a media channel between the terminal device and the call center.

3. The system according to claim 2, wherein the application media device is further configured to:
receive the user operation information from the terminal device through the data channel.

4. The system according to claim 1, wherein the application media device is further configured to:
receive data of the terminal device through the data channel; and
send the data of the terminal device to the application service device; and
wherein the application service device is further configured to:
  receive the data of the terminal device;
  obtain user operation information of the terminal device from the data of the terminal device; and
  send the user operation information of the terminal device to the application media device.

5. The system according to claim 1, wherein:
the application service device is further configured to send the first service page information to the application media device when detecting that the call service is connected; and
wherein the application media device is further configured to receive the first service page information from the application service device.

6. A method, comprising:
receiving, by an application service device, a data channel establishment request message from a terminal device, wherein the data channel establishment request requests to establish a data channel;
sending, by the application service device, a data channel establishment indication message to an application media device in response to receiving the data channel establishment request message, to indicate to the application media device to establish the data channel with the terminal device;
receiving, by the application media device, the data channel establishment indication message from the application service device;
establishing, by the application media device, the data channel with the terminal device; and
sending, by the application media device, first service page information corresponding to a call service to the terminal device through the data channel.

7. The method according to claim 6, further comprising:
receiving, by the application media device, user operation information of the terminal device;
converting, by the application media device, the user operation information into audio information; and
sending, by the application media device, the audio information to a call center through a media channel between the terminal device and the call center.

8. The method according to claim 6, further comprising:
receiving, by the application media device, data of the terminal device through the data channel;
sending, by the application media device, the data of the terminal device to the application service device;
receiving, by the application service device, the data of the terminal device;
obtaining, by the application service device, user operation information of the terminal device from the data of the terminal device; and
sending, by the application service device, the user operation information of the terminal device to the application media device.

9. The method according to claim 6, further comprising:
receiving, by the application media device, user operation information from the terminal device through the data channel.

10. The method according to claim 6, further comprising:
sending, by the application service device, the first service page information to the application media device when detecting that the call service is connected; and
receiving, by the application media device, the first service page information.

11. The method according to claim 10, further comprising:
receiving, by the application media device, data of the terminal device through the data channel;
sending, by the application media device, the data of the terminal device to the application service device; and
receiving, by the application service device, the data of the terminal device; and
wherein sending, by the application service device, the first service page information to the application media device comprises:
  obtaining, by the application service device, a call start event, a call notification message, or a call connection event in the data of the terminal device, and
  sending, by the application service device, the first service page information corresponding to the call start event, the call notification message, or the call connection event to the application media device.

12. The method according to claim 6, further comprising:
receiving, by the application service device, user operation information of the terminal device, and sending, by the application service device, second service page information corresponding to the user operation information to the application media device.

13. The method according to claim 6, further comprising:
sending, by the application media device, page indication information to the terminal device through the data channel, wherein the page indication information indicates to the terminal device to display a user interface (UI) page corresponding to the first service page information or buffer the UI page.

14. A method, comprising:
establishing, by an application service device, a data channel with a terminal device when detecting that the terminal device initiates or receives a call service,
sending, by the application service device, first service page information corresponding to the call service to the terminal device through the data channel,
receiving, by the application service device, user operation information from the terminal device through the data channel,
sending, by the application service device, the user operation information to an application media device;
receiving, by the application media device, the user operation information from the application service device;
converting, by the application media device, the user operation information into audio information; and
sending, by the application media device, the audio information to a call center through a media channel between the terminal device and the call center.

15. The method according to claim 14, further comprising:
serially connecting, by the application media device, the terminal device, the application media device and the call center to form the media channel when the call service is connected.

16. The method according to claim 14, wherein detecting, by the application service device, that the terminal device initiates or receives the call service comprises:
receiving, by the application service device, a call start event from a telephony server; and determining, based on the call start event, that the terminal device initiates or receives the call service; or
receiving, by the application service device, a data channel establishment request message from the terminal device, and determining, based on the data channel establishment request message, that the terminal device initiates or receives the call service.

17. The method according to claim 16, wherein sending, by the application service device, the first service page information corresponding to the call service to the terminal device through the data channel comprises:
obtaining, by the application service device, first service page information corresponding to the call start event; and
sending, by the application service device, the first service page information to the terminal device through the data channel.

18. The method according to claim 17, wherein obtaining, by the application service device, the first service page information corresponding to the call start event comprises:
obtaining, by the application service device based on a called number comprised in the call start event, first service page information corresponding to the called number.

19. The method according to claim 14, further comprising:
obtaining, by the application service device, second service page information corresponding to the user operation information based on the user operation information; and
sending, by the application service device, the second service page information to the terminal device through the data channel.

20. The method according to claim 14, further comprising:
sending, by the application service device, page indication information to the terminal device through the data channel, wherein the page indication information indicates to the terminal device to display a user interface (UI) page corresponding to the first service page information or buffer the UI page.

* * * * *